Oct. 28, 1952     J. E. DAYGER ET AL     2,615,629

RECORD CONTROLLED MACHINE COMBINATION

Filed Dec. 12, 195                               30 Sheets-Sheet 1

INVENTORS
JONAS E. DAYGER
ORVILLE B. SHAFER
EDWIN R. WOODING
JOSEPH M. SARLEY
JAMES V. WILLIAMS, JR.

BY Geoffrey Knight
ATTORNEY

Oct. 28, 1952   J. E. DAYGER ET AL   2,615,629
RECORD CONTROLLED MACHINE COMBINATION

Filed Dec. 12, 1950   30 Sheets-Sheet 2

INVENTORS
JONAS E. DAYGER
ORVILLE B. SHAFER
EDWIN R. WOODING
JOSEPH M. SARLEY
JAMES V. WILLIAMS, JR.

BY Geoffrey Knight
ATTORNEY

Oct. 28, 1952     J. E. DAYGER ET AL     2,615,629
RECORD CONTROLLED MACHINE COMBINATION
Filed Dec. 12, 1950     30 Sheets-Sheet 3

FIG_3_

INVENTORS
JONAS E. DAYGER
ORVILLE B. SHAFER
EDWIN R. WOODING
JOSEPH M. SARLEY
JAMES V. WILLIAMS, JR.
BY Geoffrey Knight
ATTORNEY Oct. 28, 1952     J. E. DAYGER ET AL     2,615,629
RECORD CONTROLLED MACHINE COMBINATION
Filed Dec. 12, 1950     30 Sheets-Sheet 4

Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney Oct. 28, 1952 J. E. DAYGER ET AL 2,615,629
RECORD CONTROLLED MACHINE COMBINATION
Filed Dec. 12, 1950 30 Sheets-Sheet 5

INVENTORS
JONAS E. DAYGER
ORVILLE B. SHAFER
EDWIN R. WOODING
JOSEPH M. SARLEY
JAMES V. WILLIAMS, JR.
BY Geoffrey Knight
ATTORNEY Oct. 28, 1952     J. E. DAYGER ET AL     2,615,629
RECORD CONTROLLED MACHINE COMBINATION
Filed Dec. 12, 1950     30 Sheets-Sheet 6

INVENTORS
JONAS E. DAYGER
ORVILLE B. SHAFER
EDWIN R. WOODING
JOSEPH M. SARLEY
JAMES V. WILLIAMS, JR
BY Geoffrey Knight
ATTORNEY Oct. 28, 1952   J. E. DAYGER ET AL   2,615,629
RECORD CONTROLLED MACHINE COMBINATION
Filed Dec. 12, 1950   30 Sheets-Sheet 7

APPLICATION -    $X = (ak + b) + (dh + e)$

| CARD NO. | PUNCH INTO INSTRUCTION CARDS ||||||| CTR. C | AUXILIARY STORAGE REGISTERS ||||
|---|---|---|---|---|---|---|---|---|---|---|---|---|
| | CHANNEL A | CHANNEL B | OPERATION | CHANNEL C | CARD ENTRY INTO CHAN. A || CARD ENTRY INTO CHAN. B || SPECIAL CONTROL | | 10 DIGIT ||||
| | | | | | | | | | | | 11 | 12 | 21 | 22 |
| 1 | 0 | 0 | 1 | 2 | 1 | | a | 5 | | | | | | |
| 2 | 0 | 0 | 1 | 2 | 2 | | b | 6 | | | | | | |
| 3 | 0 | 0 | 1 | 1 | 1 | | d | 7 | | | | | | |
| 4 | 0 | 0 | 1 | 1 | 2 | | e | 4 | | | | | | |
| 5 | 0 | 2 | 1 | 3 | | | k | 2 | | | ak | d | | a |
| 6 | 0 | 2 | 2 | 1 | 2 | 1 | | | | | | e | | b |
| 7 | 0 | 1 | 1 | 3 | | | h | 3 | | | dh | | | |
| 8 | 0 | 1 | 2 | 1 | | | | | | | | ak+b | | |
| 9 | 0 | 2 | 1 | 1 | 1 | 1 | | | X | | | | | |
| | | | | | | | | | | | X | | | |

FIG_9_

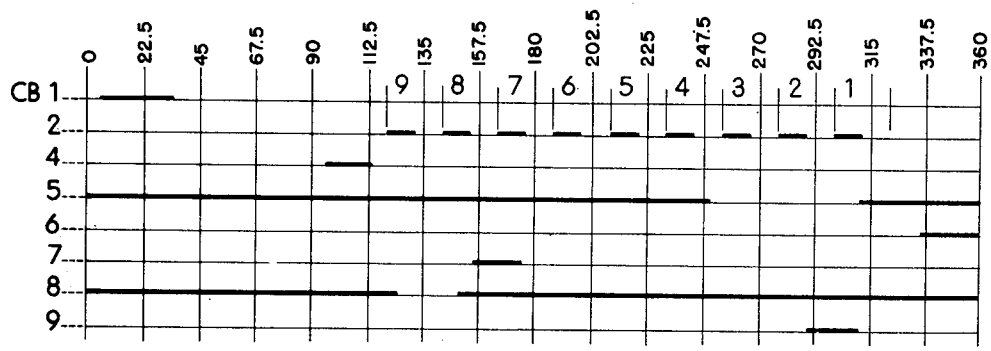

FIG_14_

Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney Oct. 28, 1952  J. E. DAYGER ET AL  2,615,629
RECORD CONTROLLED MACHINE COMBINATION
Filed Dec. 12, 1950  30 Sheets-Sheet 8
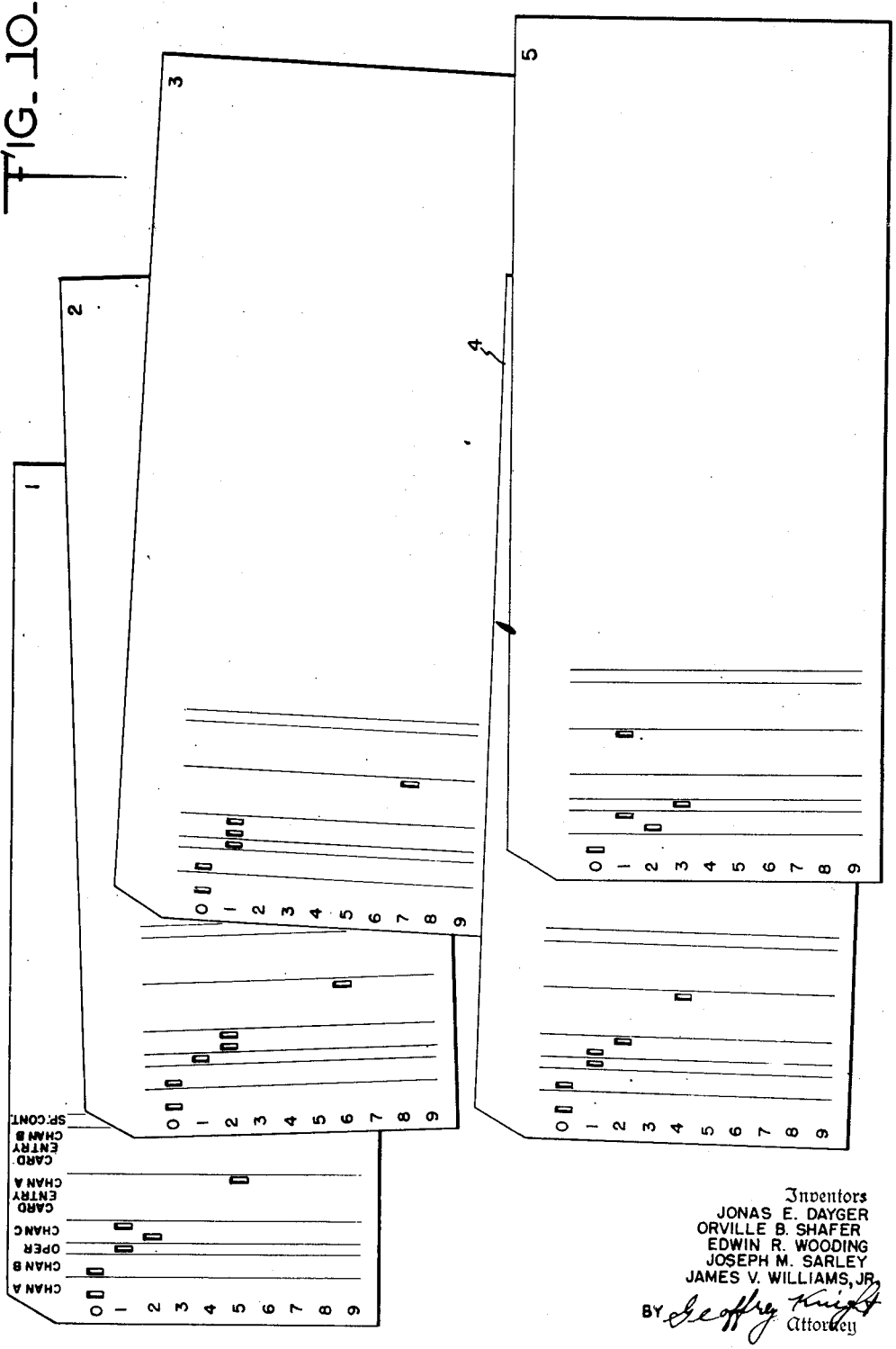
Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney Oct. 28, 1952   J. E. DAYGER ET AL   2,615,629
RECORD CONTROLLED MACHINE COMBINATION
Filed Dec. 12, 1950   30 Sheets-Sheet 10
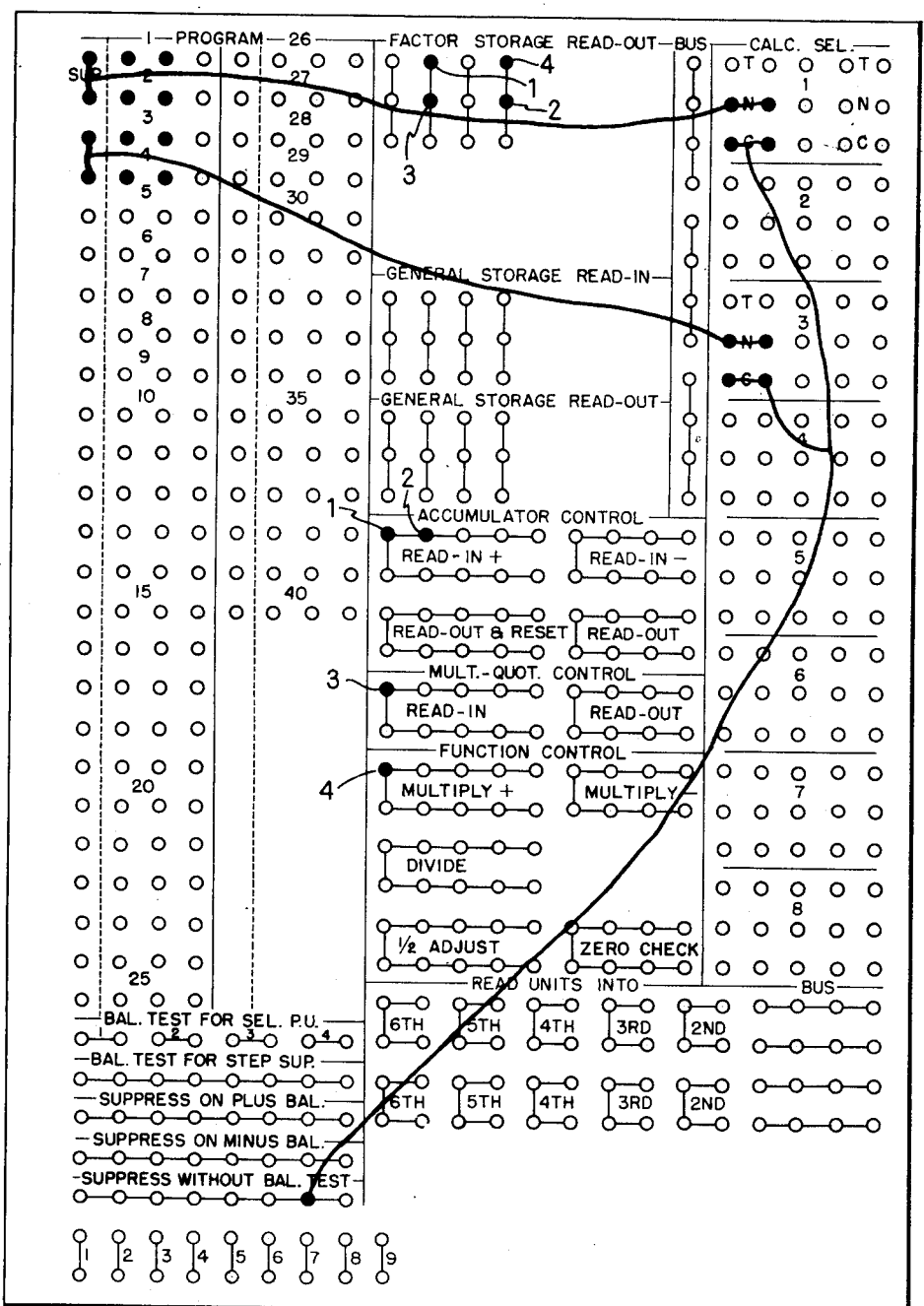
FIG_12_
Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney

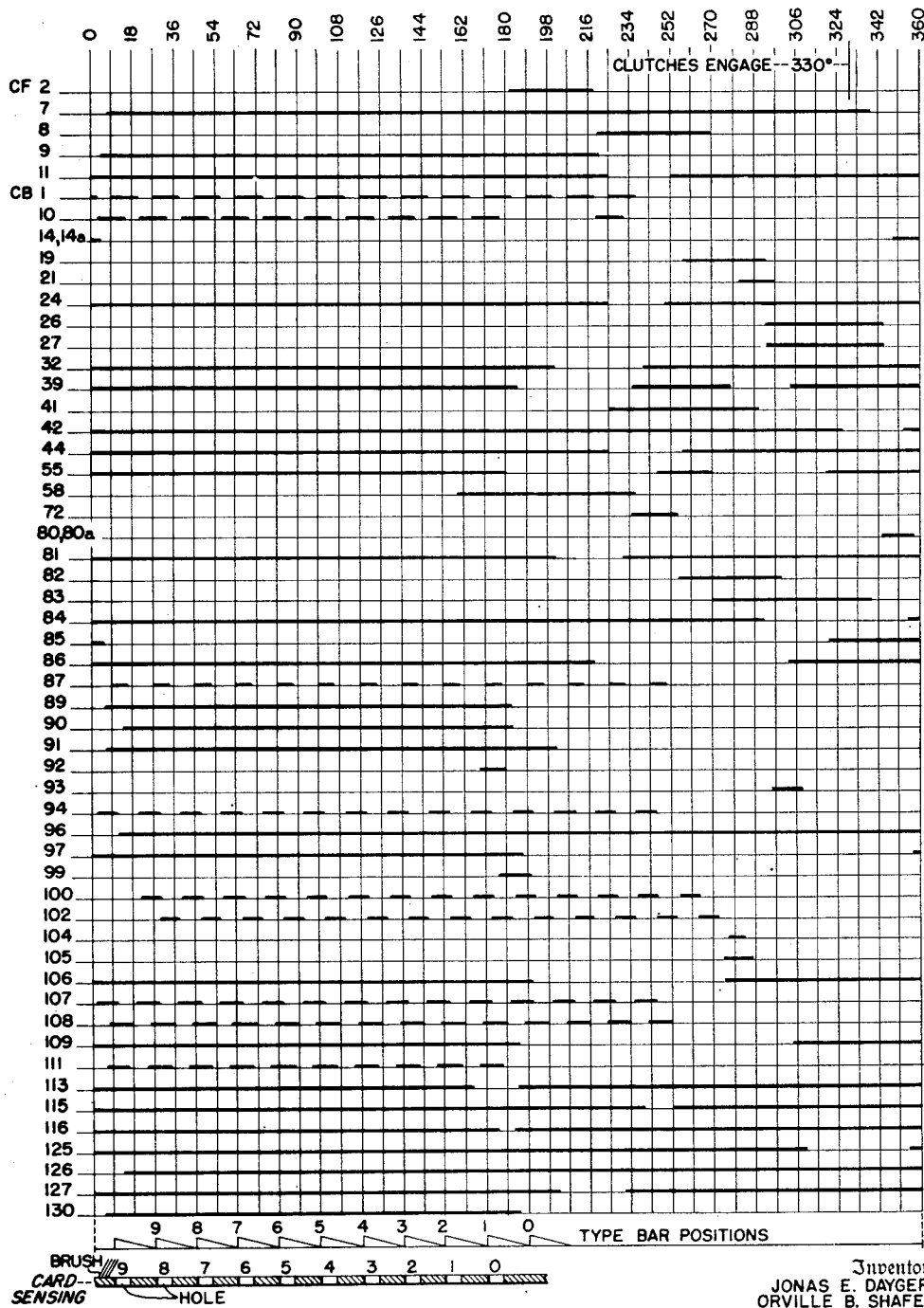
FIG_13

Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney

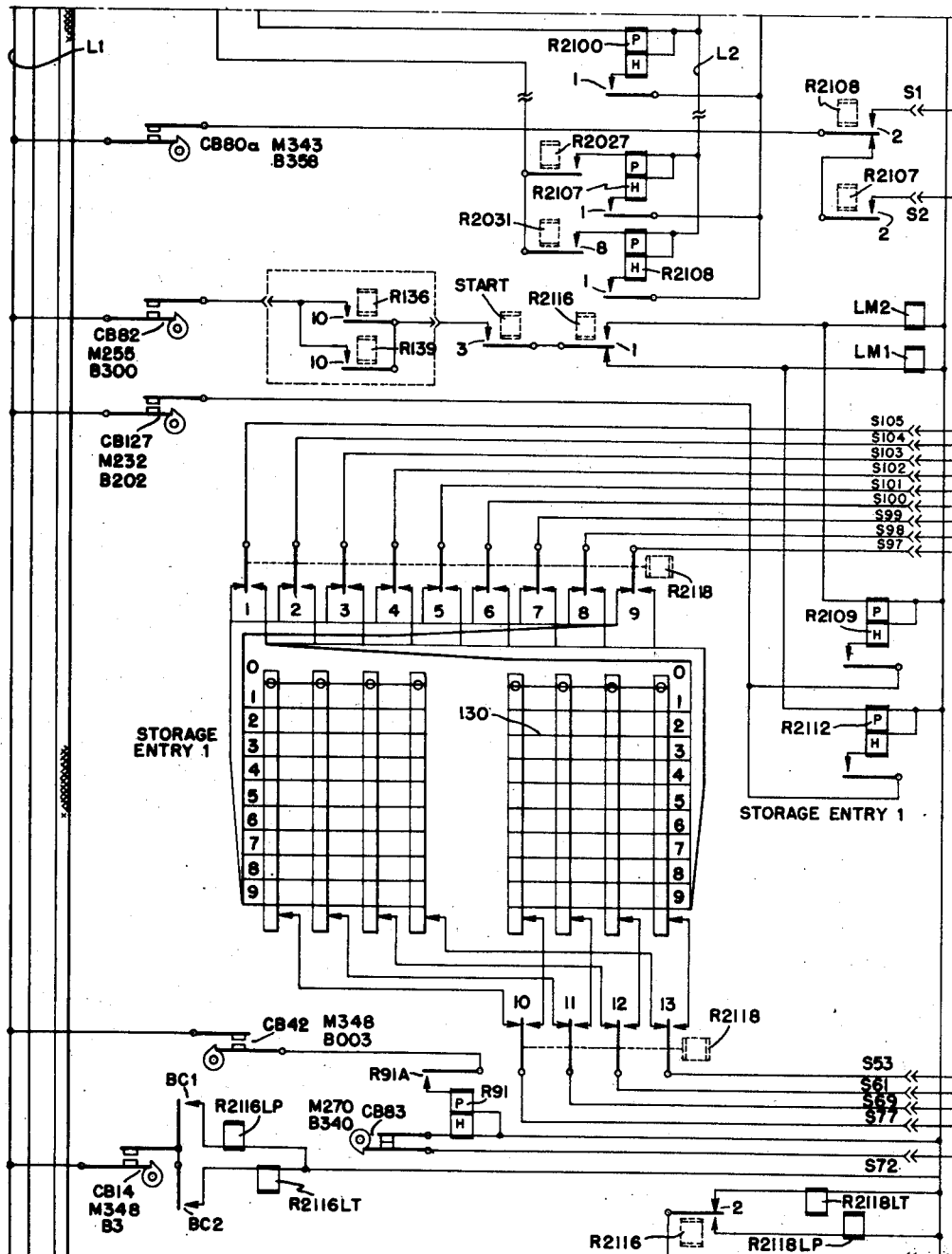

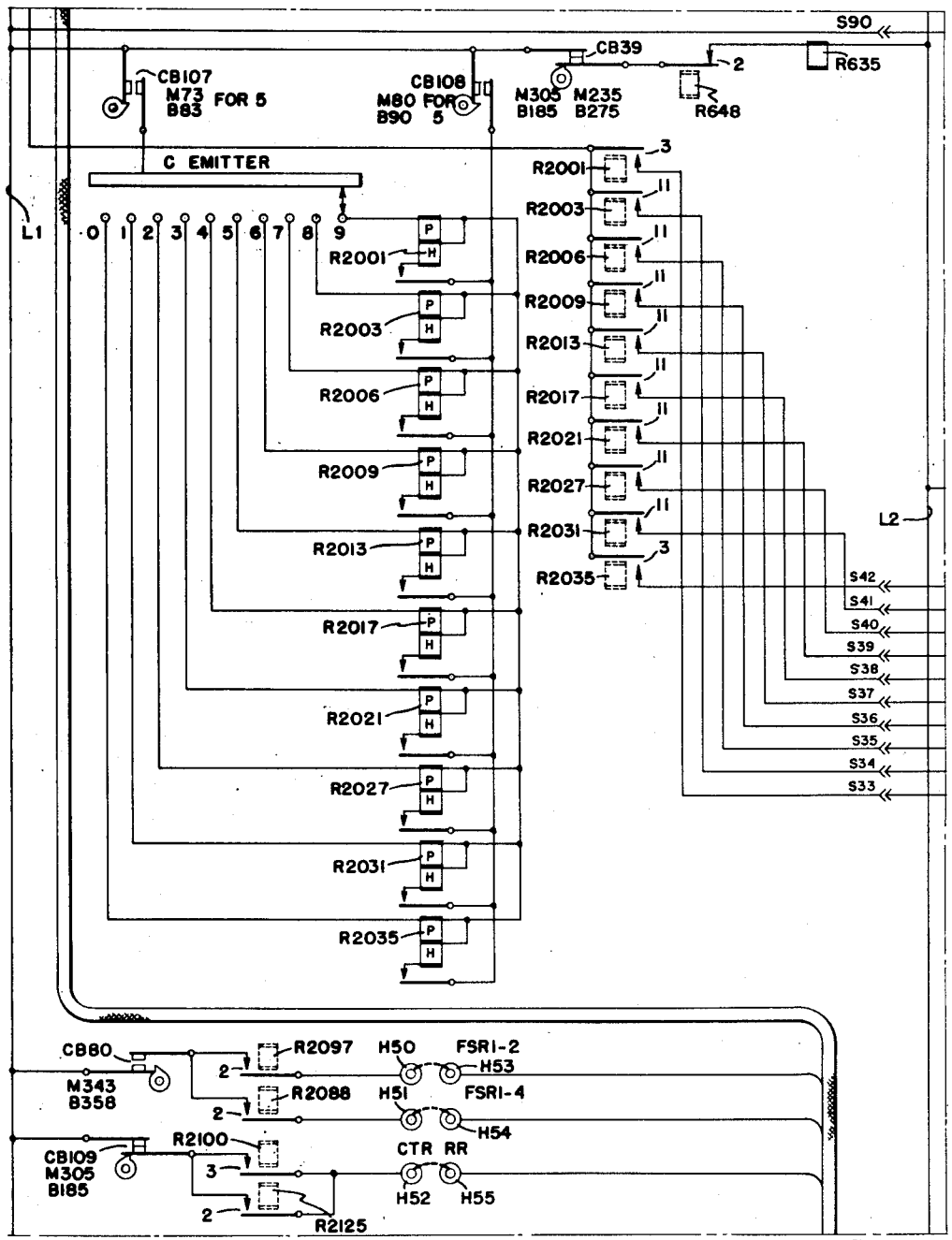
FIG_16c_

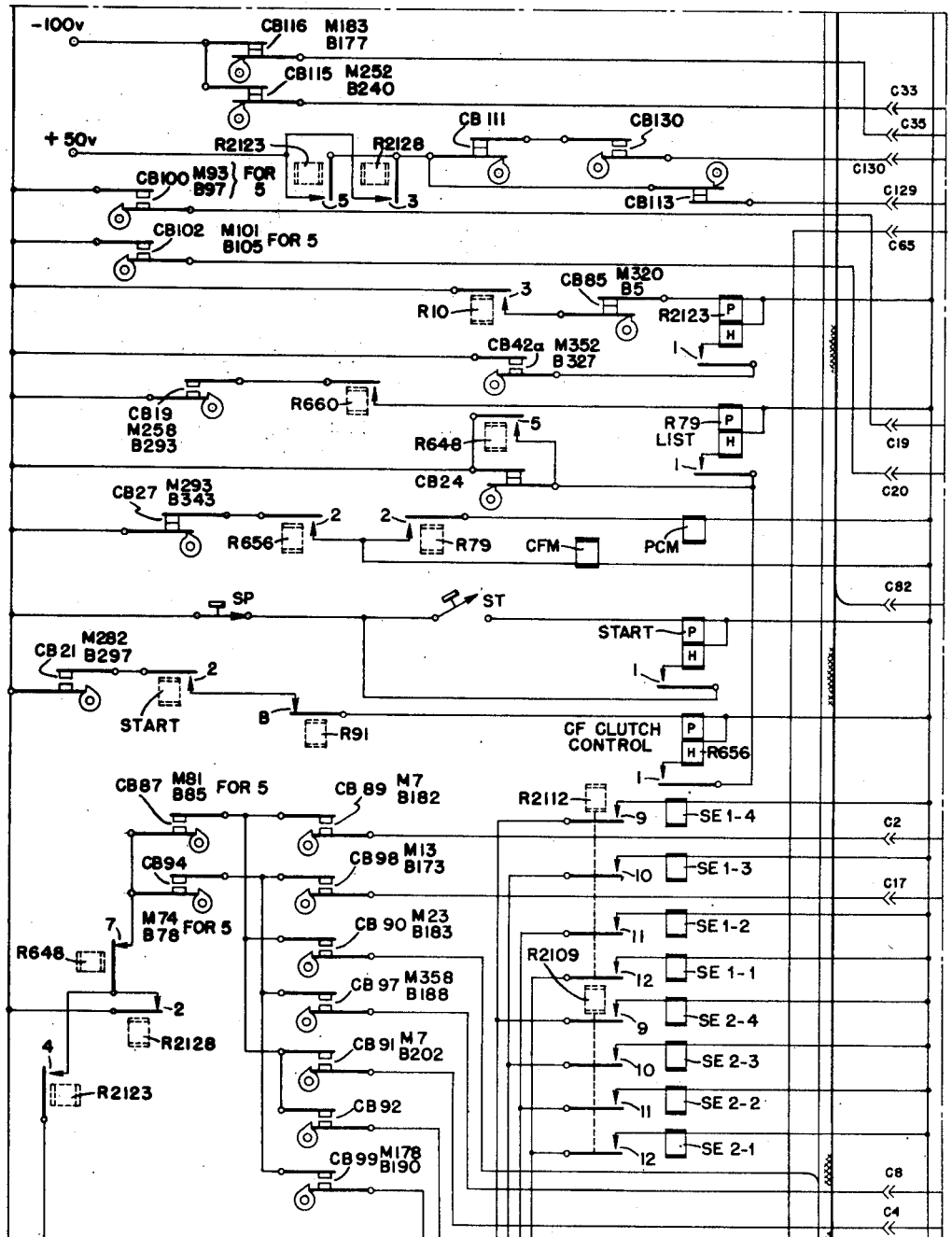
FIG_16d_

Oct. 28, 1952   J. E. DAYGER ET AL   2,615,629
RECORD CONTROLLED MACHINE COMBINATION
Filed Dec. 12, 1950   30 Sheets-Sheet 17

| 16a | 16f |
| 16b | 16g |
| 16c | 16h |
| 16d | 16i |
| 16e | 16j |

Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney

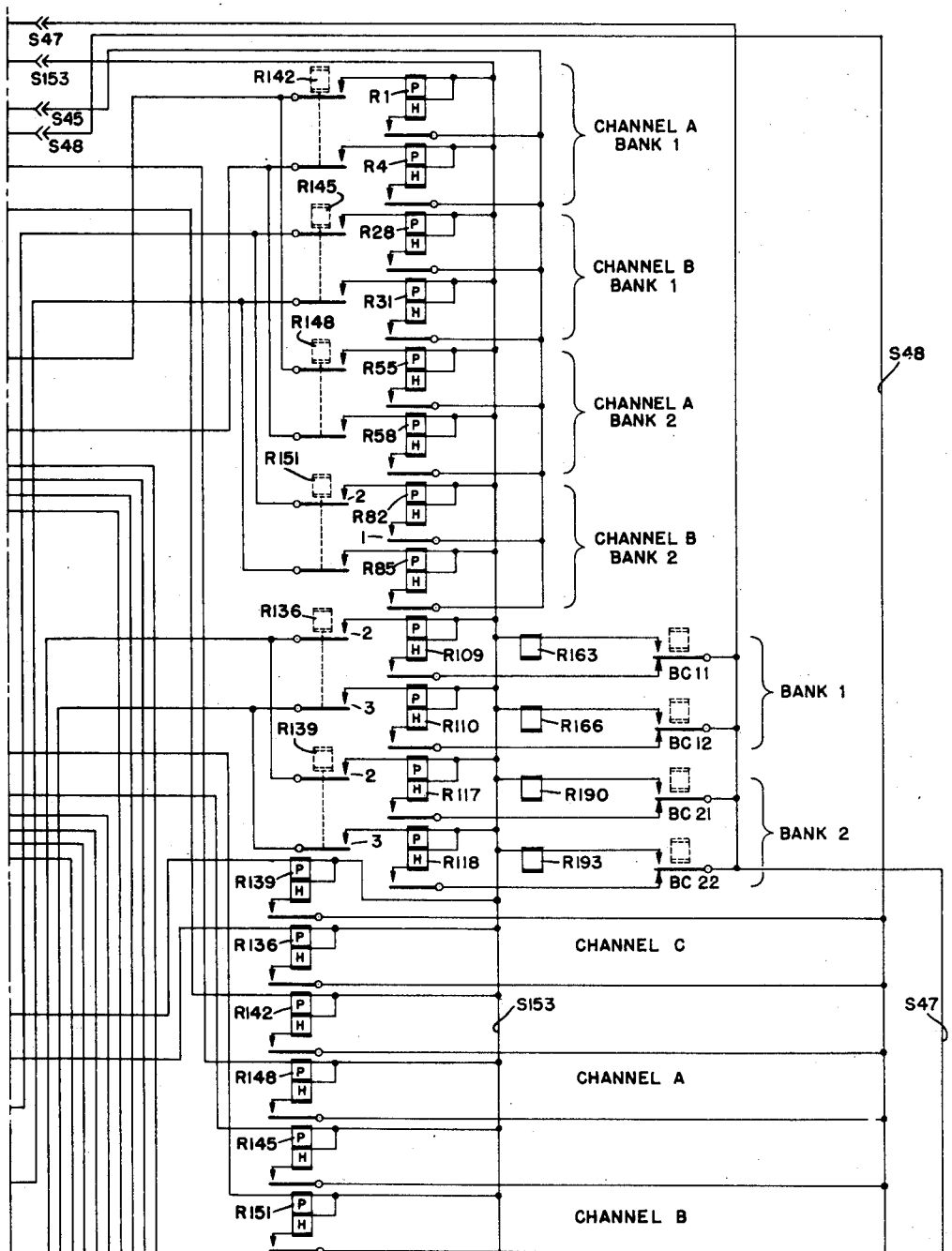
FIG_16f_

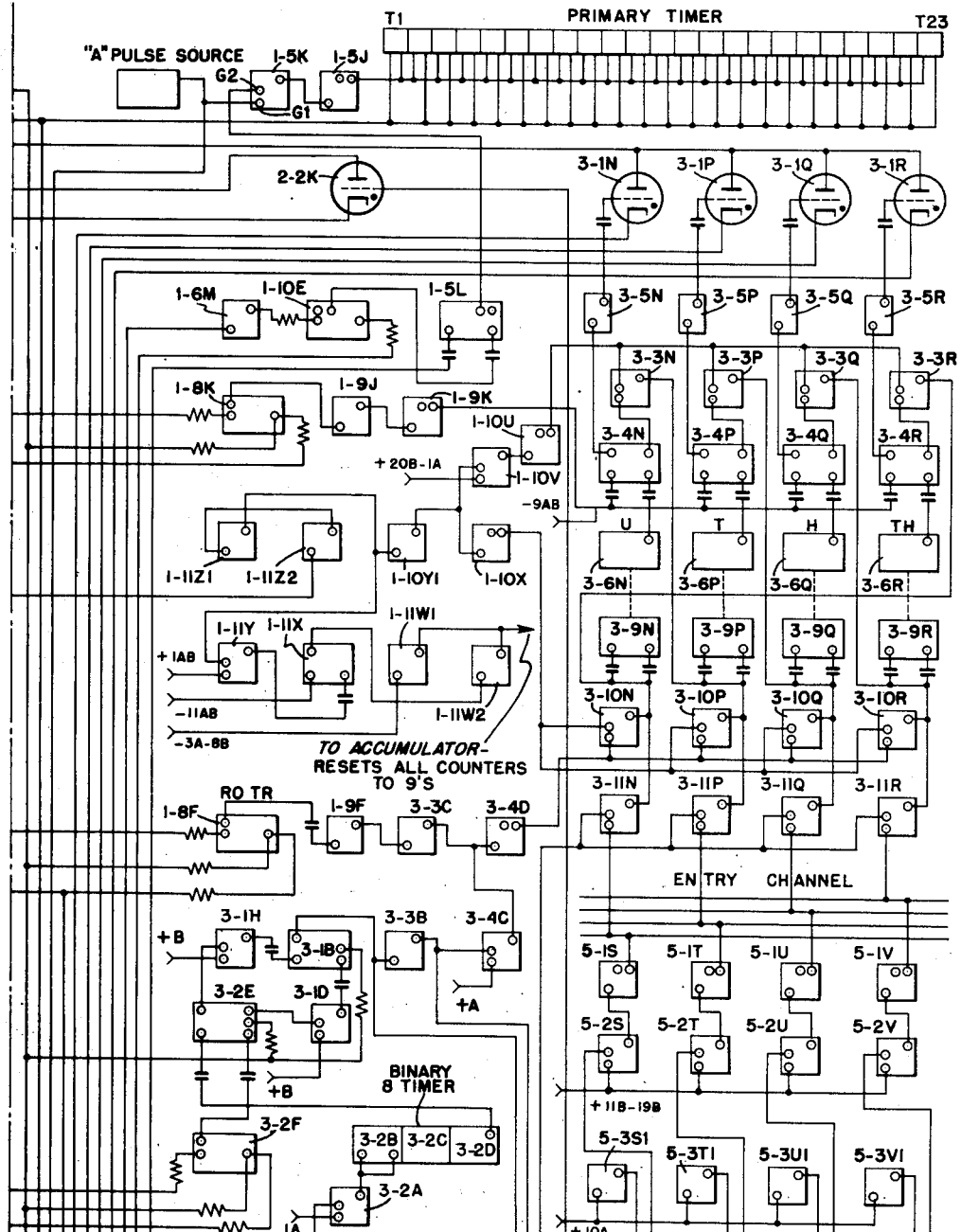
FIG_16i

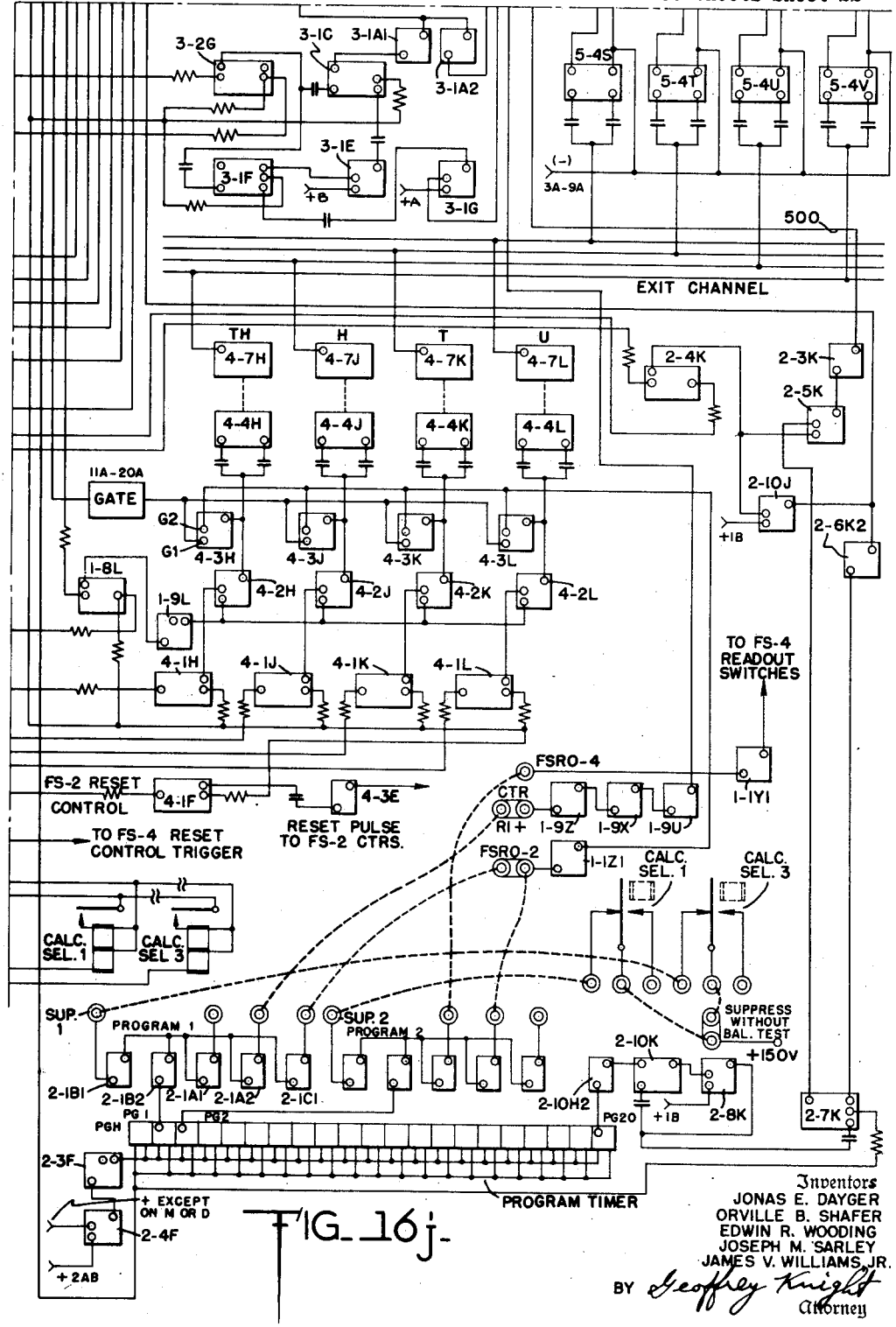

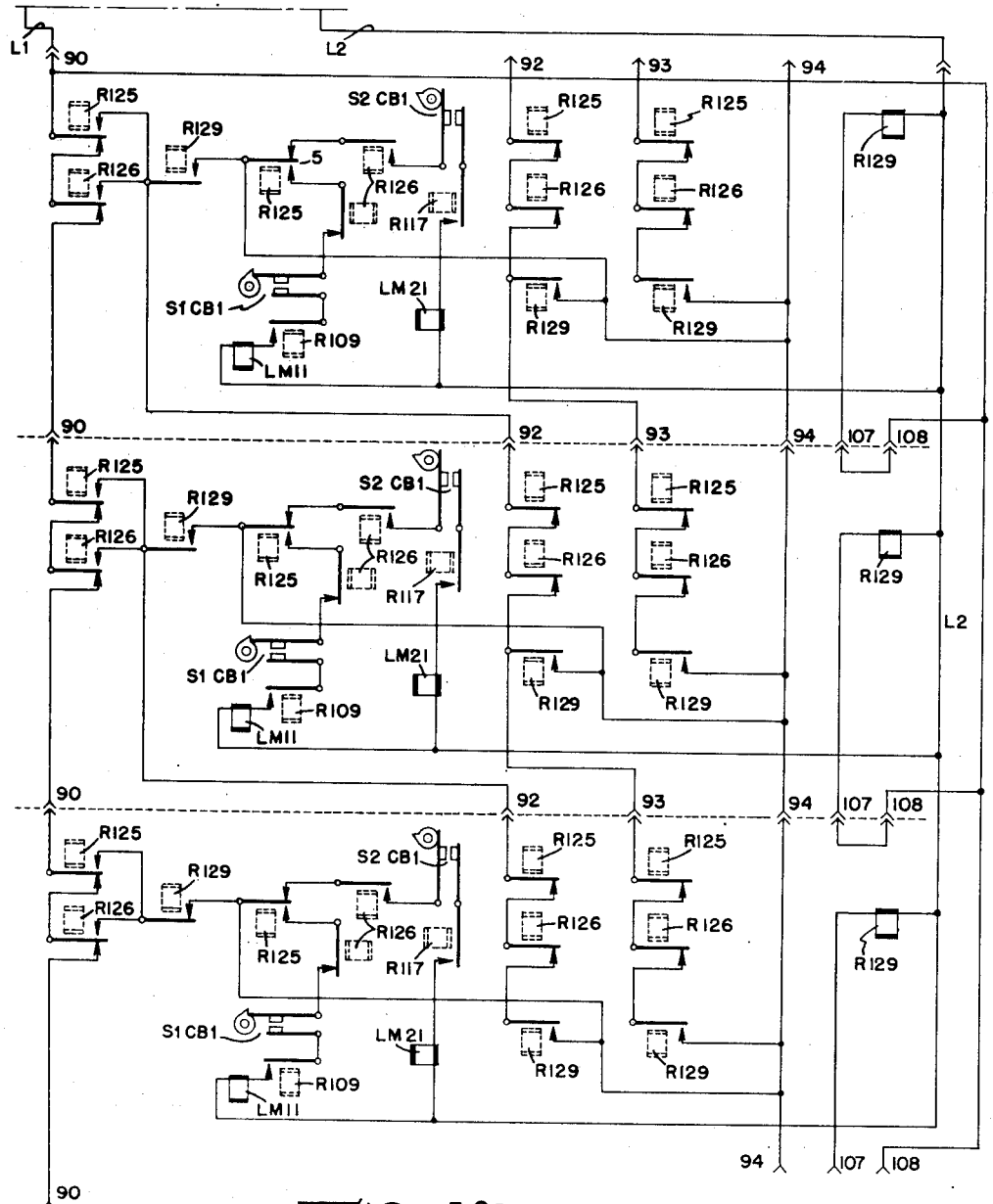
FIG_18b_

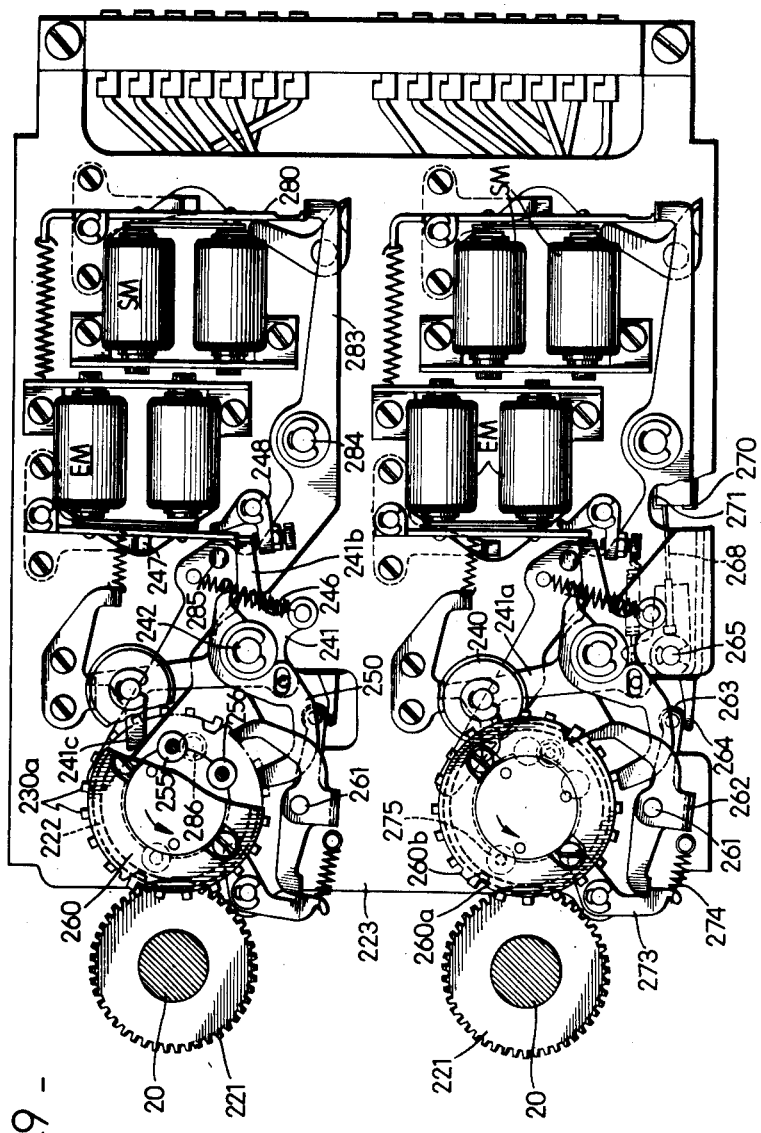

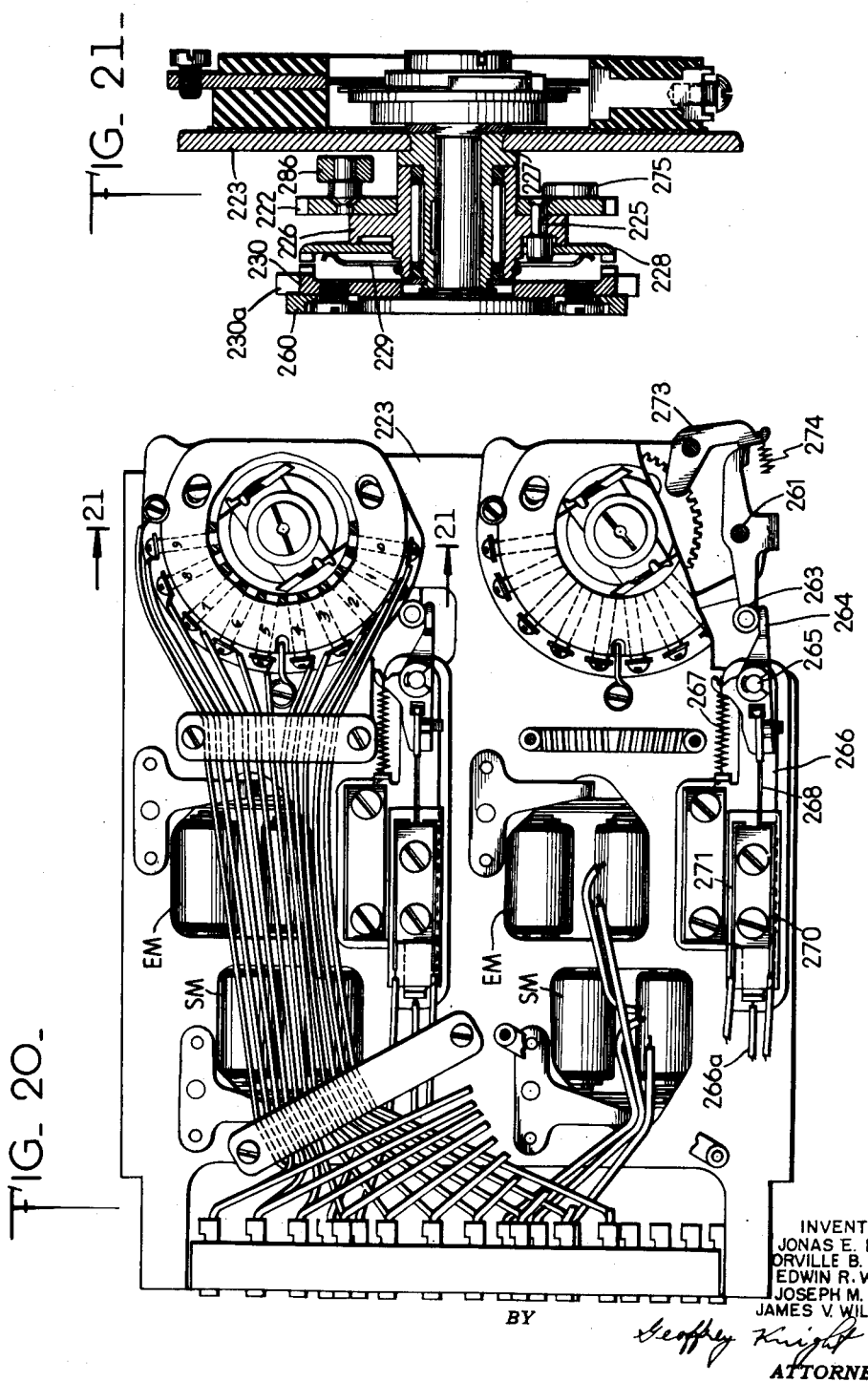

Oct. 28, 1952  J. E. DAYGER ET AL  2,615,629
RECORD CONTROLLED MACHINE COMBINATION
Filed Dec. 12, 1950  30 Sheets-Sheet 27

Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney Inventors
JONAS E. DAYGER
ORVILLE B. SHAFER
EDWIN R. WOODING
JOSEPH M. SARLEY
JAMES V. WILLIAMS, JR.
BY Geoffrey Knight
Attorney Patented Oct. 28, 1952

2,615,629

UNITED STATES PATENT OFFICE 2,615,629

RECORD CONTROLLED MACHINE COMBINATION

Jonas E. Dayger, Binghamton, Orville B. Shafer, Owego, Edwin R. Wooding, Johnson City, Joseph M. Sarley, Binghamton, and James V. Williams, Jr., Poughkeepsie, N. Y., assignors to International Business Machines Corporation, New York, N. Y., a corporation of New York Application December 12, 1950, Serial No. 200,342

22 Claims. (Cl. 235—61.9)

In the patent to J. E. Dayger, et al., No. 2,573,312 there is disclosed a combination of record controlled machines for carrying out complex calculations. The illustrative embodiment in said application is a group consisting of a tabulating machine, a calculating machine, and a summary punch. The tabulating machine has the functions of reading the records on which the problem is set up, to program the operation and to feed the factors, constants, etc., into the calculating machine; and storing and printing numbers derived either from the records or from the calculating machine. The calculating machine receives numbers and instructions from the tabulating machine, computes results, and holds them for read-out by the tabulating machine or summary punch. The summary punch reads out results from the calculating machine and punches them in cards.

It is an object of the present invention to increase the utility of this combination of machines by providing one or more auxiliary storage machines so coordinated with the other machines as to be capable of receiving results computed by the calculating machine, or numbers fed into the system from the records, and holding such results, or other numbers, so that they can be fed back, when programmed by the tabulating machine, for further calculation, etc.

The addition of auxiliary storage machines to the group has the advantage of enabling intermediate results to be used again, or repeatedly, in the calculation, and to be called into operation at any time, without the need to punch the results in cards as they appear and feed them into the deck in the card feed.

Numbers are handled in the tabulating machine by a combination of electrical impulses with cyclically moving members, the impulses occurring at specific index times of the cycle, corresponding to the digits which they represent. The calculator, on the other hand, is an electronic device operated solely by impulses, which are gated to correspond in number to the digit, or its complement. In transferring numbers from the tabulator to the calculator, or from the calculator to the tabulator, the impulses originate in the tabulator, so as to be identified with its cycle timing. For operations within the calculator itself the pulses are generated by electronic pulsing means.

It is one of the objects of the invention to coordinate the auxiliary storage means with the other machines only by electrical circuits, that is, by cables which can be unplugged to separate the machines for more convenient portability, for independent use, or for use in smaller groups. For example, the tabulating machine, or the summary punch can be used individually or as a combination of tabulating machine with summary punch attached; or the tabulating machine and one or more storage machines can be used, with or without the summary punch, the storage machines serving as extended storage capacity, which can be used to return numbers to the tabulating machine, as well as to receive numbers from it.

It is a further object of the invention to coordinate the storage means with the other machines without mechanically synchronizing them.

An additional object is to provide an auxiliary storage device which can be connected to a tabulating machine, with or without an attached calculating machine, solely by electrical connecting means and without mechanical synchronization, and which can serve to feed numbers back into the tabulating machine as called for by instructions from cards read in the tabulating machine.

In the machine group including the tabulating machine the timing of the calculating cycle as a whole is necessarily synchronized with the tabulating machine, which is the basic programming means of the group. Most of the tabulating machine cycle is used for the 12 digit and zone index times and certain control functions. A relatively short part of each tabulating machine cycle is allotted for the calculating cycle, which begins and ends in response to signals from the tabulating machine. The transfer of numbers into and out of the calculator must take place outside of the calculating cycle.

The storage machine cycle may have any phase relation whatever to the calculating machine cycle and the process of transferring numbers from the calculator into the storage machine must be carried out in such a way as not to conflict with the calculating cycle.

It is, accordingly, an object of the invention to reconcile the transfer of numbers from the calculator into the storage machine, and from the storage machine into the calculating machine, with the condition that the transfer must not occur while the calculator is in process of calculating and the further condition that there is an infinite variation in the phase relationship of the calculating time to the storage machine cycle.

It is a further object, associated with the one just mentioned, to accomplish the read out to storage expeditiously, but without requiring an unduly high speed of operation of the storage machine.

A still further object of the invention is to eliminate the need for reading answers out of the calculator twice, once for printing them and once for transferring them to auxiliary storage.

In accordance with the immediately foregoing objects, the tabulator is provided with electro-mechanical storage entry means, into which numbers are read from the calculator by means of pulses generated by the tabulator, the storage machine having electro-mechanical storage units into which the numbers are read from the storage entry means by means of pulses generated in the storage machine. Two storage entry units are used in alternation, so that one can be storing a number while another number is being read out of the other storage entry unit.

An object of the invention is to interlock the storage machine with the storage entry means so that it cannot get ahead of the entry into the storage entry unit, though the read-out from a storage entry unit may partially overlap the read-in to that unit.

Another object is to insure that read-out of the storage entry units will occur in alternation and that a new number will not be entered in a storage entry unit until a number previously entered in it has been read out.

Still another object is to provide a calculating machine group of the kind described, comprising a plurality of individually driven, unsynchronized storage machines to which numbers are selectively fed through a common channel, but without interference, notwithstanding the variations in phase relationships of the different machines.

A further object is to provide a calculating machine controlled by a card reading machine, characterized by means to suspend operation of the card reading machine, if the calculating time required exceeds a limit, and to start the card reading machine again automatically when the calculation is finished.

Other objects of the invention will be pointed out in the following description and claims and illustrated in the accompanying drawings, which disclose, by way of example, the principle of the invention and the best mode, which has been contemplated, of applying that principle.

In the drawings:

Fig. 9 is a chart showing the perforations of a set of cards for performing an illustrative problem.

Fig. 10 is a view of the first five cards of the set used in the illustrative problem.

Fig. 12 is the calculator control panel showing wiring.

Fig. 13 is a timing diagram of the tabulating machine.

Fig. 14 is a timing diagram of one bank of the storage machine.

Figs. 16a to 16j are sections of the circuit diagram of the group of machines, with the summary punch excluded.

Fig. 17 is a diagram of the way in which the sheets of the circuit diagram are to be assembled to make the complete circuit.

Figure 18A:
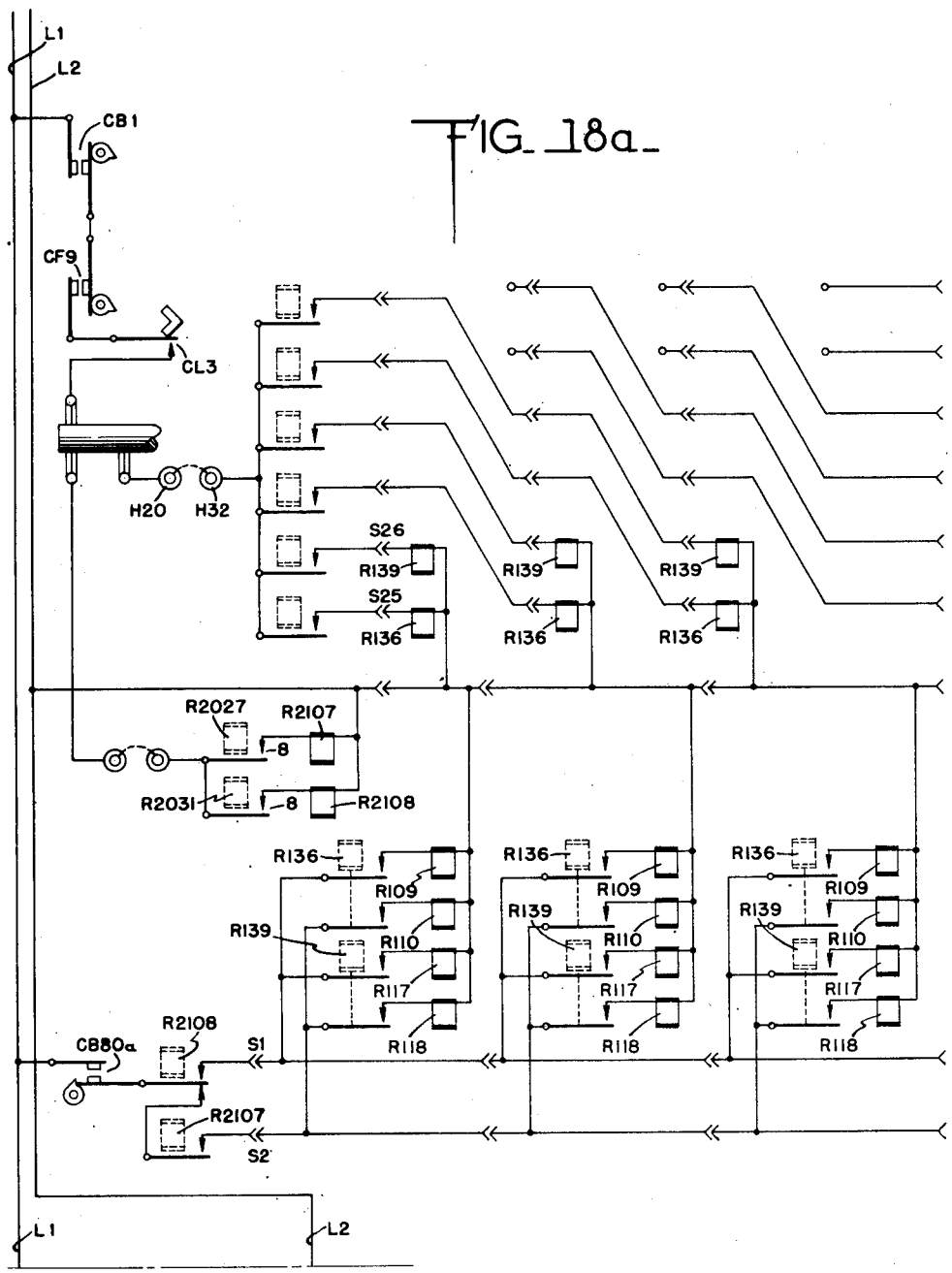

Figs. 18a and 18b together constitute a supplementary circuit diagram showing a portion of the circuit where several storage machines are joined into one auxiliary storage means.

Fig. 19 is a side elevation of one order of the accumulating means of the tabulator.

Fig. 20 is a side elevation of one order of the accumulating means, from the opposite side.

Fig. 21 is a section on the line 21—21 of Fig. 20.

Figure 22A:
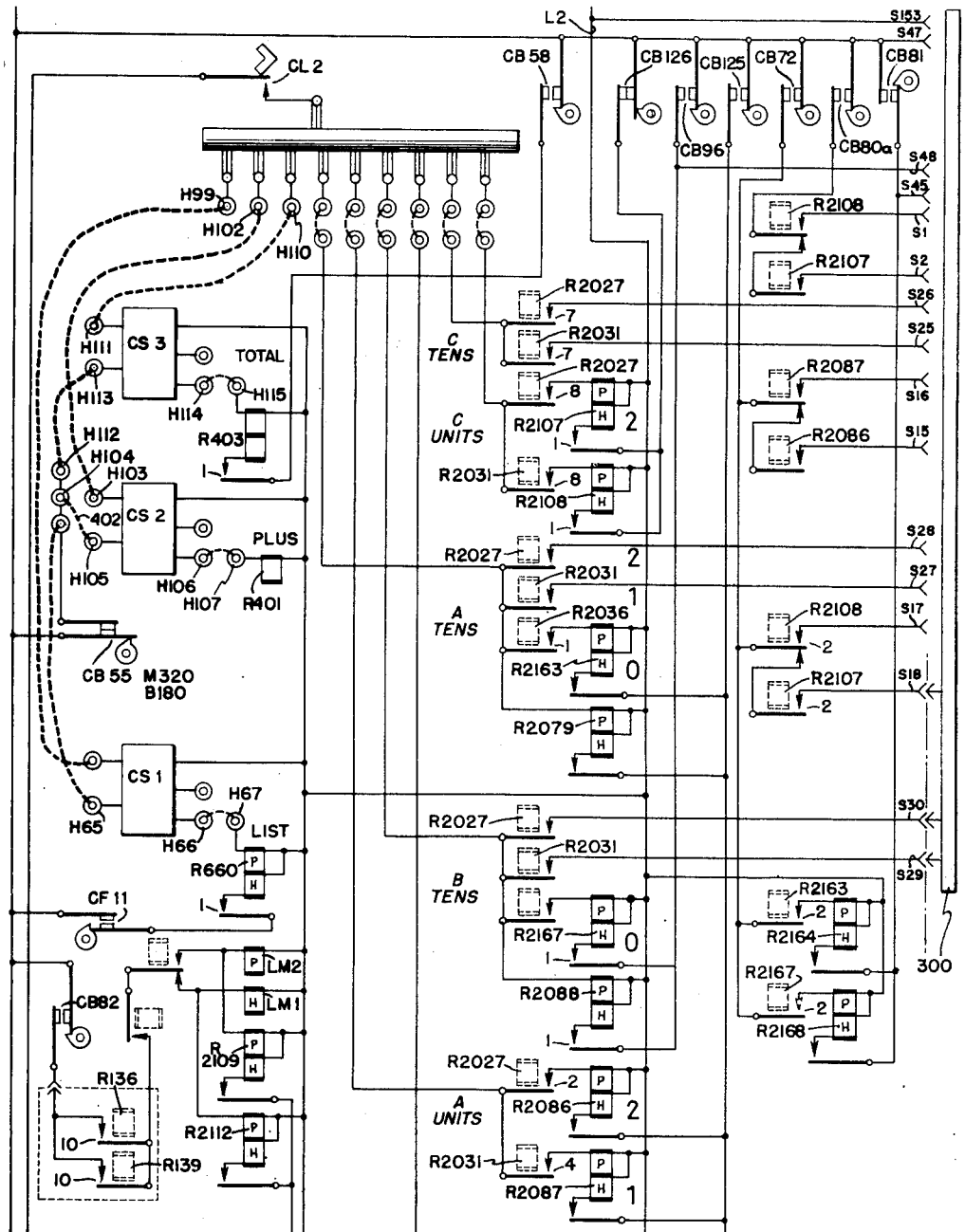
Figure 22B:
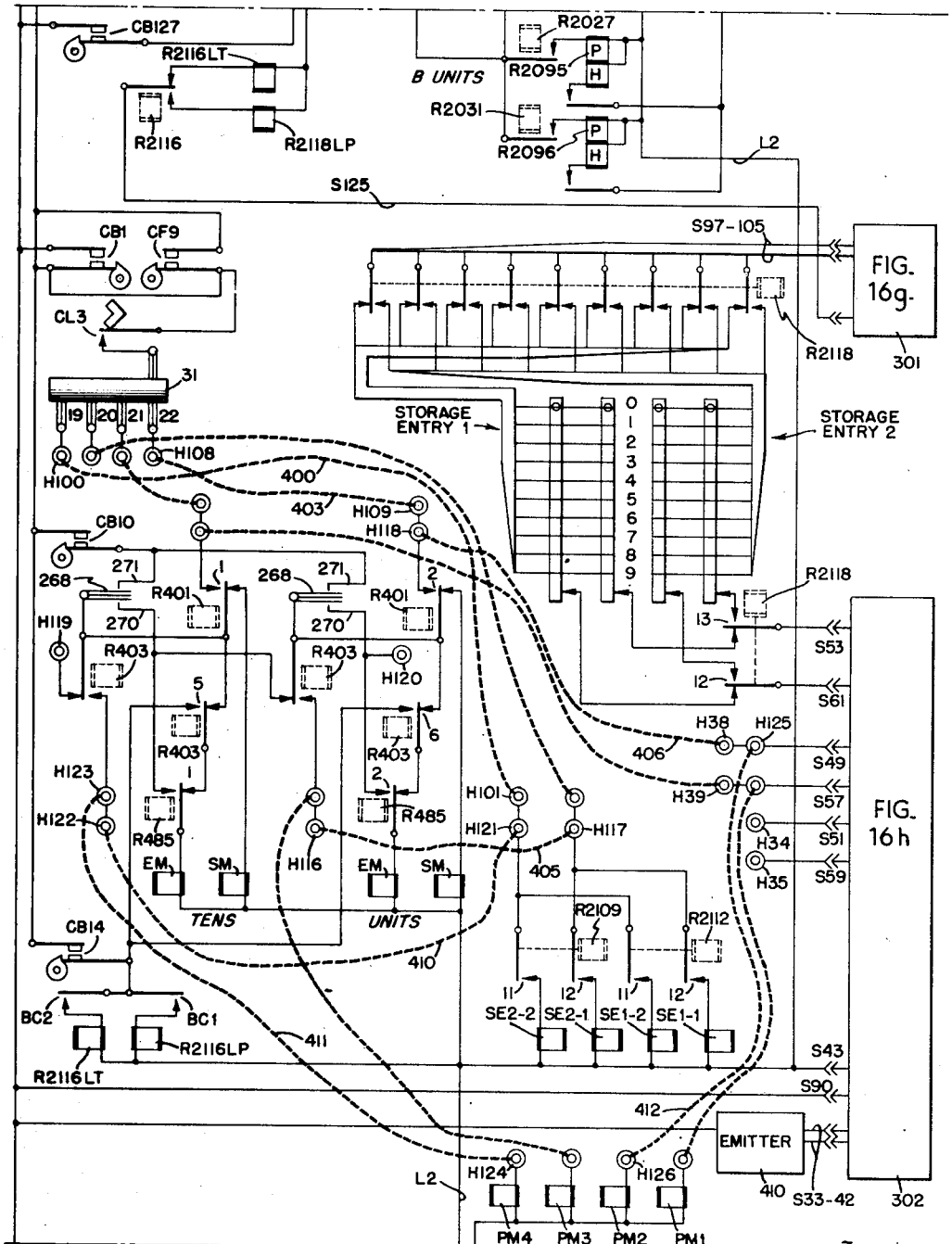
Figure 22C:
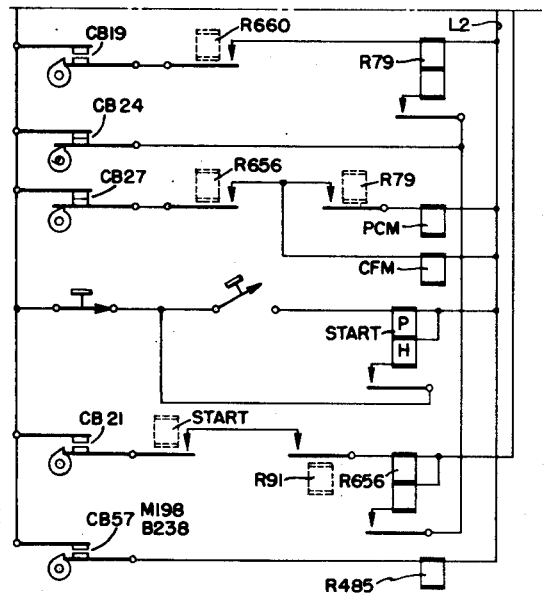

Figs. 22a to 22c are parts of a circuit diagram showing additional features of the circuit, but without the calculating machine.

Figure 23:
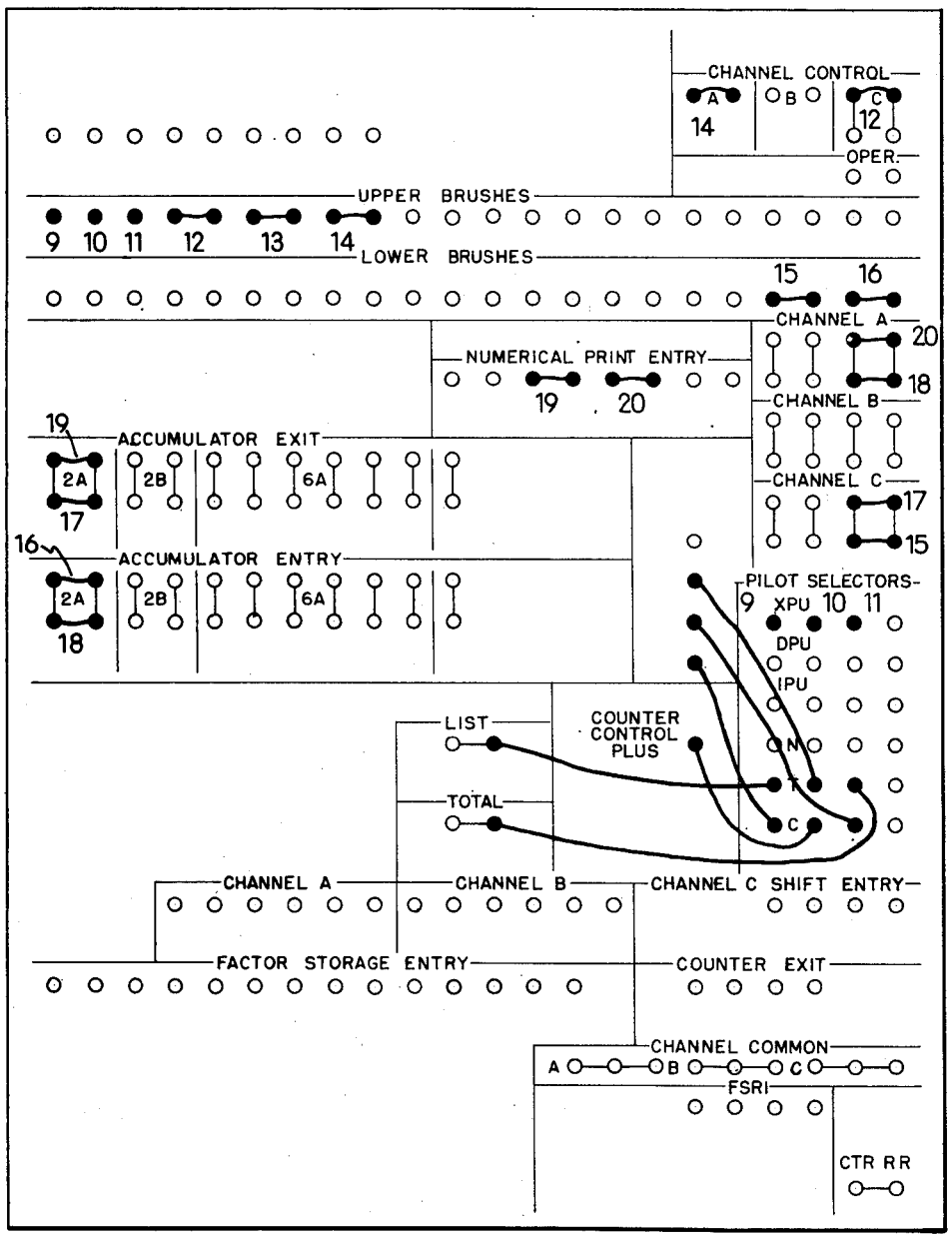

Fig. 23 is a control panel showing wiring in accordance with the circuit in Figs. 22a and 22b.

Figure 24:
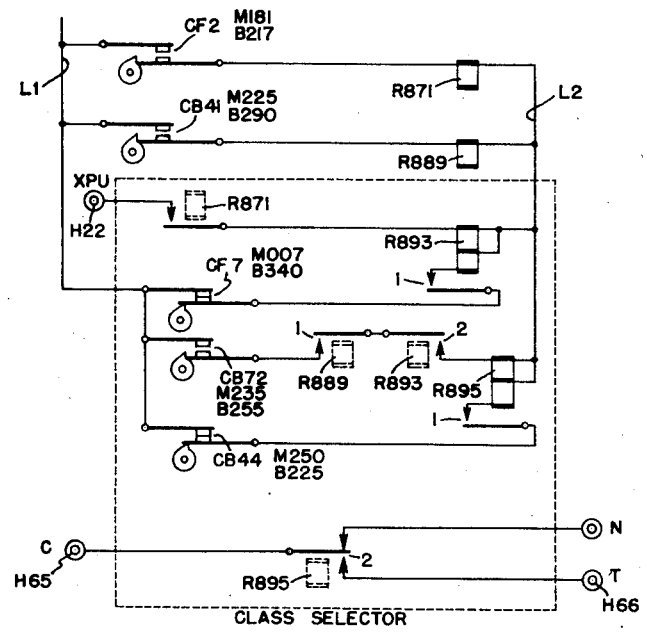

Fig. 24 is a detail circuit of one of the class selectors of the tabulator.

Figure 1:
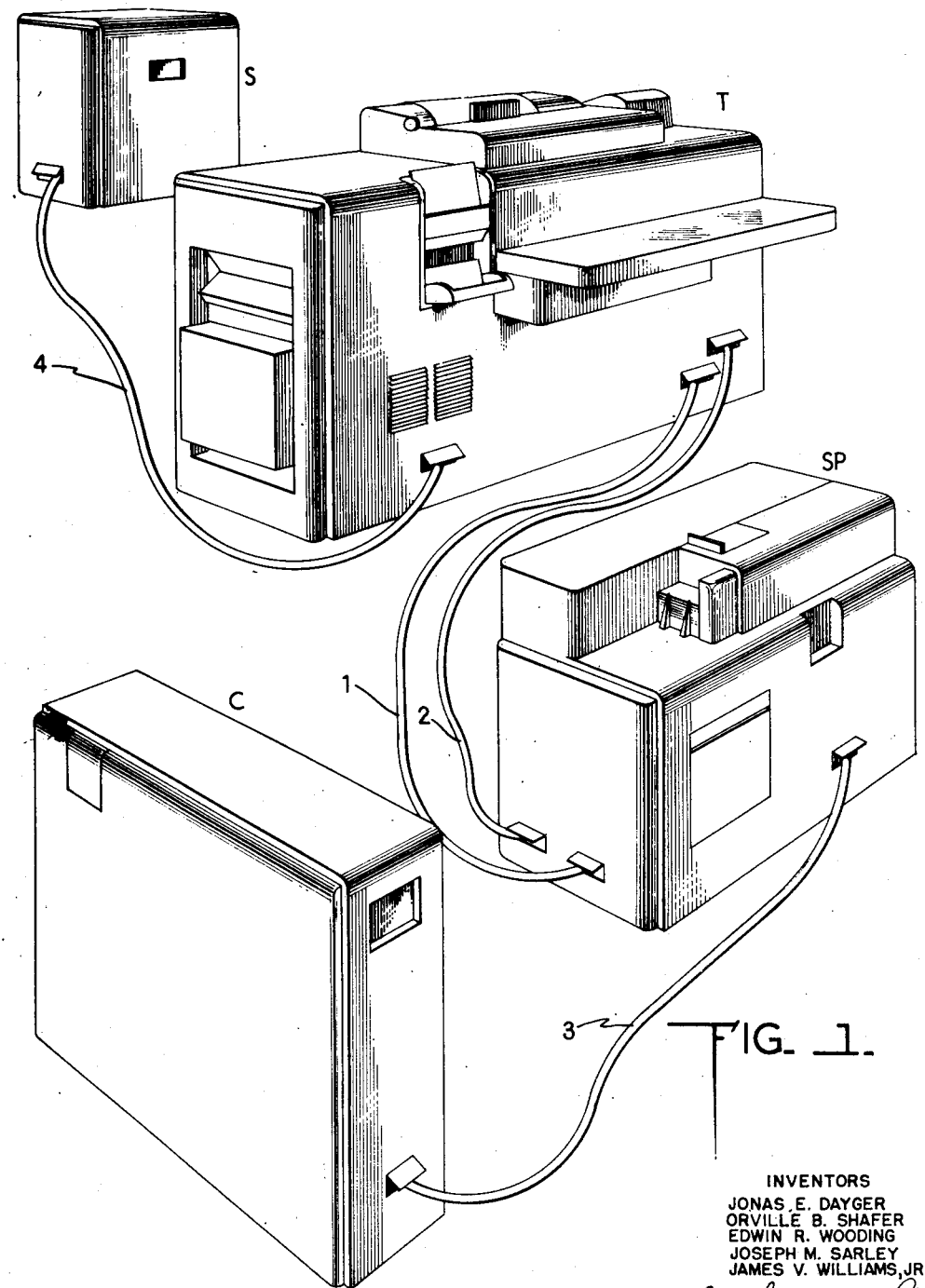
Fig. 1 is a general view of a group of machines constituting an illustrative embodiment of the invention.

The group of machines shown in Fig. 1 comprises a tabulating machine T, a summary punch SP, an electronic calculator C and a storage machine S.

The tabulating machine T is connected by two cables 1 and 2 to the summary punch SP. Cable 1 is the conventional summary punch cable used for punching summary cards from totals stored in the accumulators of the tabulating machine. The wires of cable 2 are normally connected in the summary punch to the wires of a cable 3 leading from the summary punch to the electronic calculator C. In the manner shown in the said Patent 2,573,312, some of these connections can be changed by relays in the summary punch, controlled by a card-originated signal from the tabulating machine, to connect the wires of the electronic calculator to circuits in the summary punch instead of those in the tabulator.

The summary punch does not form a part of the present invention and it can be assumed for the purpose of the further description that the tabulating machine is connected directly to the electronic calculator by the cables 2 and 3.

The tabulating machine is connected to the storage machine S by a cable 4. It will be observed that there is no mechanical connection between the tabulating machine and storage machine and, as will be seen presently, each has its own driving means which is not synchronized with the driving means of the other.

The tabulating machine

The tabulating machine serves as the primary programming means of the group and the means for entering numbers. This is a record controlled machine similar in its general construction and operation to the one shown in Patent 2,340,772. It is controlled by perforated cards of the kind shown in Fig. 10. Each card has parallel columns of index positions. The first eleven index positions of a column are, in ascending order, the 9 to 0 and X index positions. A single perforation in a column in one of the 9 to 0 positions denotes a digital value corresponding to the position; e. g., a perforation in the "5" position represents digit 5.

*Main drive (Fig. 2).*—A motor M has a belt and pulley drive to a shaft 10 which, through worm gearing 11, rotates a main clutch shaft 12. Shaft 12, through gearing 13, rotates a shaft 14 which, in turn, is geared to a shaft 15. On shaft 15 are cams CB for operating CB cam contacts referred to later in the circuit description.

Shaft 14, through bevel gears 16, drives a vertical shaft 17 which, through pairs of bevel gears 18, drives horizontal shafts 20 which operate the accumulators of the tabulating machine, to be described later, in connection with another embodiment.

Figure 2:
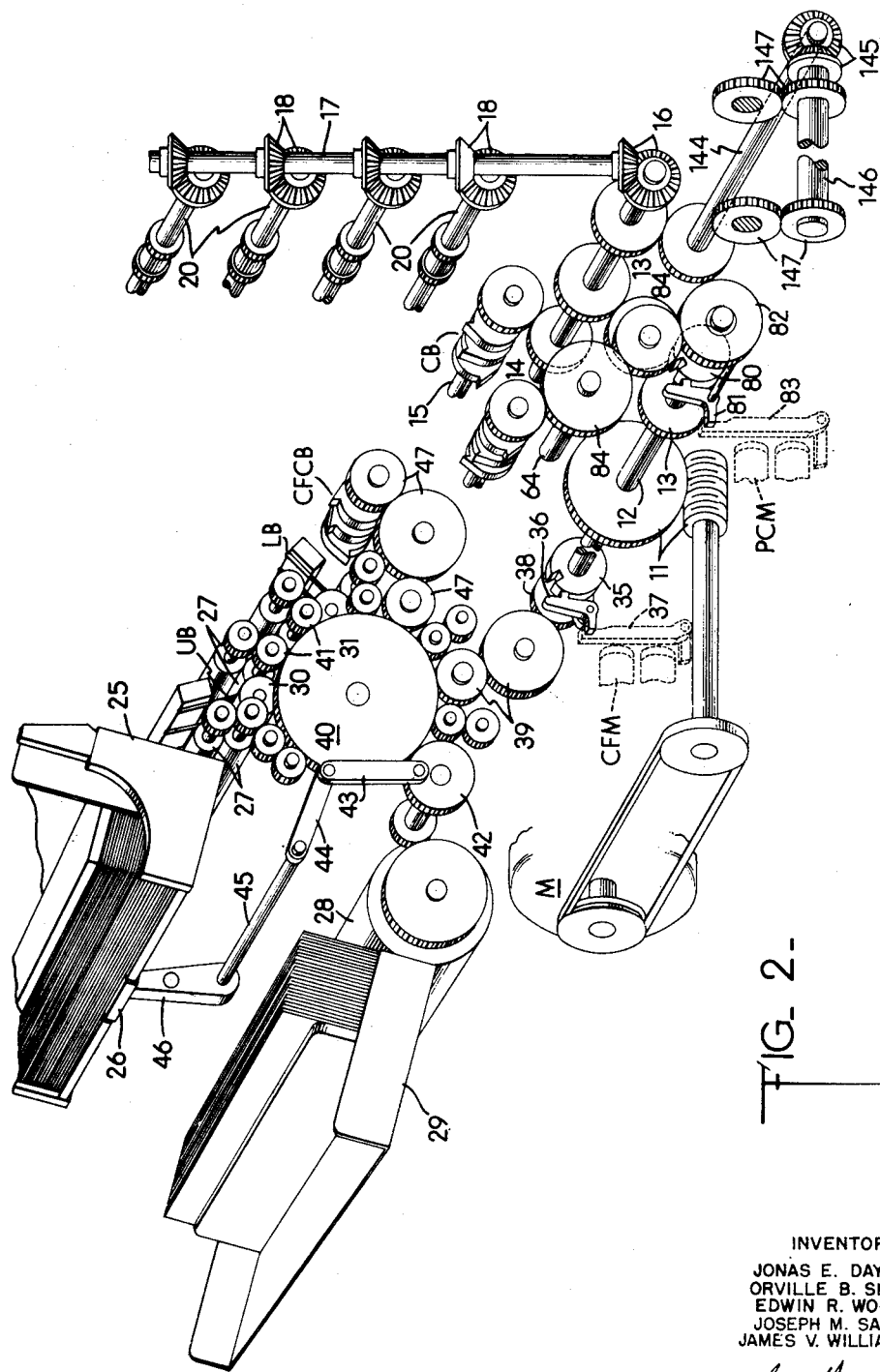
Fig. 2 is a perspective diagrammatic view of the drive mechanism of the tabulating machine.

*The card handling and analyzing section (Fig. 2).*—A set of cards, such as shown in Fig. 10, is placed in a supply hopper 25 (Fig. 2). A picker 26 feeds one card at a time from the bottom of the hopper to the first pair of a plurality of successive pairs of feed rolls 27. The feed rolls feed the card continuously through an upper analyzing station and, one cycle later, through a lower analyzing station, and then to an ejecting drum 28 which deposits the card in a delivery magazine 29. The upper analyzing station comprises a common contact roller 30 and a row of conductive sensing brushes UB. The lower analyzing station has a similar contact roller 31 and a similar row of brushes LB. Each brush is adapted to sense one card column and to engage through a perforation in the column with the common contact roller. The rate of movement of the card is such that the index positions 9 to 0 and X traverse an analyzing station during the first eleven intervals of a cycle (see Fig. 13) and the portion of each interval in which a brush LB or UB engages in a perforation in an index position is indicated by the first line of the timing chart. The cards follow each other at a distance and successive cards traverse an analyzing station during successive cycles. The upper and lower analyzing stations are so spaced that corresponding index positions of a pair of successive cards are at the brushes UB and LB simultaneously.

The card feed means is driven from the continually rotating shaft 12 through releasable clutch means. Referring to Fig. 2, shaft 12 has a driving clutch disk 35 provided with a single notch. Rotatably carried by shaft 12 is a driven clutch assembly including a clutch dog 36 the tooth on which is adapted to enter the notch of disk 35 to couple the driven clutch assembly to the shaft 12 for rotation. The tail of clutch dog 36 is initially latched up by the armature lever 37 of a card feed clutch magnet CFM. When this magnet is energized, lever 37 releases dog 36 which, at a predetermined point of the revolution of the shaft 12 and, hence, at a predetermined point of the cycle, 330° (Fig. 13) engages the notch of clutch disk 35. The driven clutch assembly is thereby coupled to continually rotating shaft 12. The driven clutch assembly includes a gear 38 acting through a gear train 39 to rotate a large gear 40. Gear 40 meshes with gears 41 for driving the feed rolls 27.

Also meshed with large gear 40 is a gear 42 to which is eccentrically connected one end of a link 43 connected at the other end to a crank arm 44 of a shaft 45. The shaft 45 carries an arm 46 for operating the picker 26. Gearing 47 is also provided between gear 40 and the shaft of a plurality of cams CF which operate CF cam contacts referred to in the circuit description.

Thus, as a result of energization of magnet CFM the card picker, card feed rolls, and cams CF are set in operation.

Figure 3:
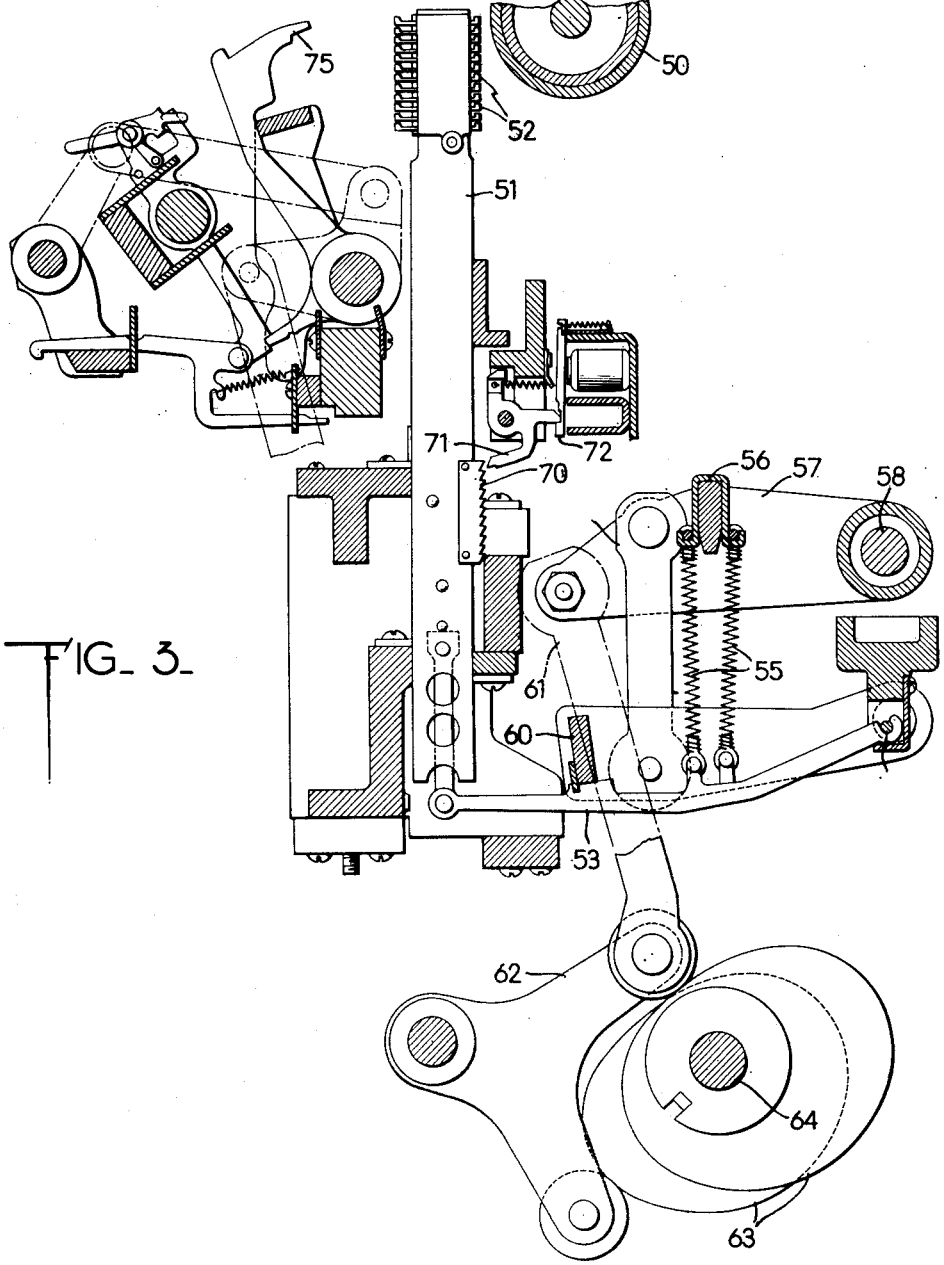
Fig. 3 is a vertical section of the printer of the tabulating machine.

*Recording means (Fig. 3).*—Means are provided to record numbers being fed into the machine, intermediate results, or final results, or all of them. By suitable wiring on the control panel of the tabulating machine all of the numbers passing into or out of the calculating machine can be listed, or only certain ones, under control of the record cards.

The recording means comprises a platen roller 50 around which the sheet to be recorded on is fed. The line spacing or feed mechanism for the sheet and the controls therefor are disclosed in Patents 2,042,342 and 2,199,547 and need not be explained herein. Disposed in front of the platen roller are vertically slidable type carriers 51, each carrying transversely slidable type elements 52 normally held by springs (not shown) in rear positions. The type elements 52, in descending order, bear the types for printing digits 9 to 0 and certain special characters which need not be considered in this case.

Each type carrier 51 is connected at the lower end to an arm 53 pivoted at 54 and connected by springs 55 to a common bar 56. Bar 56 is fixed between arms 57 fast to a shaft 58, only one of the arms 57 being shown in Fig. 3. Connected by links 59 to arms 57 is a restoring bail 60 overlying all the arms 53. A link 61 connects one of the arms 57 to a cam follower 62. The cam follower has two branches each engaging one of the complementary cams 63 fast to a cam shaft 64. During a revolution of shaft 64, cams 63 oscillate follower 62. During counterclockwise movement of follower 62, shaft 58 and arms 57 move clockwise. Restoring bar 60 also moves clockwise while springs 55 force the arms 53 to follow, thereby moving the type carriers 51 upwardly.

The type carriers may be individually arrested in differential positions with selected types at printing position. The arresting means includes ratchet teeth 70 provided in each type carrier and spaced similarly to the type elements 52. Arranged to coact with the ratchet teeth of each type carrier is a pawl 71 held by a latch 72 from engaging the ratchet teeth. Latch 72 is the armature of a print magnet PM. When the magnet is energized, the latch 72 is released from pawl 71, which springs into arresting engagement with a tooth 70 of the type carrier. There is one such arresting means, including a print magnet PM, for each type carrier. A print magnet may be energized under control of perforations in record cards or under control of the accumulator of the calculator during any of the first ten index points of the cycle (see Fig. 13). The energization of magnet PM during the first index point arrests the type carrier with the "9" type at printing position (see the last line of the timing chart, Fig. 13); energization of the magnet during the second index point arrests the type carrier with the "8" type at printing position, and so on. When a type carrier is arrested, the associated arm 53 stops, and connected springs 55 stretch, while actuating arms 57 and restoring bail 60 continue to rock clockwise. After the period during which the type carriers may be set differentially in selected printing position, printing hammers 75 are tripped and strike the type elements at printing position to print the selected data, through a suitable ink ribbon, on the sheet carried by the platen. Before the setting motion of the type bars begins, on any cycle during which the printing mechanism is called into operation the pawls 71 are restored into engagement with latches 72 by restoring means, not shown. The operations of the hammers and of the pawl restoring means are described in Patent 2,079,418 and need not be explained further herein.

The printing means is operated only during desired cycles, either under control of a hole in a record card, or some other signal. The operating means for the printing means comprises a clutch disk 80 (Fig. 2) fixed to the continually rotating shaft 12 and having a single notch adapted to receive the tooth of a clutch dog 81. The clutch dog is carried by a driven assembly, including a gear 82, rotatably mounted on shaft 12. Normally, the clutch dog is latched up by armature lever 83 of print clutch magnet PCM. When this magnet is energized, dog 81 is released, engages the notched disk 80 and couples gear 82 to shaft 12 for rotation. Gear 82 serves, through gear train 84, to rotate previously mentioned cam shaft 64 which carries the cams for operating the parts of the printing means.

*Storage entry (Figs. 5–7).*—In accordance with the invention, means are provided in the tabulating machine to store, temporarily, numbers read out of the calculating machine, the numbers being then immediately transferred to the storage machine. In this way it is possible to insure that the read-out from the calculator does not occur during calculation and it is also possible to use a single read-out of the calculator for control of both printing and transfer to storage. Also, this arrangement simplifies the impulsing means, since only a single set of the more complex calculator read-out cams is needed and the transfer into the storage machine is handled by simpler emitter and CB cam contact groups on the respective storage unit banks.

The temporary storage mentioned is provided by two storage entry units which receive numbers from the calculator alternately. These units are identical, except that one has an emitter on its shaft; therefore a description of one of them will suffice.

Figure 5:
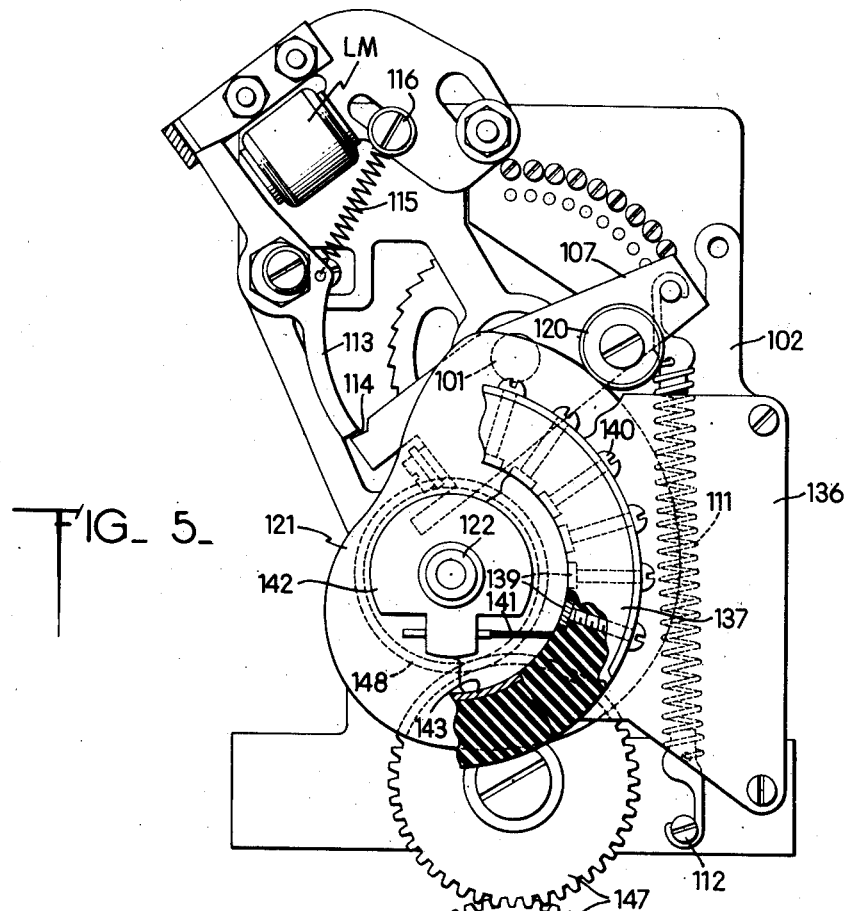
Fig. 5 is a side elevation of a storage unit such as used in both the tabulating machine and the storage machine.
Figure 6:
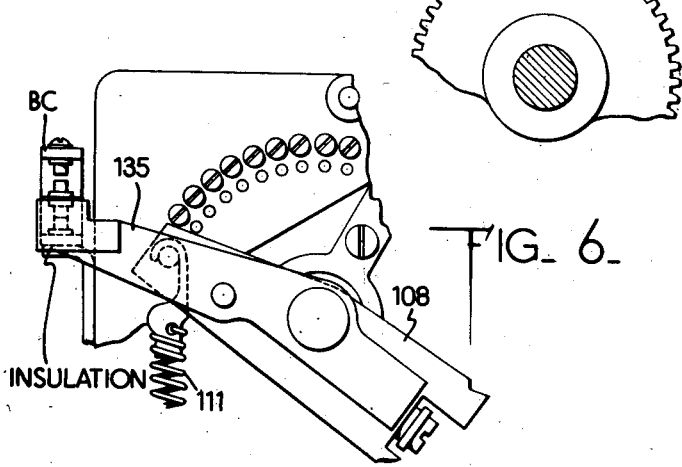
Fig. 6 is a detail view of the storage unit, showing the bail contact.
Figure 7:
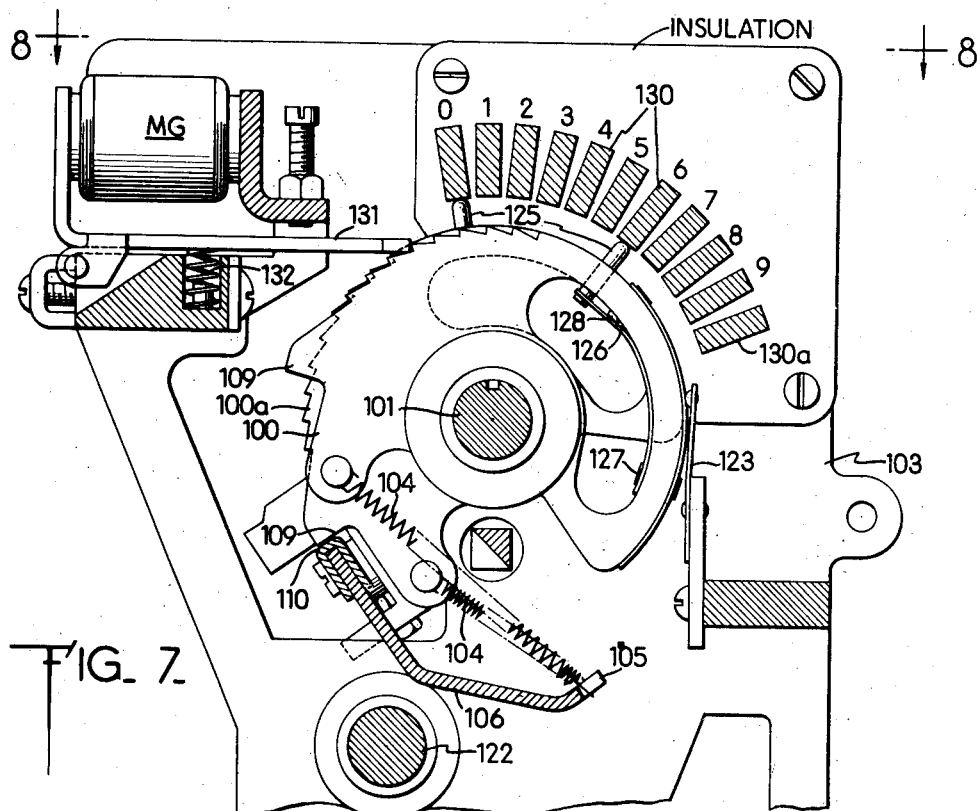
Fig. 7 is a vertical section of the storage unit shown in Fig. 5, on the line 7—7 of Fig. 8.

Referring now to Figs. 5 to 7 inclusive, each storage entry unit comprises a set of eleven ratchet sectors, such as 100, 100a, revolvably mounted on a common shaft 101 supported by side plates 102 and 103. The ratchet sectors are urged in counterclockwise direction by individual springs 104 anchored to respective teeth 105 of the cross bar 106 of a bail, which is rockably mounted by two arms 107 and 108 on the shaft 101. In the normal condition the ratchet sectors are pulled by their springs so that their shoulders 109 bear upon the upper edge 110 of the bail cross bar. The bail is urged to swing in clockwise direction (Fig. 5) by two strong springs 111, each anchored to a stud 112 on the base of the storage entry unit. The bail is normally restrained by a latch 113. This latch stands in front of the end 114 of the near bail arm 107 in Fig. 5, being pulled to that position by a spring 115 anchored to a screw 116. The latch can be released from the bail arm by the energization of a latch magnet LM. The near bail arm has a roller 120 bearing upon a cam 121 fixed to a continuously driven shaft 122. The energization of the latch magnet is timed to occur when the roller 120 rides onto the high part of the cam and the end 114 of the arm 107 is moved out of contact with the latch 113. When the magnet is energized the roller rides down the steep part of the cam and the bail swings clockwise, carrying with it the ratchet sectors 100.

Each ratchet sector has a related column selection contact 123 which slides upon a fixed contact 124 on the ratchet sector. A plunger contact 125 mounted on the ratchet sector by a spring strap 126, which is electrically connected to the fixed contact 124 by rivets 127 and 128, glides over an arcuate array of read-out contact bars 130 as the sector rocks, first in clockwise direction, then in counterclockwise direction. There are 10 read-out contact bars, numbered in descending order 0 to 9, and one idle contact bar 130a.

The digital contact bars have individual wire connections, to be described with reference to the circuit diagram later. Idle contact bar 130a has no electrical connection but serves merely to support the plunger contact in the limit position of the sector, so that it will move smoothly onto the digit 9 contact bar when the return stroke begins.

On the return stroke of the sector it may be stopped in any one of nine different positions by a stop pawl 131 controlled by a stop magnet M. There is a stop pawl and magnet assembly for each sector. The stop pawl is normally held above the sector by a spring 132 and is moved into engagement with the sector when the stop magnet is energized. At the time the impulse to the stop magnet M occurs, during the return stroke of the sector, the plunger contact 125 is moving onto the read-out contact bar 130 identified by digit number with the index point time of the impulse. In Fig. 6 ratchet sector 100 has been stopped by an impulse at 6 time, so that its plunger contact 125 is left in engagement with the digit-6 read-out contact bar 130. If no impulse to the stop magnet occurs during the return stroke of the sector the plunger contact stops on the zero read-out contact bar. The sector 100a is shown in this position.

Figure 8:
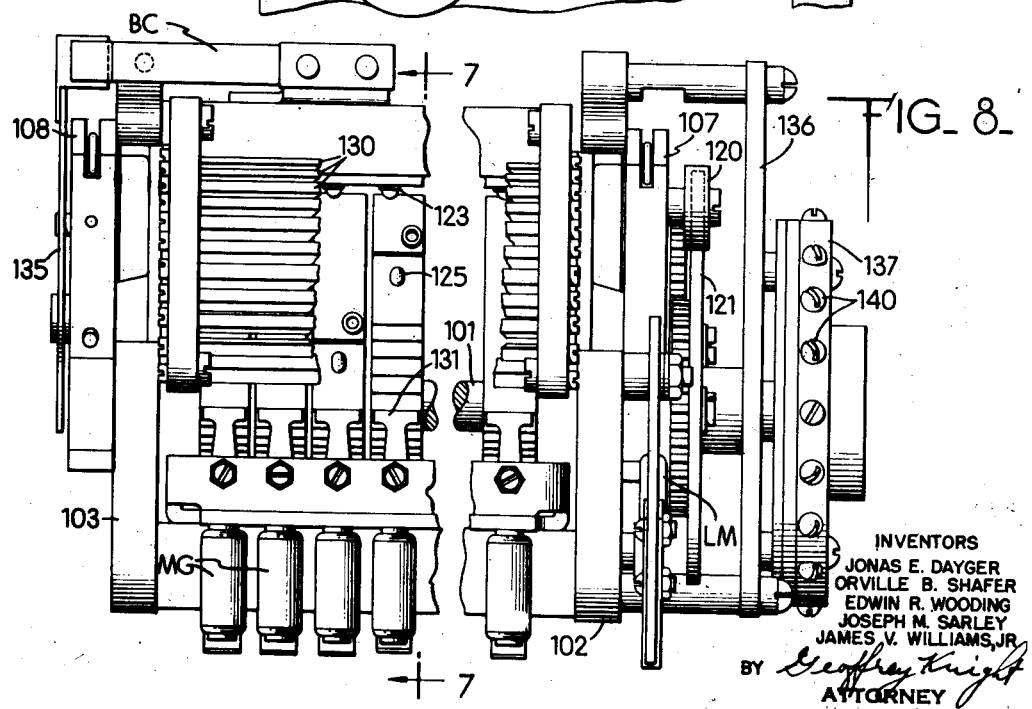
Fig. 8 is a plan view of the storage unit.

Each storage entry unit has mounted on its left-hand side plate (Fig. 8) a contact BC, the central strap of which extends into the path of an arm 135 secured to the bail arm, as shown in Fig. 6. The contact assembly is located so that the arm will hold the center strap in the upper position when the bail is latched, but will allow the strap to move to the lower position, as shown in Fig. 6, as soon as the bail starts an entry cycle. The contact will accordingly remain transferred until the bail completes its forward and return movements.

One of the storage entry units has mounted on an auxiliary side plate 136 an emitter molding 137 with contact spots 139 which can be electrically connected in the circuit by individual screws 140. A brush 141 mounted by means of a hub 142 on the continuously rotating shaft 122 travels over the spots 139, touching the different spots at succesive index point times. The brush is supplied with voltage through a second brush directly behind it and electrically connected to it, which travels on a continuous ring 143 connected to a voltage supply through a circuit to be described.

It will be evident from examination of the construction of the storage entry unit that it will retain a setting as long as the bail remains latched and will be reset as an incident to the entry of a new number into it.

The storage entry units are driven by a shaft 144 (Fig. 2) geared to the shaft 14. The shaft 144, through bevel gears 145, drives a counter shaft 146 geared through two groups of spur gears 147 to respective gears 148 fixed to the shaft 122 of each storage entry unit. Through this drive the shaft 122 is driven continuously and makes one revolution for each cycle of the tabulating machine.

*Auxiliary storage means*

Figure 4:
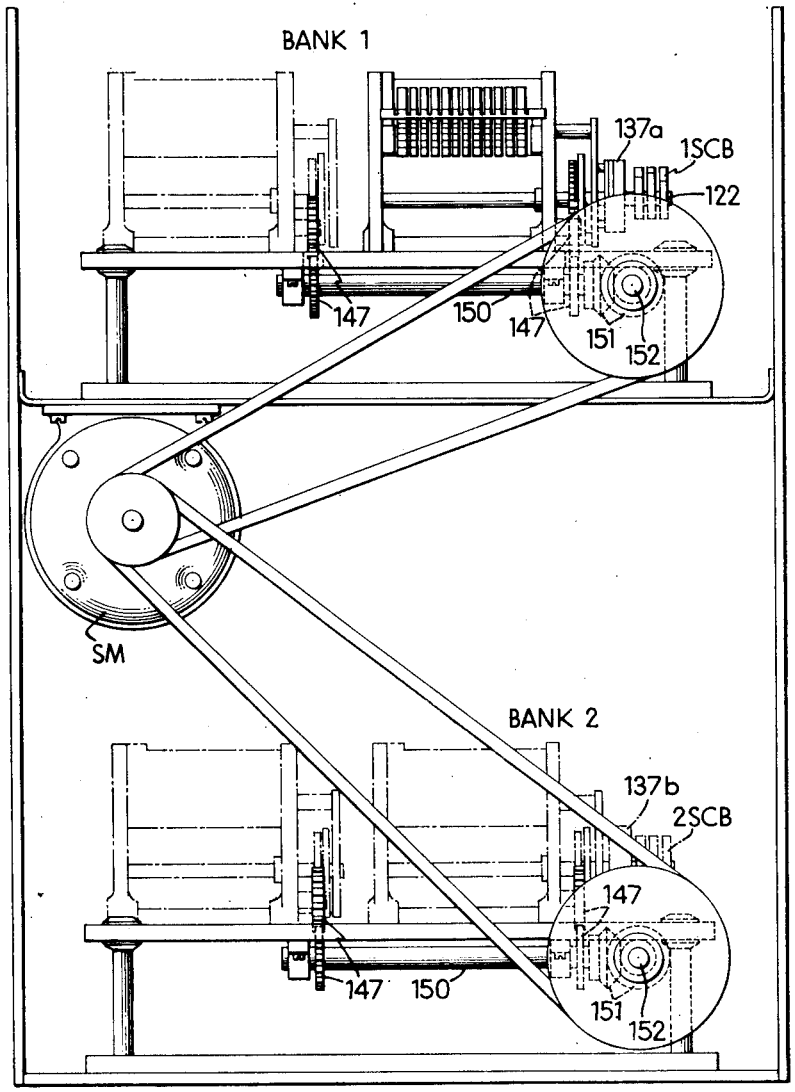
Fig. 4 is an end elevation of a storage machine.

There may be one or more auxiliary storage machines. One of these machines is shown in Fig. 4. It comprises an arrangement of 16 storage units identical to the storage entry units already described. These are arranged in the cabinet S (Fig. 1) and are grouped in two banks, namely, bank 1 on an upper shelf and bank 2 on a lower shelf. In each bank there are two rows with four storage units in each row. Fig. 4 shows the arrangement of the two nearest storage units in each row of banks 1 and 2. The two storage units of each bank which appear in Fig. 4 are driven by a common shaft 150 through groups of spur gears 147 as described for the storage entry units. The shaft 150 is driven through bevel gears 151 by a shaft 152 which extends along the whole bank of storage units and drives each pair of storage units similar to those appearing in each bank of Fig. 4 through the same kind of mechanism. The two shafts 152 are driven through individual pulley and belt drives from a common motor SM. The drive ratio is such that the storage unit cam shafts make approximately three cycles to two of the tabulating machine, but the two banks of the storage unit are not synchronized with each other, nor with the tabulating machine.

One storage unit of each bank has its shaft 122 extended toward the right. On this extension is an emitter 137a, 137b identical to the one shown in Fig. 5, and also a set of cams 1SCB and 2SCB, which operate storage machine CB contacts to be referred to later.

*Electronic calculator*

The electronic calculator is similar to one fully disclosed in the copending application of R. L. Palmer et al., Serial No. 38,078, filed July 9, 1948. It comprises an arrangement of triggers, switch tubes, power tubes, inverters, and a multi-vibrator.

A trigger is a circuit comprising two vacuum tubes interconnected so that either one may be conducting and the other will be off. The trigger can be switched from one condition to the other by applying a negative pulse to the grids of both tubes, by applying a plus voltage condition to the grid of the non-conducting tube, or by removing the bias from the grid of one tube for resetting the trigger to a normal condition.

A switch tube is a tube having two control grids and requiring a plus condition on both grids to make the tube conduct.

The multi-vibrator supplies the basic operating pulses for the calculator. There is a series of "A" pulses occurring at the rate of 50,000 per second, and a series of B pulses occurring at the same rate, but 180° out of phase with the "A" pulses. The pulses operate a primary timer circuit, which is a series of triggers interconnected in a so-called "ring circuit" so that only one trigger will be on at any one time and the other will be off. The circuit is reset to a condition where the first trigger of the ring is on and when A pulses are applied the triggers are switched on in succession, each trigger being switched off as the next one is switched on.

The primary timer is a ring of 23 such triggers. It has tapped outputs from the various triggers to produce pulses or voltage conditions at certain times in the primary cycle. These are used for controlling gating circuits to transmit a definite number of A or B pulses to a circuit element, or to operate a circuit element directly.

The calculator circuit comprises electronic counters, each consisting of a group of four triggers interconnected so as to go through a sequence of combinational conditions in binary fashion, the sequence being however modified so that on the tenth step the counter gives an output pulse and returns to the zero condition.

Several counters are combined with carry means to form an electronic accumulator. There may be any desired number of counters in the accumulator, the circuit of this application showing 4, by way of illustration. The accumulator is the part of the circuit where the results of calculations are formed.

There are also storage devices composed of electronic counters not interconnected by carry means, such as the FS2 and FS4 storage devices referred to particularly herein.

A commercial electronic calculator as disclosed in said application, Serial No. 38,078, comprises circuits for carrying out all the kinds of calculations, including addition, subtraction, multiplication, and division. In the present application only the circuits for addition are shown, by way of illustration.

In addition to the internal operating means of the electronic calculator, it is provided with means whereby it can be controlled by the tabulating machine to receive numbers into the factor storage devices, such as FS2 and FS4, to read out numbers from the accumulator, and to program the calculating operations. During the calculating cycle the program is controlled by the internal circuits of the calculator, but the program is set up during the read-in portion of the tabulating machine cycle by card-originated signals from the tabulating machine.

The internal programming of the calculator is controlled by program means having pluggable hubs shown at the left side of Fig. 12, which is the control panel of the calculator. The program hubs are in horizontal rows of four hubs to a row. Each horizontal row is called a program and there are 40 programs shown. There are three exit hubs and one suppress hub, labelled SUP, in each program row. The exit hubs are connected by plug wires to selected function control hubs in the middle of the control panel. For example, program 1 has one exit hub plugged to "Factor Storage Read-Out —2" and another plugged to "Accumulator Control—Read-In +," while program 2 has an exit hub plugged to "Factor Storage Read-Out —4" and another to "Accumulator Control—Read-In +."

The program means has a basic timing controlled by the primary timer such that it steps from one program to the next at the beginning of each primary timer cycle. Except for other controls to be mentioned the program exit hubs would be made active in succession, with the step from one to the next occurring at the beginning of each primary timer cycle.

An exception to the basic program timing occurs when a multiply or a divide function is called for. In either of these cases the stepping of the program means is delayed until the end of the multiplication or division, when a signal is given to start it again.

The preferred method of controlling the programs is to wire all of the functions which are to be performed and to provide means normally suppressing each of the wired programs. Then, by unsuppressing a particular program group the calculator will perform the functions wired from that group and will skip the functions wired to the other groups which remain suppressed.

For this purpose the groups of suppress hubs are wired to respective calculate selectors (Calc. Sel.) at the right side of the plug board. The selector hubs are connected to the points of selector relays, which are controlled by the "Operation" field of the card in a manner to be described. The common hubs of the selectors are plugged to a hub labelled "Suppress Without Bal. Test," which is simply connected to +150 volts. The normal hubs of calculate selector No. 1 are plugged to the suppress hubs of programs 1 and 2. The normal hubs of calculate selector No. 3 are plugged to the suppress hubs of programs 3 and 4. By means of control circuits to be described presently an operation identified by a "1," hole will operate calculate selector 1, removing the connection between the common hubs and the normal hubs and eliminating the suppression of programs 1 and 2 for that card cycle. Similarly, an operation identified by a "3" hole in the "Operation" field will pick up calculate selector No. 3 and unsuppress programs 3 and 4 during that card cycle.

While the program will normally run through 20 or 40 steps, for each card cycle, dependent upon switching means, the steps which have no wiring from their exit hubs, will of course, have no effect. Likewise, the exit hubs of those programs which are suppressed for a particular card cycle will have no effect in that cycle.

*Operation and circuit*

The operation of the machine will be illustrated by the following problem:

$$x = ak + b + dh + e$$

The factors $a$, $b$, $d$, and $e$ will first be read into storage units and will be called out during the computation of the problem. The sum: $ak+b$ will be stored in a storage unit while the sum $dh+e$ is being calculated, then $ak+b$ will be taken out of storage and added to $dh+e$. The The problem is not typical, but is selected in order to show in a simple way how factors are put into storage units and called out for use in computation.

In a commercial machine the capacity of the storage entry units and the storage units is ten digits and a sign, but only four digit capacity is shown in the circuit diagram. Likewise, only four of the sixteen storage units are shown, two in each bank. The storage unit selector circuits are correspondingly reduced in the circuit diagram.

The punching of the cards is shown in the planning chart, Fig. 9 and the first five cards of the set are shown in Fig. 10. Card 1 has a "0" in the tens column of the "Channel A" control field, a "0" in the tens column of the "Channel B" control field, a "1" in the "Operation" field, "21" in the "Channel C" control field, and "5" in the "Card Entry Into Channel A" field.

The machine is set in operation by closing the start switch ST (Fig. 16d), which completes a circuit from line L1 through the stop switch SP, start switch ST, the pick up coil of the start relay, to line L2, energizing said relay. A hold circuit is completed for the start relay from L2 through the hold coil, start-1, stop switch SP, to L1.

Start-2 closes and at 282° CB21 completes a circuit from L1 through CB21, start-2, normally closed R91B, the pick up coil of R656, to L2, energizing said relay. A holding circuit for the relay is extended from L2 through the holding coil of R656, R656-1, and CB24 (Fig. 16d) to L1, whereby the card feed clutch control relay is held up until 225° of the next cycle.

R656-2 closes, preparing a circuit which is completed at 293° from L1 through CB27, R656-2, the card feed clutch magnet CFM, to L2, energizing said magnet and initiating a card feed cycle. The card feed clutch will be energized in each cycle until the stop switch is opened, unless an idle cycle is called in, as will be explained later. It will be evident to those skilled in the art that the card feed clutch control circuit as shown is much simplified, as compared with a standard tabulating machine circuit, the additional controls having been eliminated to simplify the description.

Figure 16A:
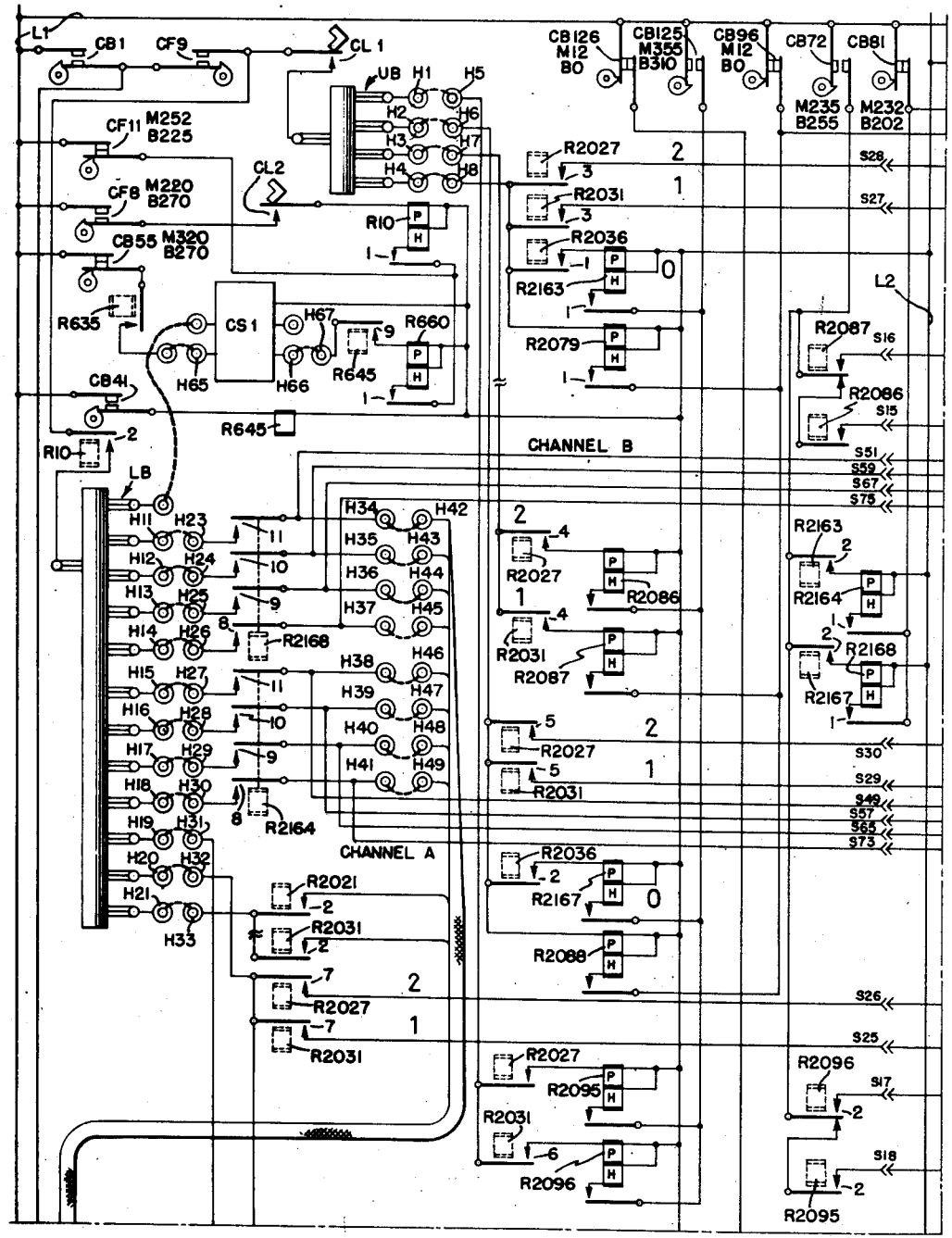

With the card feed in operation the first card is fed out of the hopper and arrives at the upper brush station, closing the card lever contact CL1 (Fig. 16a).

Figure 11:
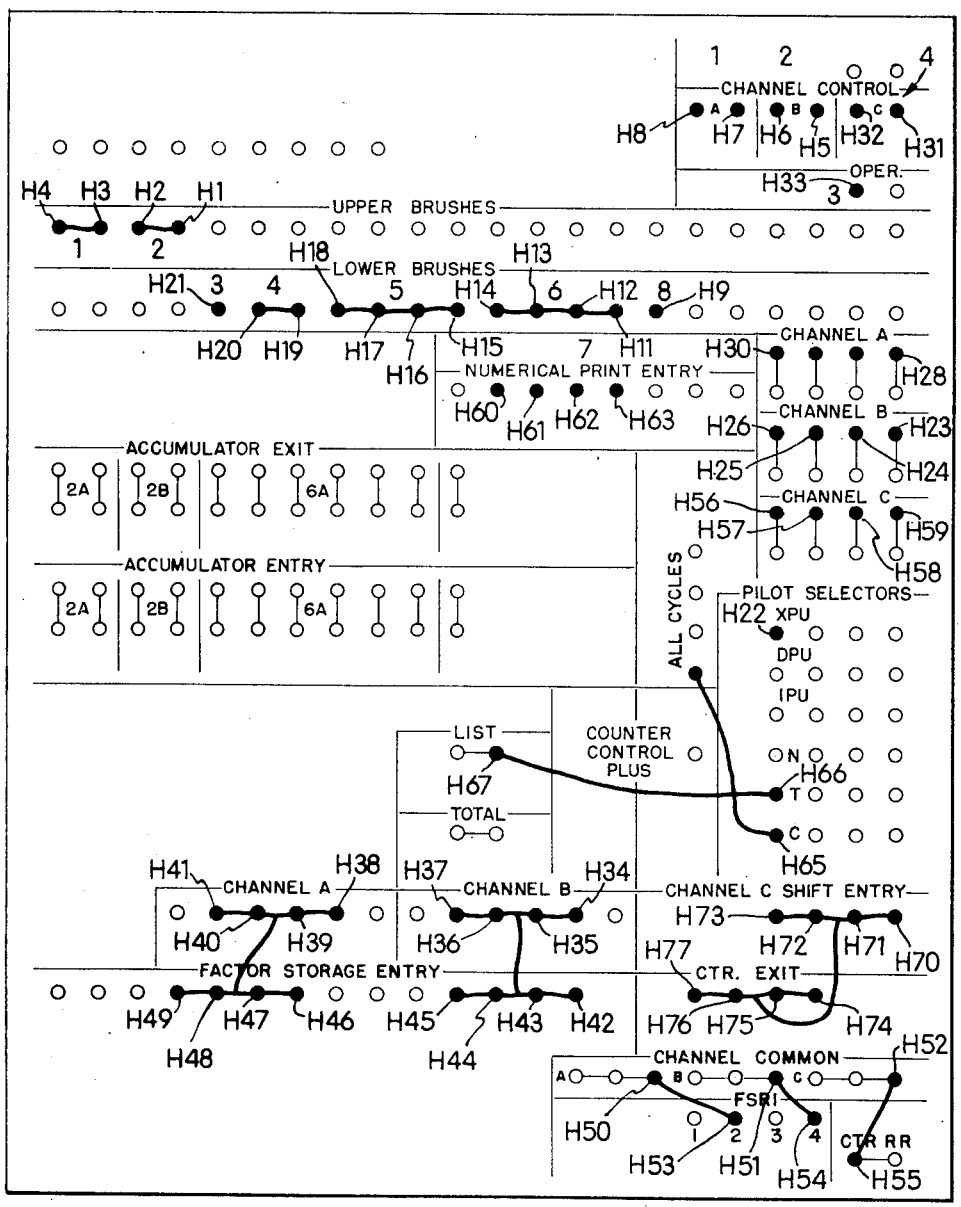
Fig. 11 is the tabulating machine control panel showing wiring.

As shown in the control panel diagram, Fig. 11, the "Channel A" and "Channel B" control fields are wired to the upper brush hubs, while the other columns are wired to the lower brush hubs. The cycle during which card 1 passes the upper brushes will be called the first card cycle. During this cycle the circuits will be conditioned for reading out from the "Card Entry Into Channel A" field and from the "Card Entry Into Channel B" field during the second card cycle.

Factor $a$, in the "Card Entry Into Channel A" field will be transmitted during the second cycle into FS2, but the "Card Entry Into Channel B" field is blank and will transmit nothing.

*Digit Relays*

The tabulating machine is provided with a set of digit relays (Fig. 16c) R2001, R2003, R2006, R2009, R2013, R2017, R2021, R2027, R2031 and R2035 which are energized in succession during respective index point times 9 to 0 inclusive. For this purpose the emitter 137 (Fig. 5) is provided. Through respective contact spots 139, numbered 9, 8, . . . 1, 0 in Fig. 16c, the pick up coils of the digit relays are connected in succession by the brush 141 to a common contact ring 143. This contact ring is connected to line L1 at successive index point times by CB107, completing circuits to the different digit relays at the respective index point times. The time during which each relay remains energized is determined by its holding circuit through CB108. Thus the "5" relay R2013, for example, remains energized from 73°, when CB107 closes, until 90°, when CB108 opens. For the other relay times see CB107 and CB108 in Fig. 13.

*Factor Storage Control*

At 0 time of cycle 1 a circuit is completed from line wire L1 through CB1, which closes at every cycle point from 10 through 0, X, R and Carry; thence through CF9, closed from 9 through R when the card feed is operating; CL1 which closes when the first card approaches the upper brushes and remains closed as long as cards keep feeding; contact roll 30, hole in the card, upper brush of column 1, upper brush hub H4, plug wire, the "Channel A" hub H8, R2036–1, closed at 0 time, through R2163 pick up coil, to the line wire L2, energizing R2163. The circuit also extends through the pick up coil of relay R2079 to wire L2, which relay also becomes energized.

Contact R2163–1 extends a circuit from wire L2 through the holding coil of R2163 and CB125 to wire L1, whereby relay R2163 remains energized until 310° in the first card cycle. A circuit for the hold coil of R2079 extends through R2079–1 and CB96 to wire L1.

Similarly at 0 time a brush impulse is transmitted from the tens column of the "Channel B" control field (column 3) through the upper brush hub H2, plug wire, "Channel B" hub H6, R2036–2, relay R2167P, and by parallel circuit through relay R2088P, to wire L2, energizing said relays. R2167 holds up through R2167–1 and CB125 and R2088 through R2088–1 and CB96.

At 235° in the same cycle a circuit extends through CB72, R2163–2, and the pick up coil of relay R2164, also through R2167–2 and relay R2168, to wire L2, energizing said relays. R2164–1 and R2168–1 close, establishing holding circuits for R2164 and R2168 through CB81, which remains closed until 202° in the second cycle. R2164 points 8, 9, 10, and 11 close, connecting the "Channel A" plug hubs H27—H30 to the plug hubs H38—H41, respectively, which are connected by plug wires to the factor storage entry plug hubs FS2, numbered H46—H49. R2168 points 8, 9, 10, and 11 close, connecting "Channel B" plug hubs H23—H26 to plug hubs H34—H37, which are wired to the factor storage entry plug hubs FS4, numbered H42—H45.

*Factor Storage Reset*

Before entry into a factor storage device of the calculator, the storage device is reset to zero. This operation is controlled by a reset control trigger, there being a reset control trigger for each factor storage group and the one for FS2 being shown at 4–1F (Fig. 16j). The minus 100 volt bias supply to the right grid of each reset control trigger is through a resistor to wire C33 which leads through calculate reset CB115 to the minus 100 volt source. CB115 opens at 240° to allow the right grids of the reset control triggers to rise toward ground potential and reset the triggers to the right, whereupon the bias is reestablished by closure of CB115 at 252°.

Returning to the illustrative example, when relay R2079 is energized its contact R2079–2 (Fig. 16d) prepares a circuit through which an impulse passes from CB80 at 343° of the first card cycle from "Channel A Common" hub H50, plug wire, to FSRI–2 hub H53, wire C26, through a resistor to the left grid of the FS2 reset control trigger 4–1F, switching this trigger to the left, that is, making its left tube conduct and its right tube turn off. The potential on the right plate of this trigger rises and a plus impulse is transmitted through a condenser to the grid of an inverter 4–3E. This inverter emits a negative impulse which is inverted (by means not shown) and applied to the right grids of all the triggers of the FS2 counters, in the manner described in said application, Serial No. 38,078, resetting the counters to zero. There are four counters of the FS2 factor storage device shown in Fig. 16j; they are represented by the stage #1 triggers 4–4H to 4–4L and the stage #8 triggers 4–7H to 4–7L, the dotted lines representing two omitted stages of each counter, #2 and #4.

While nothing is to be entered into FS4 during the second cycle, this counter group is reset to zeros in the same way as FS2. The resetting impulse comes from CB80 through R2088–2, H51, plug wire, FSRI–4 hub, H54, and wire C58, to the left grid of the reset trigger (not shown) of FS4.

During the first cycle no circuit is completed to the operation control hubs and, as will become apparent presently, this causes the calculator to go through an idle cycle.

*Entry into factor storage*

When card No. 1 approaches the lower brushes LB it closes a card lever contact CL2, and a circuit is then completed from L1, through CF8, closed at 220°, CL2, the pick up coil of relay R10, energizing said relay. A holding circuit extends from L2, through the holding coil of R10, R10–1, and CF11, to hold R10 until 224° in the next cycle. R10–2 closes, preparing a circuit arm to the lower brush contact roll from L1, through CB1, CF9, and R10–2.

R10–3 closes, preparing a circuit which is completed at 320° from L1, through R10–3, CB85, relay R2123, to L2, energizing said relay. R2123 holds up through its 1 point and CB42a until 327° of the next cycle. R2123–5 closes, preparing a circuit from the +50 volt supply to certain Thyratron circuits to be referred to later.

Entry into the FS2 counters during cycle 2 is determined by the condition of entry triggers 4–1H to 4–1L (Fig. 16j). These triggers and the entry triggers of all the other storage groups, such as FS4 (not shown) are reset to their right sides at the same time and by the same means (including the calculate reset CB115) as the reset control triggers described above. The left grid of the units FS2 entry trigger 4–1L is connected through a resistor by wire C31, FS2 storage entry hub, H46 (Fig. 16a), plug wire, hub H38, R2164–11, channel A hub H27, plug wire, hub H15, to the brush reading the units column of the "Card Entry Into Channel A" field. At 5 time this brush reads a hole in the card and a plus impulse is transmitted from the wire L1, through the previously traced circuit arm to the lower brush contact roll, through the hole in the card and the connections to the left grid of the FS2 units entry trigger 4–1L, just described, switching the trigger to the left.

Plus voltage appearing on the right plate of the trigger is applied to the grid G2 of read-in switch 4–2L, conditioning this switch to transmit to the units order counter of FS2 the remaining 5 read-in pulses of a group of 9 mid-index read-in pulses which are applied during this cycle to the grid G1 of the switch 4–2L, by means now to be described.

The 9 mid-index CB impulses are derived from a trigger 1–8L (Fig. 16j). This trigger, also, has its right grid resistance-connected to the minus 100 volt bias line through wire C33 and the calculate reset CB115, and is accordingly reset at 240° of each card cycle.

The trigger 1–8L is switched to the left by mid-index pulses from L1 through normally closed R2128–2 and R648–7, CB94, CB98, closed at 13°, and wire C17 leading through resistance coupling to the left grid of trigger 1–8L. The trigger is switched off by index line pulses from L1 through R2128–2, R648–7, CB87, CB90, closed after 23°, and wire C3, which is resistance coupled to the right grid of trigger 1-8L.

Each time the trigger 1-8L switches to the left at mid-index time a minus pulse is transmitted from its left plate through a condenser to the grid of a power tube 1-9L, causing a positive impulse to be transmitted from the plate of this tube to the grid G1 of each read-in switch 4-2H to 4-2L of FS2. (Also to the grids G1 of similar switch tubes (not shown) for the counters of all the other storage groups, such as FS4. This pulse is ineffective unless one of the switch tubes has plus voltage on its grid G2, which occurs when a brush impulse is transmitted from the corresponding column, as described above, and switches the corresponding entry trigger, such as 4-1L, to the left. There are 9 mid-index pulses transmitted to the grids G1 of the read-in switch tubes during one read-in cycle, the first one occurring at one-half after 9 and the last one at one-half after one.

In the particular example the grid G2 of the units read-in switch of FS2 goes plus when the related entry trigger 4-1L is switched left by a brush impulse at 5 time applied to its left grid through wire C31, as described above. At this time 5 mid-index pulses remain to be applied to the grid G1 of switch 4-2L and accordingly 5 negative pulses will be transmitted from the plate of this switch to the units counter 4-4L to 4-7L of FS2, stepping it from 0 to 5.

The other read-in switches of FS2 and the read-in switches of FS4 are not conditioned at their grids G2 by any brush impulse and therefore none of the read-in CB pulses is transmitted to any of the other counters of these factor storage groups. At the end of read-in time of this cycle FS2 stands at 0005 and FS4 stands at 0000.

Factor storage control—Card 2

Also, during the second cycle, the upper brushes in the tens columns of the channel A and channel B control fields read zero holes and set up the control circuits for card entry into channels A and B in the same way as in the first cycle.

Operation control

In the second card cycle a "1" hole is sensed at the lower brushes in the "Operation" field. That is to say, an impulse passes through the brush of this field (Fig. 16a) at "1" time, and through relay R2031-2, wire C49, "Calc. Sel. 1" coil (Fig. 16j) to wire L2, energizing said selector. A hold circuit is established through point 1 of "Calc. Sel. 1," wire C57 and CB94, whereby the selector will hold up until 310° in the second card cycle, that is, until the end of calculate time.

Channel C control

During the reading part of the second card cycle controls are set up to determine the storage unit into which factor $a$ is to be sent. In "Channel C" control field the lower brushes read "21."

At 2 time a brush impulse passes through H20, plug wire, to the tens hub H32 of "Channel C" control, through R2027-7, closed at this time, and wire S26 to the pick up coil of R139 and wire S153, energizing this relay. A holding circuit for the relay is established from wire S153 through the holding coil, R139-1, wire S48, and CB96 to wire L1, whereby the relay will be held until 360° of the second cycle. The relay points R139-2 and R139-3 close, establishing circuit arms through one of which a storage selector relay will be energized.

At 1 time a brush impulse passes through H19, plug wire, through the units hub H31 of "Channel C" control, R2031-8, R2108P to wire L2, energizing said relay. A hold circuit is established from wire L2, through the hold coil of R2108, R2108-1, CB126, to wire L1, which will hold the relay until 360° of the second cycle.

When the 2 impulse was transmitted to the tens hub of "Channel C" control it also passed through the pick up coil of R2108 to wire L2, energizing said relay. A hold circuit was established from wire L2 through R2108 hold coil, R2108-1 and CB126 to wire L1, to hold the relay until 360° in the second cycle.

Further operations to select the storage unit occur later in the second cycle, after the calculate sequence now to be described.

Calculate sequence

At 177° of the second cycle the program reset CB116 (Fig. 16d) opens to remove —100 volts from wire C35 and allow the primary timer (Fig. 16i) to restore to step 1 and the program timer (Fig. 16j) to reset to the home position P. G. H.

Figures 16E, 17:
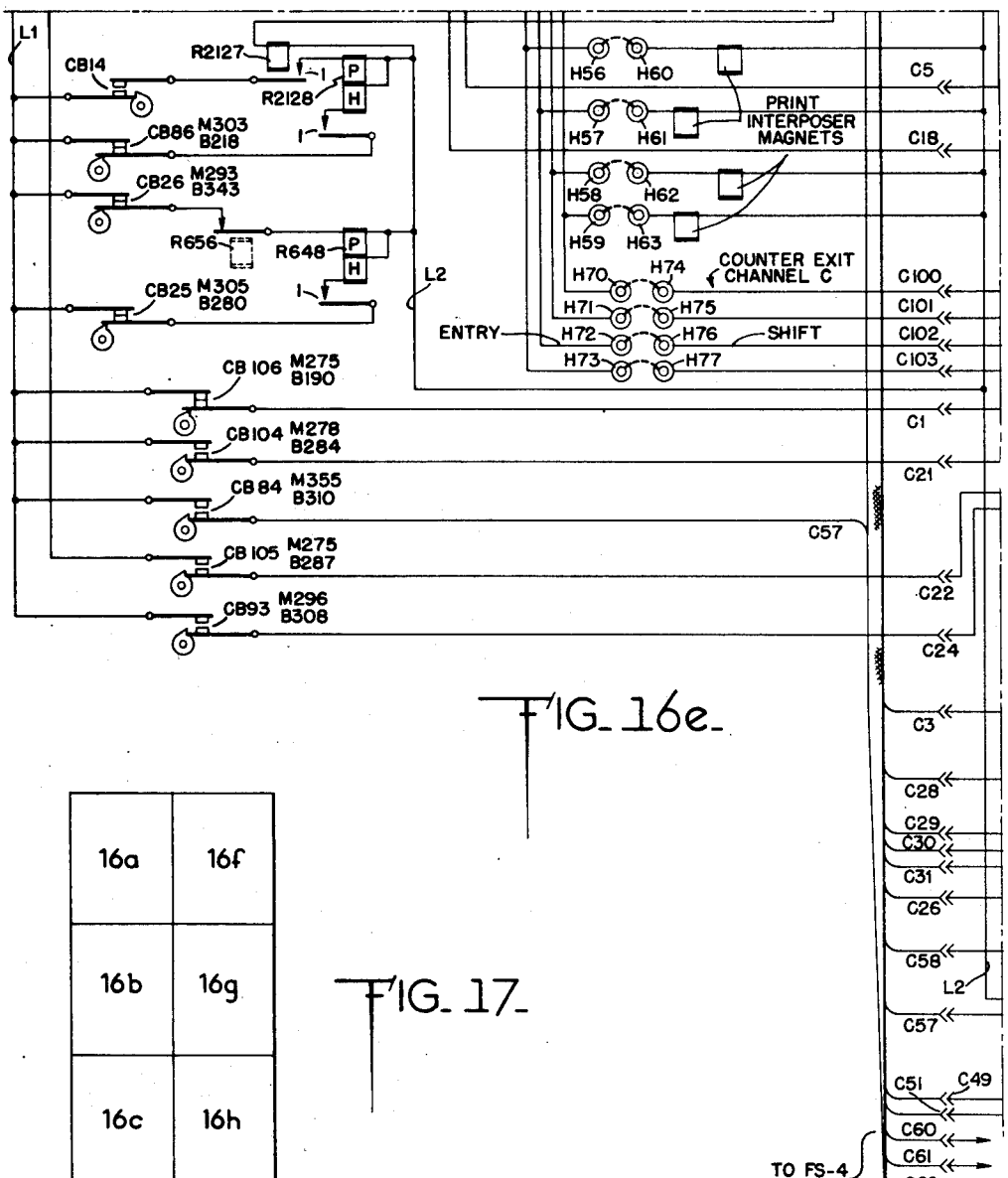

The machine is now ready to start a calculation sequence in which factor $a$, stored in FS2, will be added into the accumulator. This begins at 190°, when CB106 (Fig. 16e) opens, removing plus 40 volts from wire C1 connected to the grid of an inverter 1-6M (Fig. 16i). The resulting reduction of voltage on this grid causes a rise of the plate potential, which is transmitted through a resistor to the left grid of the compute start trigger 1-10E, turning this trigger on. The trigger 1-10E had been turned off during the first card cycle by a plus impulse from CB104 (Fig. 16e) at 278°, through wire C21 and a resistor to the right of the trigger.

A negative impulse from the tapped left plate resistor of this trigger is transmitted through a condenser to the right grid of a compute start-stop trigger 1-5L, turning it on. Plus voltage from a tap on the right plate of the compute start-stop trigger 1-5L is transmitted to the grid G2 of a tube 1-5K making this switch tube responsive to plus A pulses applied to its grid G1 from the A-pulse source diagrammatically indicated. These pulses are transmitted as minus A pulses from the plate of this switch to the grid of a power tube 1-5J. Plus A pulses from the plate of the power tube are fed to the primary timer ring circuit T1 to T23. These pulses cause the primary timer to step along at A-pulse frequency, in the manner described in said copending application, Serial No. 38,078. Timed impulses or voltage changes at the different stages of the primary timer control the calculating functions.

At the beginning of the calculating sequence the factor $a$ (5) stands in FS2, FS4 stands at zero, and the four counters 3-9N —3-6N, 3-9P —3-6P, 3-9Q —3-6Q, 3-9R —3-6R, of the accumulator stand at 9's (complement of zero), to which they were restored when power was turned on, by means described in said application, Serial No. 38,078. With calculate selector 1 energized, programs 1 and 2 will be effective and all other programs will be suppressed or ineffective.

Program 1

At 2AB time, as soon as the first A pulse is passed to the primary timer, a plus 2AB impulse is applied to grid 1 of switch tube 2-4F (Fig. 16j). Grid 2 of this switch tube is always at plus voltage, except when a multiplying or dividing operation is under way. Consequently the plate of the tube 2-4F transmits a negative 2AB pulse to the grid of a power tube 2-3F. The program timer ring PGH, PG1 to PG20 stands on PGH at this time, as above stated. The plus 2AB pulse emitted from power tube 2-3F steps the program timer ring to PG1. A reduced voltage on the left plate of PG1 is applied to the grid of inverter 2-1B2. At this time a reduced voltage is also applied to the program 1 suppress hub, since calculate selector 1 is energized and +150 volts supplied at the "Suppress Without Bal. Test" hub is removed from the grid of 2-1B1, allowing it to go negative and cut off the tube. Since both 2-1B1 and 2-1B2 plates are plus, the grids of all of the program 1 inverters 2-1A1, 2-1A2 and 2-1C1 are at plus potential and the reduced voltage on their plates is extended to the program 1 hubs.

*Reading out FS2 onto exit channel*

One of these program 1 hubs is connected to an "FSRO-2" hub. This hub is connected to the grid of inverter 1-1Z1, the plate of which accordingly applies plus voltage to the grids G2 of the read-out switches 4-3H, 4-3J, 4-3K and 4-3L of FS2.

A gating circuit identified as "11A—20A gate" is conditioned by the primary timer to transmit plus A pulses from 11A to 20A time. These plus pulses are applied to the grids G1 of the read-out switches 4-3H to 4-3L of FS2 and each pulse causes a negative pulse to be emitted from the plate of each of these switch tubes. The negative pulses are applied through capacitive coupling circuits to the right and left grids of the four stage-1 triggers 4-4H, 4-4J, 4-4K, 4-4L of the FS2 storage counters. These counters are stepped forward by the A pulses and emit negative impulses from the left plate terminals of their stage-8 triggers to the respective wires of the exit channel at times dependent on the values stored in them before the pulsing began. Since the thousands, hundreds and tens counters stood at 0, they will not emit a pulse to the exit channel wire until the tenth A pulse. The units counter, on the other hand, which stood at 5 when the pulsing began, will emit an impulse to its exit channel wire on the fifth A pulse. The pulses on the exit channel wires will control the entry into the accumulator in a manner now to be described.

*Entry into the accumulator*

A second hub of program 1 is connected by a plug wire to a hub "CTR RI +" connected to the grid of an inverter 1-9Z. A resulting plus issuing from the plate of this inverter is inverted to a minus by an inverter 1-9X and applied to the grid of a power tube 1-9U. The plus voltage condition of the plate of this power tube is extended to the No. 2 grids of four accumulator read-in switches (Fig. 16i) 3-11N, 3-11P, 3-11Q and 3-11R. These switch tubes are thereby conditioned to pass any positive pulses applied to their grids G1 from their respective entry channel wires.

The impulses on the exit channel wires are transmitted to the entry channel wires through circuits which have been somewhat simplified in the present disclosure, in accordance with the simple example chosen for illustration. The values issuing from FS2 are to be added as complements in the accumulator, since the problem chosen involves only entries of plus values. Accordingly, the arrangement is such that the pulse paths for a group of nine pulses which are to be selectively gated to the respective entry channel wire are made open at the beginning of the pulse time and are closed at differential times on receiving signals from the respective exit channel wires. For this purpose switch tubes 5-2S, 5-2T, 5-2U and 5-2V are provided, the grids G1 of which are connected to a gating source which emits plus pulses 11B to 19B while the grids G2 of the switch tubes are connected to the right plates of respective add-subtract triggers 5-4S (Fig. 16j), 5-4T, 5-4U and 5-4V. At the time the 11B to 19B pulses begin these add-subtract triggers are in the "on" condition, their right plates being at plus condition. They are placed in this condition by the following means:

From a gating source (not shown) a minus 3A to 9A gate is applied to the right plates of each of the add-subtract triggers, turning them off, through internal coupling to the left grids within the triggers. Then at 10A a plus impulse is applied to the grids of inverters 5-3S1, 5-3T1, 5-3U1, causing a negative pulse to be applied to each left plate of the add-subtract triggers, turning these triggers on, through internal coupling to the right grids within the triggers. When the plus 11B pulse arrives on the grids G1 of the switch tubes 5-2S to 5-2V, a negative pulse is transmitted to each related power tube 5-1S to 5-1V and a positive pulse is thus applied from the plates of the power tubes to the connected wires of the entry channel. The pulses on the entry channel are transmitted through the switch tubes 3-11N to 3-11R to the stage-1 triggers of the respective accumulator counters, 3-9N to 3-9R, stepping these counters forward from their starting positions.

In the units order the pulse at 15A time from the units order 4-7L of FS2 switches the add-subtract trigger 5-4S off. The reduced voltage at the right plate of this trigger shuts off switch tube 5-2S before the 15B pulse is transmitted. Thus, the units order of the accumulator (first counter on the left) receives 4, and only 4, pulses before the switch tube 5-2S is turned off. Since it stood at 9 to begin with these pulses have advanced it to 3 and have caused a negative carry pulse from the right plate of the #8 stage 3-6N of the units counter through a condenser to the right grid of the related carry trigger 3-4N. The carry trigger switches to the left and applies plus voltage to grid G1 of carry switch tube 3-3N.

The other three counters of the accumulator receive all 9 of the 11B to 19B pulses, since the pulses on the exit channel wires pertaining to these counters do not arrive until 20A time. These three counters therefore move from 9 to 8 and set up their carry switches 3-3P, 3-3Q, 3-3R in the process.

*Carry impulse*

At 20B to 1A time grid G2 of each of the carry switches is made positive by a gate voltage applied by a power tube 1-10U under control of switch 1-10V, which has plus voltage on its grid G2, except on a counter read-out cycle, as described later and a plus 20B to 1A gate on its grid G1. A negative pulse is transmitted from the plate of each switch tube 3-3N to 3-3R to stage #1 of the next higher order counter, except that the impulse from the switch tube 3-3R passes to stage #1 of the lowest order counter. All 4 counters thus receive an additional impulse and move to the positions 9994.

Reading in FS4 to the accumulator

Following carry time a 2AB pulse steps the program ring to PG2, removing the minus voltage condition from the program 1 hubs and applying a minus voltage condition to the program 2 hubs.

These hubs are also left unsuppressed by the calculate selector No. 1 circuit. One of the program 2 hubs is plugged to "CTR—RI +" and conditions the counter read-in circuits in the same way as on the previous primary cycle. Another program 2 hub is connected to FSRO-4 hub. The minus on this hub is inverted by 1-1Y1 to condition the read-out circuits of FS4 (not shown) in the same way as the read-out circuits of FS2 were conditioned in the previous program step. Since the FS4 counters are all standing on zero, they will all advance to zero on the tenth read-out pulse. Each order of the accumulator will consequently receive 9 pulses of the group 11B to 19B and an additional carry pulse, in the manner previously described and the accumulator will return to 9994, the nine's complement of 5.

The program circuits continue to step along in response to each 2AB pulse from the primary timer, but the remaining programs of this calculate sequence are idle ones, programs 3 and 4 being suppressed by the normal condition of calculate selector No. 3 and the remaining programs being unplugged.

Program end

When program 20 trigger is tripped to the left a plus voltage on its right plate is transmitted to a grid of an inverter 2-10H2, from the plate of which a negative pulse passes to the left plate of a program-end trigger 2-10K, switching this trigger to the left. From the right plate of this trigger plus voltage is extended to grid G2 of a calculate-end switch 2-8K. At the end of this primary cycle a plus 1B pulse on the grid G1 of switch 2-8K causes a negative pulse to pass from its plate through condenser coupling to the right grid of a calculate-end trigger 2-7K. The same pulse passes through condenser coupling to the left grid of trigger 2-10K, restoring it to off condition.

A plus from the right plate of 2-7K causes a negative pulse from an inverter 2-6K2 to be transmitted through condenser input to the left grid of the compute start-stop trigger 1-5L (Fig. 16i). This trigger switches off, shutting off the switch 1-5K through which A pulses were being transmitted to the primary timer, stopping the latter at step 1.

The calculate-end trigger 2-7K remains on until 177° in the next card cycle, when CB116 opens, removing the —100 volt source from the right grid of the trigger and causing it to restore to the off condition. The —100 volt bias is re-established on the right grid by the closure of CB116 at 183°, just prior to the next calculate sequence.

Preparation to read out accumulator into channel C

During the calculate sequence preparation is made for reading out the accumulator into channel C. At 255° CB82 (Fig. 16a) closes, extending a circuit from wire L1 through R139-10, point 3 of the start relay, now closed, R2116-1 in the normal position shown, the latch magnet LM1 of storage entry unit No. 1, and, in parallel, storage entry relay R2112, to wire L2, energizing said magnet and said relay. The latch magnet is energized at the high point of the bail cam and the bail then begins to drop. Immediately its contact BC1 (Fig. 16b) closes, preparing a circuit to R2116LP coil, which will be completed later in the cycle. R2112-1 closes, preparing a holding circuit from wire L2 through the hold coil of R2112 and CB127, which holds the relay until 202° in the third card cycle. R2112 points (Fig. 16d) 12, 11, 10, and 9 close, preparing circuits to the storage entry 1 stop magnets SEI-1 to SEI-4.

At 275° of the tabulating machine cycle CB106 (Fig. 16e) closes, terminating the calculate time of the second card cycle. During the third cycle the factor $b$ will be read from the "Card entry into channel A" field at the lower brushes and, in accordance with the invention, the factor $a$ will concurrently be read from the accumulator of the electronic calculator by way of channel C into a storage entry device. The reading of factor $b$ into channel A, thence into FS2, is identical to the similar reading of factor $a$ previously described.

At 305° plus voltage extends from wire L1 through CB109 (Fig. 16d), R2100-3, now closed, channel C common hub H52, plug wire, "CTR—RR" (read out and reset) hub H55, wire C82 to the grid of inverter 1-11Z2 (Fig. 16i). The resulting reduced voltage condition on the plate of this inverter extends to the grid of inverter 1-11Z1, establishing an increased voltage on the plate of the latter inverter. This plate is connected to the grid of inverter 1-10Y1, from the plate of which a reduced voltage condition extends to the grid of power tube 1-10X. The increased voltage on the plate of the power tube is extended to the grids G2 of the accumulator read-out switches 3-10N to 3-10R.

The reduced voltage on the plate of 1-10Y1 is also applied to the grid G2 of switch 1-10V. This makes 1-10V unresponsive to a carry impulse, but since there is no carry impulse during a CB read out this blocking condition has no significance. It is needed on electronic read-out cycles, as described in said application, Serial No. 38,078.

The plus on the plate of 1-11Z1 also extends to the grid G2 of a switch 1-11Y. This switch has gated to its grid G1 a +1AB pulse. Since the primary timer is, at this time, stopped on step 1, the grid G1 of 1-11Y is plus and the pulse from 1-11Z1 causes a negative pulse to be transmitted from the plate of 1-11Y through condenser coupling to the right grid of trigger 1-11X. The resulting drop in voltage on the left plate of the trigger cuts off the inverter 1-11W2, leaving its plate voltage under the control of the inverter 1-11W1. At this time the primary timer is stopped on step 1 and it is not until the next calculate time, after read out of the accumulator, as will soon be described, that a —(3A—8B) pulse is applied to the grid of inverter 1-11W1. When this occurs a plus condition is applied to certain grids of all counter triggers of the accumulator, to reset all of these counters to 9's. Thereafter a —11AB pulse to the left grid of trigger 1-11X restores it to the right.

Selection of storage unit

The calculator has now been prepared for reading out the accumulator into channel C and storage entry 1, but before the read-out pulses begin, further action takes place to select the storage unit into which factor $a$ will later be transferred and to couple the storage entry 1 read-out contacts to the channel C wires through which factor a will be transferred to the selected storage unit.

At 343° an impulse passes from wire L1 through CB80a (Fig. 16b), R2108-2, transferred, wire S1, R139-2, R117P to wire S153, energizing said relay. A hold circuit is established from wire S153 through the holding coil of R117, R117-1, the normally closed bail contact BC21 of storage unit 21, to wire S47. This circuit will remain until the bail of storage unit 21 starts down. R117-2 (Fig. 16h) closes, preparing a circuit to the latch magnet LM21 of storage unit 21. R117-3 (Fig. 16g) closes, preparing a circuit for the pick-up coil R126 to be referred to presently.

At 348° a circuit is completed from wire L1 through CB14 (Fig. 16b), BC1, closed when the bail of storage entry 1 started down, alternate control relay R2116LP, to wire L2, energizing said relay. This is a latch-type relay of the kind disclosed in Patent No. 2,510,604 to Pfaff et al. and its contacts remain transferred until its trip coil R2116LT is energized. Contact R2116-1 (Fig. 16a) prepares a circuit to insure that the next signal to a storage entry latch magnet will go to LM2. R2116-2 (Fig. 16c) prepares a circuit to the storage entry read-out selector relay R2118LP, which will be energized in a manner to be described presently.

Inversion read out

The number standing in the accumulator is a nine's complement, in this case, 9994, standing for 0005. This complement has to be read out of the accumulator in such a way that an output signal from any counter of the accumulator, on passing from 9 to 0, will coincide with the corresponding digital index point of the machine into which the number is being transferred. In the present case the number is to be stored in a tabulating machine in which the sequence of digits is 9, 8, 7, ... 1, 0. If the accumulator counters were impulsed once for each digital index point of the tabulating machine their output signals would coincide with the digital index points identified with the nine's complements of the values stored in the accumulator. For this reason it is necessary to use an inversion read out scheme, in order to store true numbers in the tabulating machine. In general, this scheme operates by adding groups of rapid impulses before each CB impulse, in order to step the counter back one step for each CB impulse.

Prior to the first CB impulse to the accumulator counters, which occurs at 9 index time of the tabulating machine cycle, 9 high speed pulses are entered in each counter. Any counter which stands at 0, the complement of 9, will be advanced to 9 by these rapid impulses and will pass from 9 to 0 in response to the 9 CB impulse, producing an output signal. The coincidence of this signal with the 9 CB impulse causes an impulse to be passed to the storage entry device at 9 time and a 9 is stored.

An output signal from stage #8 of any counter of the accumulator must coincide with a CB impulse in order to be effective. If a counter has passed from 9 to 0 before the CB impulse, it will not cause a digit to be stored, for a reason which will appear presently when the inversion read-out circuit is described. Accordingly, it is necessary to reset the carry triggers before each CB impulse, except the first one, in order that the carry trigger may be flipped in response to the CB impulse, if the counter passes from 9 to 0 on receiving the CB impulse. For this purpose provision is made to reset the carry triggers between each group of rapid impulses and the following CB impulse.

Before the second CB impulse, which occurs at 8 time of the tabulating machine cycle, 8 additional rapid impulses will be transmitted to each counter of the accumulator. These counters will all have been restored to their original conditions by the preceding 9 rapid impulses and one CB impulse. Any counter which is standing at 1, the complement of 8, will be advanced to 9 by the 8 rapid impulses and will pass to 0 in response to the CB impulse, producing an output signal. This signal, coinciding with the 8 index time of the tabulating machine, will cause an 8 to be stored.

The 8 rapid impulses and one CB pulse advance all the counters of the accumulator 9 steps. Any counter which had originally stood at 2, the complement of 7, would at this time stand at 1. Before the next CB impulse 8 more rapid impulses are applied to each counter and any counter which originally stood at 2, and now stands at 1, will be advanced to 9. The following CB impulse will cause the counter to pass to 0 and produce an output impulse. This impulse coincides with 7 index time of the tabulating machine and causes a 7 to be stored.

In the same way a succession of 8 rapid impulses before each CB impulse will cause output signals for each complement digit to occur at times coinciding with the corresponding true index times of the tabulating machine cycle.

The circuits whereby the inversion read-out is accomplished will now be described:

The rapid impulses are controlled by a three stage straight binary 8 electronic timer (Fig. 16i) 3-2B, 3-2C, 3-2D, with appurtenant control means. The cycle point timing of the rapid impulse groups is controlled by a punch interlock trigger 3-2F, which is reset by the calculate reset CB115. The left grid of this trigger receives an impulse over wire C8 (Fig. 16d) from CB97 and CB94, at mid-index times, the first pulse being controlled by CB97 to occur at mid-index time before 9. At each index time from 9 to 0 the right-hand grid of trigger 3-2F receives a plus impulse over wire C4 from CB's 91 and 87.

When the first mid-index pulse arrives trigger 3-2F is switched to the left and a minus impulse from its left plate passes through condenser coupling to the right grid of trigger 3-2E, switching the latter to the left. Before this trigger 3-2E will have been reset by calculate reset CB115. A reduced voltage condition on the left plate of trigger 3-2E is applied to the grid G2 of switch tube 3-1H. Plus B pulses applied to its grid G1 are thereby prevented from passing as negative pulses from its plate through condenser coupling to the left grid of trigger 3-1B. The function of these B pulses, which is to turn off trigger 3-1B, is thus interrupted.

When trigger 3-2E switches to the left, plus voltage on its right plate is applied to the grid G2 of a switch tube 3-1D, which has plus B pulses applied to its grid G1. The first B pulse after 3-2E switches to the left causes a negative pulse from the plate of tube 3-1D through condenser coupling to the right grid of trigger 3-1B, switching it to the left. A connection from the left plate of this trigger to the grid of an inverter 3-3B causes plus voltage to be applied from the plate of the inverter to the grid G2 of a switch tube 3-4C. Plus A pulses applied to the grid G1 of this switch tube cause minus A pulses to pass from its plate to the grid of power tube 3-4D. Resulting plus A pulses from the plate of power tube 3-4D are applied to the grids G1 of the accumulator read-out switch tubes 3-10N to 3-10R. Since at this time the grids G2 of these switch tubes are at plus voltage, as a result of the read-out signal above described, the A pulses will be fed as —A pulses to the stage #1 triggers of the accumulator counters.

The rapid-impulse gating circuit includes three triggers (Fig. 16j), 3-1F, 3-2G, and 3-1C, all of which are reset by the calculate reset CB115 and are switched by means now to be described. Plus voltage from the plate of inverter 3-3B is also applied to the grid G2 of a switch tube 3-1G, allowing a plus A pulse applied to the grid G1 of this tube to cause a minus A pulse from its plate, coinciding with the first A pulse passed to the accumulator counters. The negative A pulse from switch 3-1G passes by condenser coupling to the right grid of trigger 3-1F, switching it to the left. Plus potential appearing on its right plate is applied to the grid G2 of switch tube 3-1E. The following plus B pulse at the grid G1 of this tube causes a minus B pulse through condenser coupling to the right grid of trigger 3-1C, switching it to the left. Reduced voltage on the left plate of this trigger extends to the grid of one-half 3-1A1 of a double inverter. The other half of the inverter, 3-1A2, was cut off by reduced voltage from the left plate of 3-1B when the latter was switched on. Plug voltage on the common plates of the double inverter 3-1A will be extended to the grid G2 of a switch 3-2A. The next A pulse applied to the grid G1 of 3-2A will cause a negative A pulse to stage #1 of the binary 8 timer. This is the next A pulse after the first A pulse entered in the accumulator counters, which means that the accumulator counters are one step ahead of the binary 8 timer.

When 8 A pulses have actuated the binary 8 timer and 9 have entered the accumulator counters a negative impulse from the right plate of the third stage of the binary 8 timer passes through condenser coupling to the left grid of trigger 3-2E, turning this trigger off. The left plate of trigger 3-2E goes positive, conditioning the switch 3-1H to pass the next B pulse to switch off the trigger 3-1B. Plus potential on the left plate of 3-1B is inverted by 3-3B, to reduce the voltage on grid G2 of switch 3-4C, shutting off A pulses to the accumulator counters. The plus potential on the left plate of 3-1B is also inverted by 3-1A2, to reduce the voltage on the grid G2 of 3-2A and cut off A pulses to the binary 8 timer.

At 9° (9 time) the first index line pulse is transmitted from CB87 through CB91 and wire C4 to the right grid of trigger 3-2F, switching it off. The same impulse is transmitted from CB87 through CB89 and wire C2 to the left grid of the read-out trigger 1-8F, switching this trigger to the left. A minus pulse from the left plate of 1-8F passes through a condenser to the grid of an inverter 1-9F the output of which is again inverted by 3-3C, to produce a minus pulse on the grid of power tube 3-4D. A resulting plus impulse to the switch tubes 3-10N to 3-10R adds the tenth step to the accumulator counters, restoring them to their original settings.

At 20° the read-out trigger 1-9F is reset by an impulse from wire L1 through CB94, CB99, and wire C17, to the right grid of the trigger. The same impulse from CB94 passes through CB97 and wire C8 to switch on the punch interlock trigger 3-2F. 3-2E is thereby switched on and the next B pulse to 3-1D causes 3-1B to be switched on and, through 3-3B the switch tube 3-4C is conditioned for transmitting the following A pulse. The negative voltage on the left plate of trigger 3-1B also produces plus voltage on the plate of inverter 3-1A2. Since trigger 3-1C was not reset, the plate of inverter 3-1A1 remains plus and the switch tube 3-2A is conditioned for passing A pulses applied to its grid G1. The binary 8 timer receives a first A pulse at the same time as the accumulator counters receive the first A pulse and is actuated in step with the accumulator counters. Consequently, the output from the binary 8 timer after 8 A pulses shuts off the A pulses from the accumulator counters when they have received 8 A pulses.

The group of 8 pulses above described take place in a fraction of 1° of the tabulating machine cycle. At 21° an impulse is transmitted from L1 through CB100 (Fig. 16e), wire C19, and a resistor to the left grid of a trigger 1-8K (Fig. 16i). Before this impulse the trigger had been reset to its right side by a calculate reset impulse from CB115. The impulse from CB100 switches the trigger to the left, reducing the voltage on its left plate. The signal is inverted by 1-9J and applied as a plus condition on the grid of power tube 1-9K, which transmits a negative pulse from its plate through condensers to the left grids of all the carry triggers, switching these triggers to the right. The trigger 1-8K is restored by an impulse from CB102 (Fig. 16e) at 25° transmitted through wire C20 and a resistor to the right grid of the trigger.

The next CB impulse through wire C2 to the left grid of the read-out trigger 1-8F at 27° causes another impulse to be added to the accumulator counters, making a total of 9 in this group.

The feeding of groups of 9 impulses to the accumulator counters continues until zero index time, with the result that an output from the units counter of the accumulator occurs at 5 index time and outputs from the three other counters of the accumulator occur at zero index time. The results of these outputs will be described presently. Altogether there were one group of 10 pulses and 9 groups of 9 pulses, the net effect of which on each accumulator counter was to step it back 9 steps.

At zero time the impulse from CB87 also passes through CB92 (Fig. 16d) and wire C5 to the left grid of trigger 3-2G, switching this trigger on. A negative impulse is transmitted from the left plate of this trigger through condenser coupling to the left grid of trigger 3-1C and also to the left grid of trigger 3-1F, switching these triggers off and causing a high voltage condition to be extended from the left plate of trigger 3-1C to the grid of inverter 3-1A1. This will prevent the first A pulse which occurs when the punch interlock trigger 3-2F is turned on at one-half after zero from being transmitted through 3-2A to the binary 8 timer. Through 3-1G, 3-1F, 3-1E, and 3-1C, 3-1A1 is cut off again at the first B pulse, and the second A pulse is passed through 3-2A to the binary 8 timer, which will again be one step behind the rapid impulses transmitted to the accumulator counters. 9 impulses are thereby sent to the accumulator counters before an output from the binary 8 timer shuts them off. This restores the accumulator counters to their original conditions before the inversion read out began. The trigger 3-2G is reset by the mid-index pulse at one-half after zero passing through CB99 and wire C18 to its right grid.

The output from the units counter of the accumulator at 5 time is utilized in the following manner to store a 5 in storage entry 1. The right plate of stage #8 of this counter 3-6N goes negative when the counter passes from 9 to 0, transmitting a negative pulse through condenser coupling to the right grid of the carry trigger 3-4N. The carry trigger switches to the left, producing a minus at its left plate which is inverted by an inverter 3-5N and applied through a condenser to the grid of the thyratron 3-1N.

The plates of all the thyratrons 3-1N to 3-1S are connected by wire C130 to CB130, which is closed from 005° to 185°. At digit index times CB111 connects CB130 through R2123-5 to plus 50 volts. If at such a time a plus impulse is applied to the grid of a thyratron the thyratron is ignited and completes a circuit from its cathode through the related wire C100, C101, C102 or C103 to one of the storage entry stop magnets SE1-1 to SE1-4 or SE2-1 to SE2-4. In the present case the impulse to the grid of thyratron 3-1N at 5 time completes a circuit through wire C100 and R2112-12 to the units stop magnet SE1-1 of storage entry 1. This stops the units plunger contact on the 5 read-out bar. The other counters of the accumulator do not produce output pulses until zero time, therefore the related plunger contacts of the storage entry unit 1 are stopped on the 0 read-out bar.

*Read out from storage entry unit to storage unit*

The timing of the read out from storage entry 1 into storage unit 21 depends upon the phase relationship of bank 2 of the storage machine and the tabulating machine. The storage machine makes approximately 3 cycles for every two cycles of the tabulating machine and they are not synchronized. The phase relationship may therefore vary throughout 360° of the storage machine cycle.

For the present it will be assumed that the phase relationship of bank 2 of the storage machine is such that the read-out of storage entry 1 begins at the earliest possible time after factor *a* is read into storage entry 1. The timing means are arranged so that the read-out may begin before the amount has been entirely read into the storage entry unit, but must end later than the end of read-in to the storage entry unit, so that no digit pulse of the storage machine will occur before the corresponding digit pulse of the storage entry unit. With the earliest possible timing condition, which is to be assumed, the read-out from the storage entry unit will begin at about 5 time of the tabulating machine cycle. This will enable zero time of the tabulating machine cycle to occur sufficiently far ahead of zero time of the storage machine cycle to avoid any possibility of error.

It was described above how an impulse from CB80 at 343° caused relay R117 to be energized and the point R117-3 to be closed. With the timing conditions assumed, S2CB6 (Fig. 16g) (bank 2 of the storage machine) will close at the same time R117-3 closes, completing a circuit from wire S47 through S2CB6, R117-3, and R126P, to wire S153, energizing said relay. The holding point of R126 closes, completing a circuit from wire S153 through the relay holding coil and the holding point R126-1 and S2CB5 to wire S47.

R126-5 (Fig. 16h) closes and at 5° of bank 2 of the storage machine S2CB1 completes a circuit from line L1 through wire S90 normally closed R125-5, R126-5, S2CB1, R117-2 to the latch magnet LM21 of storage unit 21 and wire S43 to wire L2. This magnet becomes energized and the bail of storage unit 21 descends. As it starts down the bail contact BC21 (Fig. 16f) transfers, breaking the holding circuit of relay R117 and completing a circuit from the line wire S47 through relay R190 to wire S153, energizing said relay. R190 points 9, 10, 11, and 12 close, coupling the stop magnets 21MTH to 21MU of storage unit 21 to the channel C wires S77, S69, S61, and S53.

At 100° of bank 2 of the storage machine S2CB4 (Fig. 16g) completes a circuit from wire S47 through R190-1, now closed, S2CB4, R126-2, normally closed R133-2, R125-6 in normal position, wire S125, R2116-2 (Fig. 16c), now transferred, R2118LP to wire L2, energizing the pick up coil of said relay. This is a latch-type relay and will remain energized until the trip coil, R2118LT, is energized. Contacts 1 through 13 (Fig. 16b) of R2118 transfer, the contacts 1 through 9 connecting the emitter wires S97 to S105 to the corresponding digit read-out bars 130-1 to 9, respectively, of storage entry 1, while the 10 through 13 contacts couple the corresponding column read-out contacts of storage entry 1 to the channel C wires S77, S69, S61, and S50, respectively.

Shortly thereafter S2CB2 (Fig. 16g) closes for the first of 9 times, as the bank 2 emitter brush 141 makes contact in succession with the spots connected to the digit wires S97 to S105. In the units position of storage entry 1 the plunger contact stands at 5 and as the bank 2 emitter goes to wire S101 a circuit is completed from wire S47 through R190-1, S2CB2, bank 2 emitter brush 141, wire S101, R2118-5 (Fig. 16c), transferred, the 5 digit read-out bar of storage entry 1, the plunger contact of the units position of storage entry 1, R2118-13 transferred, wire S53 (Fig. 16h), R190-12, the units magnet of the group of storage unit stop magnets M21, to wire S43, to wire L2, energizing said magnet in time to stop the units order plunger contact of storage unit 21 in the 5 position.

There are no other significant digits in storage entry 1 and the other three stop magnets of 21M receive no impulse, consequently the related plunger contacts stop on the 0 digit read-out bar of storage unit 21.

The provisions for the variable phase relationships of the storage machine and the tabulating machine will be discussed later on. At this time the description of the illustrative example will be continued.

The transfer of the factors *b*, *d*, and *e* from the "Card entry into channel A" field of the cards 2, 3, and 4, into the calculator and thence, through storage entry, into storage units 22, 11, and 12, respectively, is exactly the same, as the transfer of factor *a* above described, except for the different storage units selected and the alternation of storage entry. For example, factor *b* on card 2 is to be sent to storage unit 22. In the channel C control field the lower brush in the tens column picks up relay R139, through the circuit previously described, while the lower brush for the units column completes a circuit at 2 time through R2027-8 and R2101P to wire L2, energizing said relay. The relay holds up through its 1 point and CB126. An impulse from CB80a passes through normal R2108-2, R2107-2, now closed, wire S2, R139-3, and R118 to wire S153, energizing said relay. This relay holds up through its 1 point in the bail contact BC22, to wire S47.

When an impulse arrives from CB32 at 255° of the third card cycle it passes this time through transferred R2116-1 to the latch magnet LM2 of storage entry 2 and to relay R2109. The points 12 to 9 of the latter relay couple the stop magnets (Fig. 16d) SE2-1 to SE2-4 of storage entry 2 to the channel C wires C100 to C103, while the latch magnet LM2 releases the bail of storage entry 2. Contact BC2 closes and when CB14 (Fig. 16b) makes at 348°, R2116LT is energized, restoring the points of R2116 to normal.

Through S2CB6 (Fig. 16g) and R118-3, R126 is again energized. This time the closure of S2CB1 (Fig. 16h) completes a circuit through R118-2 and the latch magnet LM22 of storage unit 22. The bail of this storage unit is released, its contact BC22 transfers and R193 is energized. Its points 9-12 couple the stop magnets 22M of storage unit 22 to the channel C wires S77, S69, S61 and S53.

When S2CB4 closes, the circuit through wire S125 this time passes through R2116-2 in normal position and R2118LT. The relay R2118 is restored and its contacts 1-13 return to normal position, coupling storage entry 2 to the emitter wires S97 to S105 and to the channel C wires S53, S61, S69 and S77. Thus the circuits are prepared for reading out storage entry 2 into storage unit 22.

*Reading out onto channel A or channel B from a storage unit*

Card 5 calls for a different kind of operation. The operation column of this card is punched "3" and reference to the control panel of the calculator will show that this is a multiplying operation. Calculate selector 3, which will be energized for this card cycle, has its normal hubs connected by plug wire to programs 3 and 4. When calculate selector 3 is energized suppression is removed from programs 3 and 4 and, in the cycle about to be described, these will be the only effective programs.

One hub of program 3 is wired to "Mult.-Quot. Control—Read-In," another is wired to "Factor Storage RO—2." One hub of program 4 is wired to "Factor Storage RO—4" while another program 4 hub is wired to "Function Control—Multiply +." This plugging has the effect of causing the factor stored in FS2 to be transferred to the multiplier-quotient storage device on program 3, from which it controls multiplication during program 4, of a multiplicand stored in FS4.

As card 5 passes the upper brushes the zero in the 10's column of "Channel A" control field has the same effect as in previous card cycles. Channel A is coupled to the lower brushes and in the sixth card cycle the factor $k$ is transmitted through channel A to FS2.

In the "Channel B" control field the upper brushes read "21." A circuit is completed from the upper brush of the 10's column of channel B at 2 time through R2027-5, wire S30, the pick up coil of relay R151, to wire S153, energizing said relay. A circuit is completed from wire S153 through the hold coil of R151, point R151-1, wire S48, and CB96, to wire L1.

In the units column of "Channel B" control field a circuit is completed at 1 time through R2031-6 and the pick up coil of R2096 to wire L2, energizing said relay. The relay holds up through its holding contact R2096-1 and CB125.

At 235° of the 5th card cycle an impulse passes through CB72 (Fig. 16a), transferred R2096-2, wire S17, R151-2 and the pick up coil of R82 to wire 153, energizing said relay. The relay holds up through its hold point R82-1, wire S45, and CB81. R82-12 (Fig. 16h) through R82-9 points close, coupling the plunger contacts of storage unit 21 to the channel B wires S51, S59, S67, S75.

When the "2" hole was read in the 10's column of channel B control field relay R2083 was energized and held up in the manner previously described. At 343° of the 5th card cycle an impulse passes from CB80 (Fig. 16d) through R2088-2 through the channel B common hub H51, plug wire, and FSRI-4 hub H54, and wire C58, to the FS4 reset control trigger (not shown).

In this case the read-in pulses from CB1 (Fig. 16a) are transmitted through the emitter points (Fig. 16c) R2001-3, R2003-11, R2006-11, R2009-11, R2013-11, R2017-11, R2021-11, R2027-11, R2031-11, and R2035-3, at successive times from 9 through 0. The read-in pulses pass from these contacts through wires S33 to S42, respectively, to the storage unit read-out contact bars. The only group of column read-out contacts coupled to the channel B wires is the storage unit 21 group. In this storage unit a 5 is stored in the units order and the emitter impulse through wire S37 is transmitted through the units order plunger contact, column read-out contact R82-12, wire S51, hub H34 (Fig. 16a), plug wire, hub H42, wire C63, to the FS4 units entry trigger (not shown). This impulse arrives in time to admit 5 mid-index pulses into the FS4 units counter.

*Multiplying operation*

In the operation-control field a "3" is read by the lower brush, completing a circuit through R2021-2 and wire C51 through the pick up coil of calculate selector 3 to wire L2, energizing said selector. The selector holds up through its 1 point, wire C57, and CB34 to wire L1, so that it will remain energized through the calculating portion of the 6th card cycle.

At 190° of the sixth card cycle CB106 opens, initiating another calculate cycle. This time programs 1 and 2 remain suppressed, calculate selector 1 being down. On program 3 coefficient $k$ (2) is read out of FS2 into the multiplier-quotient storage counters (not shown). On program 4 a multiplying operation is initiated, in the manner described in said application, Serial No. 38,078, and factor $a$, at that time in FS4, is read out for multiplication by coefficient $k$, now in the multiplier-quotient storage counters.

On card 5 there is no channel C code, hence there is no signal to the counter read out and reset hub. Consequently the product $ak$ remains in the accumulator.

Card 6 has a zero in the tens column of the "Channel A Control Field," which couples channel A to the lower brushes and causes a resetting signal to pass to FS2. However, there is no punching in the "Card Entry Into Channel A" field and therefore no entry into FS2.

The "Channel B" control field is punched "22" and this results in the energization of R85, through circuits similar to those traced for R82. The points of R85 couple storage unit 22 to channel B and in the following cycle the factor $b$ is read out of storage unit 22 through channel B into FS4.

The "1" in the operation-control field causes a cross-footing operation during the calculate cycle in which the factor $b$ is added to the product $ak$ already in the accumulator.

The "Channel C" control field of card 6 is punched "21" and the sum $ak$ plus $b$ is accordingly transferred in the manner previously described into storage unit 21, this storage unit being first reset as an incident to the new entry.

Card 7 resembles card 5, except that it is the coefficient $h$ (3) that is read out of "Card Entry Into Channel A" into FS2, and the factor $d$ which is read out of storage unit 11 through channel B into FS4. The "3" hole in the operation control field sets up the programs for the multiplication $d \times h$ and the product remains in the accumulator, because there is no perforation in the channel C control field.

Card 8 is similar to card 6, except that it is the factor $e$ (4) that is read out of storage unit 12 on channel B and added to $dh$ in the accumulator on the ninth card cycle.

Card 9 causes the sum $ak$ plus $b$ to be read out of storage unit 21 through channel B into FS4 and the "1" hole in the operation field sets up a cross-footing operation in which this sum is added in the accumulator to the sum $dh+e$, giving the answer $x=41$.

In accordance with the invention a single read-out of the accumulator serves both for controlling the printing and the storing of the result. The signal to initiate read-out and reset of the accumulator comes from the punching in the "Channel C" control field, but in the same cycle an "X" hole is read in the "Special Control" field, which causes the same output impulses from the accumulator which control the storage entry device, to control the printing mechanism. When the "X" hole is read by the brush in the "Special Control" field a circuit is completed through hub H9, plug wire, hub 22, class selector CS1, to wire L2, energizing said class selector.

The class selector is a relay circuit shown separately in Fig. 24. There are a number of these class selectors in the tabulating machine and one of them is used for list control in the present example. A relay R811 is energized through CF2 from 181° to 217°, which covers the X and R times of the tabulating machine cycle. The hub H22 leading into the class selector passes through R811-1 and the pick up coil of R893 to wire L2, energizing said relay. R893 holds up through its 1 point and CF7 until 340° of the same cycle.

A relay R889 is energized by an impulse through CB41 from 225° to 290°. At 235° a CB72 impulse passes through R889-1, R893-2, and relay R895 pick up coil, to L2, energizing said relay. R895 holds up through its 1 point and CB44 until 225° in the following cycle.

The relay R895 controls transfer points R895-2, which connect a common hub C either with a normal hub N or a transferred hub T.

Returning to the example, when the CS1 points transfer they complete a circuit which extends through CB55 at 246° to energize the list control relay R660. This relay holds up through its 1 point and CF11 until 225° in the following card cycle. R660-2 closes and at 258° a circuit is completed through CB19 and R660-2 to energize the list relay R79. This relay holds up through its 1 point and CB24, until 225° in the following cycle. With R656 still energized a circuit is completed at 293° of the tenth card cycle through CB27, R656-2, R79-2, and the print clutch magnet PCM to wire L2, energizing said magnet.

The print interposer magnets are connected by plug wires at hubs H56 to H63, to the counter exit channel C wires. These magnets are therefore energized each time the accumulator is read out. Unless the print mechanism is in operation the energization of the print interposer magnets has no effect but to trip the stop pawls. The stop pawls are all restored as soon as the print mechanism begins a cycle. During the eleventh cycle, when the answer X is being read out of the accumulator into a storage entry device, the print mechanism is in operation and the type bars are being elevated by the bail mechanism. They are stopped in differential positions by the output impulses from the accumulator, to align the type 0041 on the printing line and this number is printed when the hammers are released.

The same output impulses from the accumulator differentially control the stop magnets of storage entry 2, from the read-out contacts of which the answer is then read into storage unit 11.

Interlock circuits

Since the storage unit banks are driven independently of the tabulating machine it is necessary to provide certain interlock circuits, to avoid erroneous operation when the timing relation of a storage unit bank to the tabulating machine falls within certain limits. In order to show the purpose of the interlock circuits the inconsistent conditions which require them will first be described, beginning with a brief review of the sequence of events leading up to read-out from the storage entry unit into the storage unit.

At 255° of the tabulating machine cycle, if a bank selector relay R136 or R139 has been energized, an impulse from CB82 energizes one of the storage entry latch magnets LM1 or LM2 and one of the coupling relays, R2109 or R2112, for a storage entry unit.

At 343° an impulse from CB80$a$ picks up a storage unit selector relay, such as R117.

At 348° an impulse from CB14, through BC1 or BC2, energizes the pick up coil or the trip coil of the storage alternating control relay R2116.

Through a point of the storage unit selector relay an S1CB6 impulse energizes relay R125, or an S2CB6 impulse energizes R126, indicating that the tabulator is ready for the read out to storage.

Through a point of R125 or R126 an S1CB1 or S2CB1 impulse goes to the selected storage unit latch magnet, such as LM21.

The storage unit coupling relay, such as R190 (Fig. 16$f$), is energized when the bail contact of the storage unit transfers and, through a point of the coupling relay, an S1CB4 or S2CB4 impulse passes to the pick up coil, or the trip coil, of the storage entry control relay R2118.

It will be observed that the S1CB4 or S2CB4 impulse from the storage unit bank is gated through a point of a relay, R2116, controlled by an impulse from CB14 of the tabulating machine. If it were not for the interlock circuits about to be described the S1CB4 or S2CB4 impulse could be split by the transfer of the R2116 point and both the pick up coil and the trip coil of R2118 be energized in quick succession, leaving the coupling of the storage entry device unchanged for the read out, instead of being changed, as it should be, just before the read out.

Figure 15:
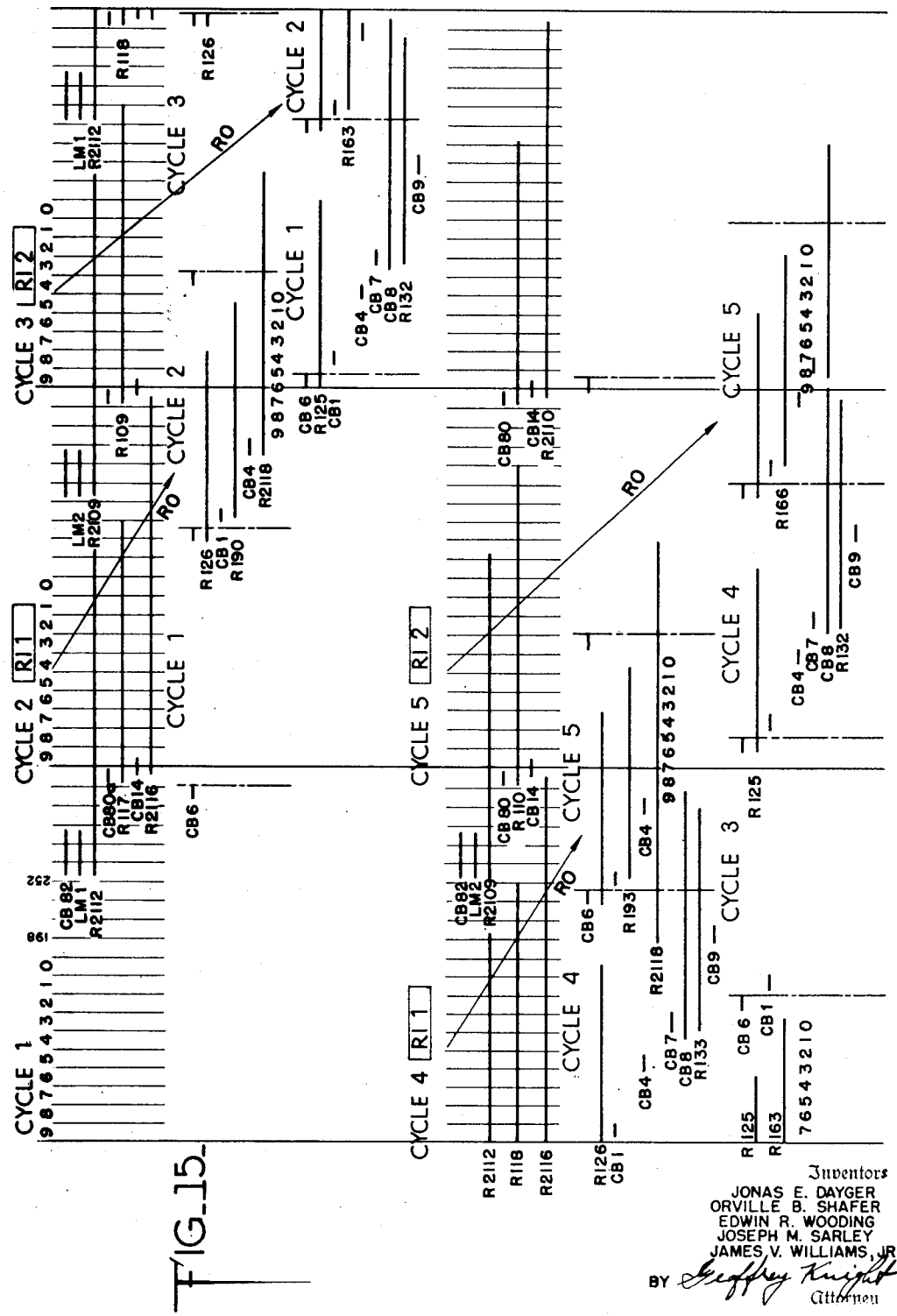
Fig. 15 is a sequence chart showing several cycles of the tabulating machine and storage machine.

The condition just referred to will be understood more clearly by referring to Fig. 15, which shows a sequence of operations through several cycles. In this case it is assumed that the ratio of the two storage unit bank cycles to the tabulating machine cycle is somewhat less than 3 to 2, so that the storage unit bank cycles have a lagging tendency. It is also assumed that the coding calls for read out into storage entry on every card cycle and for alternating entry first into one storage unit bank and then the other. During every card cycle a CB80a impulse will pick up one of the storage unit selector relays, and these will be assumed to be picked up in the order R117, R109, R118, R117.

At 255° of cycle 1 of the tabulating machine an impulse from CB82 energizes LM1 and R2112, starting an entry cycle of storage entry 1 and coupling its stop magnets to channel C. At 348° of cycle 1 of the tabulating machine CB14 energizes R2116LP.

An S2CB6 impulse occurs just before the CB80a impulse which will pick up R117. This means that there will be a maximum delay before the next S2CB6 impulse (end of cycle 1 of bank 2) passes through a point of R117 to energize R126.

When S2CB1 closes in cycle 2 of bank 2, the storage unit latch magnet LM21 is energized and R190 is then energized through the bail contact BC21. S2CB4 in cycle 2 of bank 2 passes through transferred R2116-2 to energize R2118LP, coupling the read-out circuits to storage entry 1. The number which was read into storage entry 1 during cycle 2 of the tabulating machine is read out during cycle 2 of bank 2 of the storage machine.

At 255° in cycle 2 of the tabulator the CB82 impulse energizes LM2 and R2109. Another number is accordingly read into storage entry 2 on cycle 3 of the tabulating machine, this read-in partially overlapping the read-out of storage entry 1 on cycle 2 of bank 2.

The CB80a impulse picks up R109 before the S1CB6 impulse of cycle 1 of bank 1 of the storage machine, so that this impulse picks up R125 immediately. However, the S1CB1 impulse in cycle 1 of bank 1 cannot get through the still open point R126-7 in this cycle and it is not until cycle 2 of bank 1 that LM11 is energized. The bail contact BC11 then transfers, picking up R163. If it were not for means to be described presently, which causes the impulse to R2118LT to be shifted to an earlier time, the S1CB4 impulse would now pass through the circuit completed by R163-1. In any case, R2118 is unlatched and the number which was read into storage entry 2 on cycle 3 of the tabulating machine is read out into storage unit 11 on cycle 2 of bank 1.

Meanwhile, a CB82 impulse at 255° in cycle 3 of the tabulating machine has energized LM1 and R2112 and another number is read into storage entry 1 on cycle 4 of the tabulating machine.

The S2CB6 impulse at the end of cycle 3 of bank 2 overlaps the CB80a impulse which picks up R118, and R126 is therefore energized immediately. However, the S2CB1 impulse in cycle 4 of bank 2 cannot get through the transferred point R125-5 and LM22 is not energized until the S2CB1 impulse in cycle 5 of bank 2. Here again an early impulse is sent to R2118LP, by means to be described presently, and the number which was read into storage entry 1 on cycle 4 of the tabulating machine is read out on cycle 5 of bank 2.

At 255° in cycle 4 of the tabulating machine a CB82 impulse energizes LM2 and R2109. The S1CB6 impulse at the end of cycle 3 of bank 1 immediately picks up R125, but the S1CB1 impulse in cycle 4 of bank 1 cannot get through the still open point R126-7. On cycle 5 of bank 1 the S1CB1 impulse picks up LM12 and the bail contact BC12 transfers, energizing R166. The S1CB4 impulse of bank 1 which would now pass through transferred R125-6 and wire S125 to R2116-2 would overlap the CB14 impulse at the end of cycle 5 of the tabulating machine. The S1CB4 impulse would pass through R2116-2 in the normal position shown and energize R2118LT, unlatching this relay. Then when the CB14 impulse transferred R2116, with S1CB4 still on, R2118 LP would be energized, coupling storage entry 1 to the read-out circuits. The number in storage entry 2 would have been lost.

Interlock means are provided to prevent this condition. The impulse to R2118 is shifted to an earlier time, giving more room for the creeping condition to operate in without causing trouble. This is usually sufficient because the chances for continuance of the peculiar coincidence of conditions which causes the creeping action become less and less with each cycle. However, to take care of this remote contingency the interlock means include means to force an idle cycle of the tabulating machine if the creeping approaches a second limit condition to be described.

Referring back to cycle 1 of bank 1, it will be recalled that the S1CB1 impulse in that cycle was not able to get through the still open point R126-7 to pick up LM11, so R163 remains de-energized during cycle 1 of bank 1. Likewise R130 remains de-energized because R163-1 is not closed and at 155° of bank 1 S1CB7 completes a circuit from wire S47 through S1CB7, normally closed R130-1, R125-2, now closed, and relay R132P, to wire S153, energizing said relay. The relay holds up through its 1 point and S1CB8 into bank 1, cycle 2, so that its point R132-2 blocks the S1CB4 impulse in cycle 2. R132-3 prepares a circuit through which an S1CB9 impulse is sent to R2118LT. This advancing of the time of the impulse to R2118LT places it well ahead of the CB14 impulse at the end of cycle 3 of the tabulating machine.

If the late cycle condition just described occurs on a cycle when a number is to be entered into a storage unit of bank 2, as shown in cycle 4 of bank 2, the impulse to shift the storage entry coupling circuits is advanced to the early time in the same way. In this case it is the relay R133 which is energized when, after R125 picks up, the relay R131 is not energized on the same cycle and an impulse from S2CB7 passes through the pickup coil of R133. R133-2 blocks the S2CB4 impulse of the next cycle of bank 2 and R133-3 prepares a circuit through which an impulse from S2CB9 passes to R2118LP.

A very unusual set of conditions may cause the creep to continue until the S1CB9 or S2CB9 impulse itself overlaps a CB14 impulse. This contingency is avoided by an additional interlock feature. If the relay R132 has been energized, for example, its point R132-4 prepares a circuit from S1CB9 through wire S72 to contact CB83, which makes at 270°. If the S1CB9 impulse is late enough CB83 will be closed and the circuit will continue through R91P to wire L2, energizing said relay. The R91A point completes a holding circuit through CB42, which will maintain R91 energized until 327°. R91B (Fig. 16d) will open the circuit to the CF clutch control relay R656 during the time CB21 is closed and the card feed clutch will latch up for one cycle. The idle cycle of the tabulating machine completely removes the lateness of the storage machine, which has been building up through many cycles.

*Unfinished program*

Notwithstanding the extremely high rate of operation of the electronic calculator, a calculation called for on one card cycle may require more time than the 85 degrees of one cycle during which CB106 remains open. In accordance with the invention means are provided to determine whether the calculating program is finished when CB106 closes, and, if not, to send the tabulating machine into an idle cycle, while the calculation continues.

For this purpose there is provided a trigger 2–4K (Fig. 16j) which has a left grid connected through a resistor and a wire C24 to a CB contact, CB93. This CB contact closes at 296° in each cycle to apply plus voltage from wire L1 through the circuit just traced, to restore the trigger 2–4K to a normal condition, in which the left-hand tube is conducting. The right-hand grid of 2–4K is connected through a resistor and wire C22 to a CB contact, CB105, which is connected through R2123-4, closed when cards are feeding, and normally closed R2128-2, to wire L1. CB105 closes at 275° in each cycle, to switch the trigger 2–4K to the right. This occurs at the same time the cam contact CB106 closes, at the end of the calculating portion of the cycle. A plus condition appearing at the left plate of trigger 2–4K is transferred to grid G2 of a switch tube 2–10J, which receives a plus 1B pulse on its grid G1 and transmits a negative pulse through a condenser to the left grid of the compute start-stop trigger 1–5L. The trigger is switched off and a minus condition applied to grid G2 of switch 1–5K shuts off A pulses from the primary timer, which stops on step 1.

The plus condition on the left plate of trigger 2–4K is also applied to grid G1 of a switch 2–5K. The grid G2 of this switch is connected to the left plate of the trigger 2–7K, which is switched to the left at the end of the calculating program. If the program ends before the trigger 2–4K is switched to the right by CB105 at the end of the calculating portion of the tabulating machine cycle, the plus condition applied to grid G1 of switch 2–5K will be nullified by the minus condition on the grid G2. On the other hand, if the trigger 2–4K switches to the right before the trigger 2–7K switches to the left, both grids of switch 2–5K will be at plus condition and a minus will be applied from its plate to the grid of an inverter 2–3K. In this case the plus condition at the plate of 2–3K is transmitted through wire 500 to the grid of a thyratron 2–2K. The plate of the thyratron 2–2K is connected through wire C129, CB113, R2123-5, now closed, to the plus 50 volt source. CB113 closes at 185° and if the grid of the thyratron is plus at this time the thyratron will ignite and a circuit will be extended through its cathode, wire C65, relay R2127 (Fig. 16e) to wire L2, energizing said relay.

R2127-2 opens, disabling the circuit to the card feed clutch control relay R56. This relay remains de-energized, initiating an idle cycle of the tabulating machine. The 1 point of R2127 closes, preparing a circuit which is completed by the closure of CB14a at 348°, causing relay R2128 to become energized. This relay holds up through its 1 point and CB86, until 218° in the following cycle. R2128-2 point (Fig. 16d) opens, disabling the CB circuits through which impulses are sent from the tabulating machine to the calculating machine. R2128-3 (Fig. 16d) closes, shunting R2123-5. The purpose of this point is to maintain the circuit to the thyratron 2–2K in case the unfinished program signal occurs on the last card in the hopper. In this case the relay R2123 would become de-energized and the 5 point of of this relay would open.

The card feed clutch control relay, R656, being de-energized, its 6 point is closed and at 293°, a circuit is completed through CB26 to energize relay R648, which holds up through its 1 point and CB26 until 280° in the next cycle. The 2 point of this relay (Fig. 16c) opens, interrupting the circuit to the all cycles relay R635 and thereby eliminating any all cycles impulse to the class selector CS1 during the time that the idle cycle relay R648 remains energized.

Meanwhile, however, if there had been an X in the special control column, CS1 would have been picked up at X time and would have received the early all cycles impulse at 235° to energize the list control relay R660. At 258° the list relay R79 would have been energized and this condition would be held through the idle cycle, in order to print the result which would be read out of the accumulator of the calculating machine on the cycle following the end of the calculation. Relay R79 holds up through CB24 and the 5 point of R648 shunts this CB, to carry R79 in energized condition into the cycle following the idle cycle.

It was mentioned that a signal from switch tube 2–10J caused the primary timer to be stopped on step 1. The opening of R2128-2 has the same effect as the opening of CB106, that is, it operates the compute start trigger 1–10E, to set the primary timer in operation again, so that calculation continues.

Summarizing the effect of the test indicating an unfinished program, this condition has resulted in throwing the tabulating machine into an idle cycle, which will generally provide ample time for completion of the calculation. During the idle cycle the controls which are to be used on the cycle following the idle cycle are maintained in the manner described.

If the program should still be unfinished at the end of the first idle cycle, another idle cycle will be initiated in the same way. This may continue indefinitely, until the calculating program is completed.

*Multiple storage machines*

In accordance with the invention the storage machines are constructed, and have their circuits so arranged, that a plurality of them can be connected in a tandem arrangement and the storage units of all the machines made available in the same way as the smaller number of storage units of a single storage machine, as previously described.

Figs. 18a and 18b are two parts of a circuit diagram for a card programmed calculator having three storage machines connected in tandem. The circuit is simplified in Fig. 18a to show only the arrangement for controlling the channel C circuits, but the channel A and channel B circuits are controlled in a similar way. Only the selector relays for two of the eight storage units of each of the six banks are shown, with their circuits controlled by the units position of the "Channel C" control field.

The diagram shows elements of three storage machines I, II, and III, and a tabulating machine T, plugged together in a tandem arrangement, along the dotted lines. Storage machine I plugs into the tabulating machine as indicated by the connectors such as 200. Storage machine II plugs into storage machine I by connectors such as 201. Storage machine III plugs into storage machine II by connectors such as 202. Each storage machine has relays R136 and R139, which are the same relays as shown in the first circuit. The circuits which are set up through the machines by the plugged-in connections are such that a "1" hole or "2" hole in the tens column of the "Channel C" control field will select R136, or R139, respectively, of storage machine I, in the manner described with reference to the main circuit diagram. A "3" hole or a "4" hole will select R136 or R139, respectively, of storage machine II, and a "5" hole or a "6" hole will select R136 or R139, respectively, of storage machine III, in a similar manner.

The relays R2107 and R2108 controlled by the units digit holes of the "Channel C" control field are identical to those described in the first circuit and serve all three storage machines, because the wires S1 and S2 controlled by them transmit CB80a impulses to relays in any bank in the three storage machines, under control of the related relays 136 and 139.

One of the requirements of the circuit for connecting machines in tandem is to extend the interlock arrangement so that there will be no start of entry into a storage unit of any one of the three machines as long as entry into a storage unit of any other one of the three storage machines is continuing. Fig. 18b shows the arrangement of interlock circuits for this purpose.

In Fig. 18b the three storage machines I, II and III are separated by dotted horizontal lines. Storage machine II is plugged into storage machine I and a wire 205 in storage machine II bridges connectors 107 and 108, completing a circuit from wire L1 of the tabulating machine through connector 90, wire 90a, connector 108, wire 205, connector 107, R129, wire 206, connector 46 to wire L2 of the tabulating machine, energizing said relay and causing R129-1, 3, and 4, to open.

Similarly, a wire 205 in storage machine III completes a circuit to energize R129 in storage machine II, causing R129-1, 3, and 4, of storage machine II to open.

Connectors 108 and 107 of storage machine III are not bridge, R129 of storage machine III is not energized, and R129-1, 3, and 4, of storage machine III remain at their normally closed position.

The circuits shown in this diagram are the circuits for selectively energizing the latch magnets, such as LM21, of the various storage units. The arrangement is such that the circuit to a latch magnet in one storage machine, such as storage machine I, has to pass through points of the bank selector relays R125 and R126 of each of the other storage machines, so that if any one of said relays is energized the circuit cannot be completed. Also, the circuit has to pass through a point of the other bank selector relay R125 or R126 of the same storage machine, just as in the main circuit diagram.

For example, the circuit to LM61 in storage machine III is as follows: L1, connector 90, R125-4, and R126-4, normal, connector 99 into storage machine II, R125-4 and R126-4, normal, connector 90 into storage machine III, R125-4 normal, R126-4, transferred, R129-1, R125-5, normal, R126-5, now closed, S2CB1, R117-2, LM61, wire 206, connector 46, to wire L2. If a relay R125 or R126 in either storage machine I or storage machine II is energized, the circuit to LM61 cannot be completed. Neither can it be completed if R125 in storage machine III is energized. When such energized relay drops out the next closure of S1CB1 will complete the circuit to LM61 and the read-in to this storage unit will be delayed by its own operation sufficiently to insure that the preceding read-in to a storage unit in another bank will have been completed before the read-in to storage unit 61 begins.

To take another example, the circuit to LM11 of storage machine I is as follows: L1, connector 90, R125-4, transferred, connector 92 into storage machine II, R125-3 and R126-3, normal, connector 93 into storage machine III, R125-7, R126-9, R129-4, normal, wires 207 and 208 and connectors 94 of storage machines III, II, and I, R125-5 of storage machine I, transferred, R126-7, normal, S1CB1, R109-2, LM11, wire 206, connector 46, to wire L2. The circuit cannot be completed if any one of the relays R125 or R126 in storage machines II or III, or the relay R126 of storage machine I is energized.

It will be observed that before the storage machines are plugged together they are identical and it makes no difference which one is put in the first position, which in the intermediate position, and which in the last position. The circuit of one storage machine is changed by the energization of R129, when another storage machine is plugged into its rear end, so that the circuit to its storage unit latch magnets must pass through the bank selector relay points of the other machine. In the last machine, in which the relay R129 is de-energized, the circuit has already passed through the points of the bank selector relays of the other storage machines, along the line of connectors 90, and so proceeds directly through normal R129-1 to the selected storage unit latch magnet. It is a great convenience to the users of the machine not to have to take care to plug the machines together in a certain order.

The storage units have a primary grouping by storage machine and a secondary grouping by bank. There is no fixed time relation between the banks and the interlock arrangement described takes account of this fact, in avoiding conflict between the read-in times of different storage units.

The creeping condition previously described can occur with a plurality of storage machines, as well as with a single storage machine, but the same provisions for causing an early impulse to the storage entry coupling relay, or, if necessary, an idle cycle of the tabulating machine, prevent conflicts which would cause errors.

*Tabulator and storage machine combination*

It was mentioned earlier that the invention is applicable to a combination consisting only of a tabulating machine and one or more storage machines. In this case the storage machines provide extended storage capacity for the tabulating machine, into which numbers can be transferred from cards, or from accumulators of the tabulator, and from which they can be retransferred into the accumulators of the tabulating machine, without the need for mechanically synchronizing the auxiliary storage mechanism.

In explaining this embodiment of the invention the accumulators of the tabulating machine will be referred to. These accumulators may be the same as those disclosed in Patent 2,340,772, where a full explanation of their construction and operation will be found. Figs. 19–21 of this application are identical, except for reference numbers, to Figs. 4–6 of said patent and will be briefly described.

The horizontal shafts 20 (Fig. 2) have spaced gears 221 for driving gears 222 (Figs. 19-21) of a tier of accumulator orders. The accumulator orders are mounted in pairs on plates, such as 223, which can be slid into guideway (not shown) of the machine frame. The upper and lower gears 222 of a pair of accumulator orders are spaced to engage respective gears 221 on two adjacent horizontal shafts 20. The accumulator orders are identical and the following description will apply to either of those shown.

Each gear 222 is fixed upon a hub member 226 revolvably supported on a sleeve member 227 riveted to the plate 223. A disk 228 is mounted freely on a shoulder of the hub member 226, but has driving connection therewith through pins 225 of the hub member (only one being shown) engaging in radial slots of the disk 228. Beside the disk 228 is a register wheel 230 mounted by its shaft 233 journalled in the sleeve 227. The disk 228 is normally held out of engagement with the register wheel 230 by a spring 229, but has a crown of teeth adapted to be engaged with a complementary crown of teeth on the register wheel 230 by coupling means including a bevel wheel 240. The wheel 240 is revolvably mounted on an arm 241A of a coupling member 241, rockably mounted on a pivot 242 and urged counterclockwise by a spring 246. The coupling member is normally restrained by an armature 247 of an entry magnet EM, acting on the arm 241B of the coupling member. When the entry magnet is energized the armature releases the coupling member 241, which is rocked by its spring 246 and the bevel wheel 240 engages the disk 228, camming it against the register wheel 230.

The coupling member 241 can be rocked to release the disk 228 either by a mechanical knock-off arrangement, operating at fixed times in the cycle, or an electrical knock-off device, which operates when it receives an electrical impulse. The mechanical knock-off device will be described first. The coupling arm 241 has an extension 241C, the end of which is in the path of two rollers 255 and 256 on the hub member 226. Either one of these will cam the extension 241C back sufficiently to relatch the arm 241B under the armature 247. A small bell crank 248 is rocked down by the arm 241B so as to restore the armature 247 positively into its detenting position. The register wheel turns counterclockwise in Fig. 19 and the first roller 255 de-clutches the register wheel at the end of adding time, while the roller 257 de-clutches it at the end of carry time, as will be described later.

The electrical knock-off device comprises a resetting arm 283 pivoted on the plate 223 at 284. The spring 246 is anchored to this arm and tends to rock it counterclockwise. The arm is normally restrained by an armature 280 of a stop magnet SM. When the stop magnet is energized the armature releases the arm 283 and the spring 246 rocks it counterclockwise. A stud 285 pushes down the arm 241B, due to its greater moment arm with respect to the pivot 242 of the member 241, disengaging the bevel wheel 240 from the disk 228. The resetting arm is restored to its latched position by a roller 286 on gear 222.

The register wheel 230 has teeth 230A which coact with a detent arm 250 rockably mounted on the pivot 242. The detent arm 250 is urged toward the detenting position by a spring behind the spring 246.

Secured to the register wheel 230 is a carry cam 260, on which rides the end of a carry lever 262 pivoted at 261. A roller 263 bears upon one end of a 9-10's contact arm 264, which is pivoted at 265 and urged counterclockwise (Fig. 20) by a spring 267 so that it holds the carry lever 262 against the carry cam. A brush 268 of the 9-10's contact arm stands in a neutral position between a 9's contact 270 and a 10's contact 271 (see upper accumulator in Fig. 20) when the carry lever 262 is on the concentric part of the carry cam 260.

The disk 228 and the register wheel 230 have 20 teeth and will make half a revolution for an entry of 10, turning one tooth for each unit entered. The position shown in the upper accumulator order of Fig. 19 is one of the two zero positions of the register wheel. If the register wheel is moved 9 steps, that is 9 teeth, the end of the lever 262 which has been traveling along the concentric periphery of the carry cam, will drop into a notch 260A. When this occurs the 9-10's contact arm 264 tilts so that its contact brush 268 is moved down from the neutral position to engage the 9's contact 270. When the register wheel moves further the arm 262 is rocked by tooth 260b beyond the neutral position, to the position shown in the lower accumulator order of Fig. 19, and is latched by a latch 273 influenced by a spring 274. In this position of the 9-10's contact arm the brush 268 touches the 10's contact 271 (see lower accumulator in Fig. 19). While the arm 262 is latched in this position a carry impulse is transmitted through a wire 266A connected to the mounting bracket 266 of the 9-10's contact arm and passes through the brush 268 and the 10's contact 271 and wire 271A to the entry magnet of the next higher order, as will be seen from the circuit diagram presently. The 10's contact is also used for reading out a total and in resetting the accumulator order, in a manner to be described. If the brush 268 in the next higher order of the accumulator is in contact with the 9's contact 270, the carry impulse will be transmitted through said 9's contact to the entry magnet of the next higher order. This action can be extended to still higher orders. After the carry impulse, a cam roller 275 on gear 222 rocks lever 273 to release the carry lever 262.

The illustrative tabulating machine has its cycle divided into 20 cycle points, each of 18°. The first cycle point, as will be seen by referring to Fig. 13, is identified with the digit 9, the second with 8, and the tenth with 0. Numbers are entered in an accumulator by sending impulses to the entry magnets at differential times identified, on the cycle point scale, with the digits to be entered. After turning through corresponding numbers of steps the register wheels are declutched at a fixed time in the cycle by the roller 255. The teeth of the clutch disk 228 and the coacting teeth on the register wheel have a complementary ratchet shape which allows them to slide into full engagement. A digit impulse to the entry magnet is timed to occur just after the points of the gear teeth have passed, so that the clutch disk 228 turns about 12 degrees before picking up the register wheel. The declutching action of the roller 255 takes place 12 degrees after the beginning of 0 impulse time, so that the register wheel does not turn at all when its entry magnet receives a 0 impulse.

The operation of the tabulator and a storage machine combination will be explained by reference to the circuit diagram shown in Figs. 22a and 22b and the control panel, Fig. 23. Only two orders of the accumulator and storage devices and two wires of the channels are shown.

*Reading a number from a card into a storage unit*

Fig. 23 shows a wiring 15 whereby a number can be read from columns 19 and 20 of a card through channel C into a storage entry unit, whence it will be transferred into a storage unit. Since this number will appear on channel C it can be printed by punching an X in column 1, where it will be read at the upper brush for this column and will pick up class selector CS1, to energize the list relay in the manner previously described. This wiring can be used for transferring the number directly from the card into storage, without passing through a calculator. The card must have wiring 14 to read a channel C control code at the upper brushes of columns 9 and 10. Note that the field arrangement of the card is different in this case; it may be varied as desired. Also, the channel C control instructions are read at the upper brushes, because the entry into the storage entry unit will occur on the same cycle as the reading of the card from the lower brushes, instead of one cycle later, as when passing through the calculator.

Referring, now, to the circuit diagram in detail, a code for a storage unit, such as 12, in columns 9 and 10, will set up the selection of storage unit 12 in the same manner as in the first embodiment. The circuits being the same, they are shown in simplified form and the block 300 represents the circuit shown in Fig. 16f. The "1" in column 9 causes an impulse to be sent through wire S25 to pick up relay R139 (not shown in Fig. 22a). R139-10 closes, preparing a circuit for a CB82 impulse to energize the storage entry latch magnet LM1 and relay R2112. The points 12 and 11 of R2112 (Fig. 22b) close, preparing circuits to the latch magnets SE1-1 and SE-2. The bail contact BC1 closes after LM1 has been energized and a CB14 impulse energizes R2116LP. If the number in columns 19 and 20 is 94, for example, at 9 time a circuit will be completed from L1 through CB1, CF9, CL3, common brush and contact roll 31, lower brush for column 19, hub H100, plug wire 400, channel C hub H101, R2112-11, and SE1-2, to wire L2, energizing said magnet and causing a 9 to be stored in the tens order of storage entry 1.

A 4 hole in column 20 is read through a similar circuit into SE1-1, storing a 4 in the units order of storage entry 1.

The same impulses which energized the storage entry stop magnets went by branch circuits to print magnets PM3 and PM4, through wiring 19 in Fig. 23. The circuit to PM4 leads from hub H101 through hub H121, control wire 410, hubs H122 and H123, as a terminal, control wire 411, hub H124, PM4, to wire L2. If the print clutch magnet was energized by the relay sequence previously described, originated by an X in column 1, the number will be printed as it is transferred to storage entry.

Figure 16G:
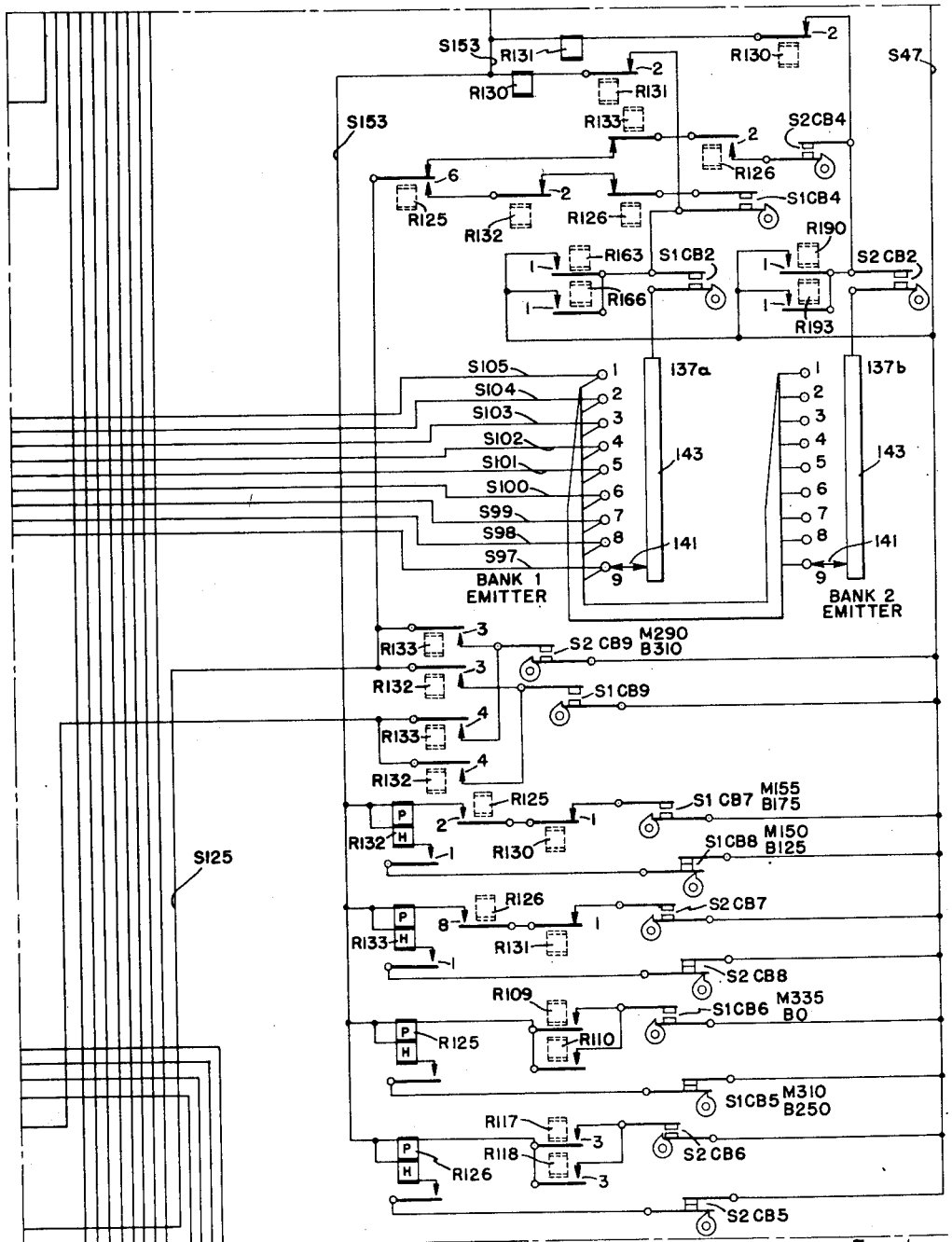
Figure 16H:
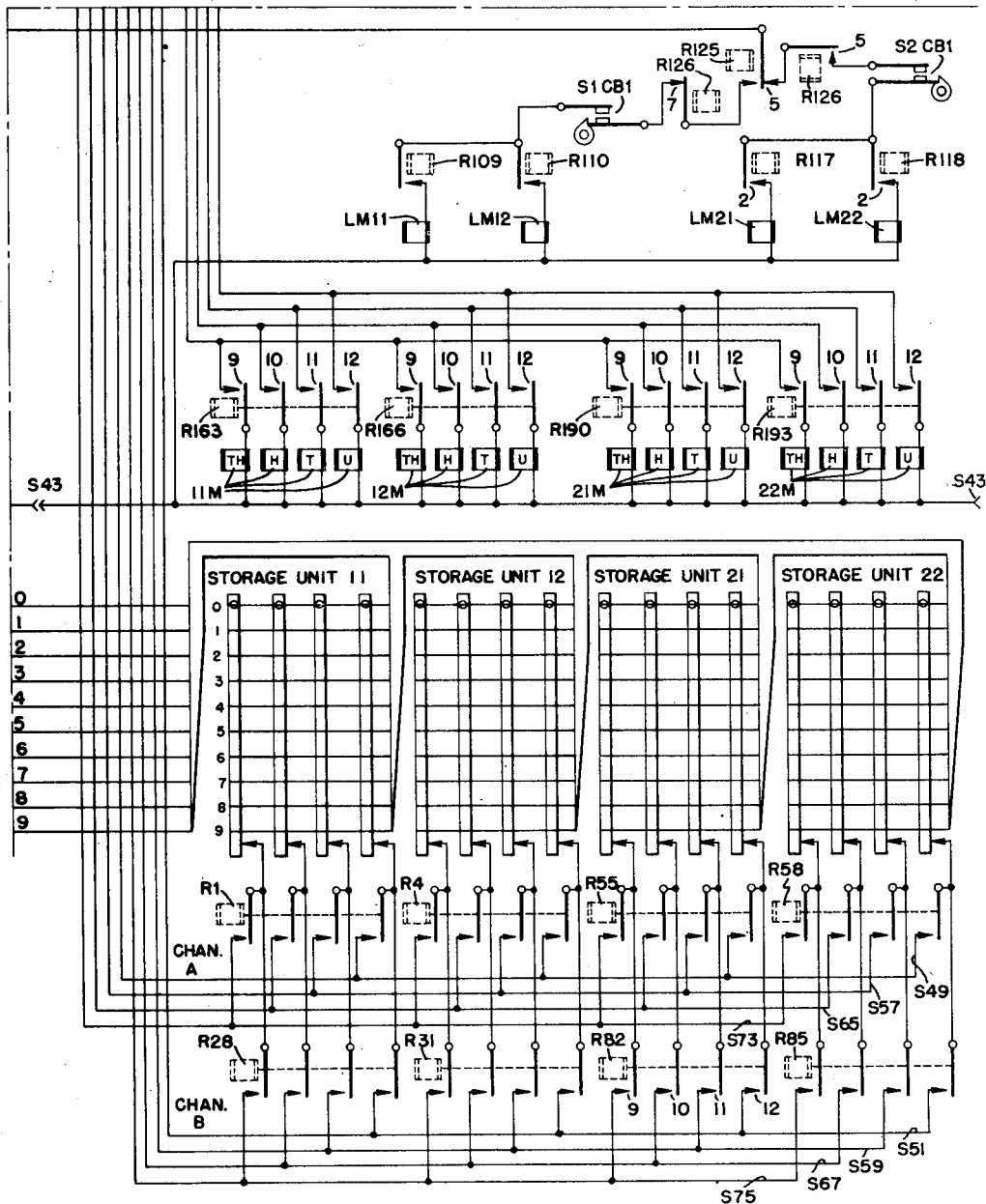

Through the interlock circuits in the storage machine previously described an impulse will be sent out from the block 301 in Fig. 22b representing the circuit of Fig. 16g, through wire S125 and transferred R2116-2, through R2118LP, to wire L2, energizing R2118. The emitter for bank 1 sends impulses through wires S96-105 and the transferred points 1-9 of R2118, to the read-out contact bars 130 of storage entry 1, causing the numbers 9 and 4, stored in the tens and units orders of storage entry 1, to be transferred through the transferred contacts 12 and 13 of R2113, to the tens and units stop magnets of storage unit 12 in block 302, representing Fig. 16h.

*Reading numbers from cards into an accumulator and transfer of total to a storage unit*

Numbers can be read from cards into an accumulator of the tabulating machine and, in a later cycle, the total can be read out of the accumulator into storage entry, thence into a storage unit. This operation requires wiring 16 (Fig. 23) for the entry into the accumulator and wiring 17 for transfer to storage.

A number punched in columns 21 and 22 will be accompanied by an X punched in column 2. When the card is passing the upper brushes the X in column 2 will complete a circuit from the brush through its hub H102 (Fig. 22a), plug wire 401, hub H103, class selector CS2, to wire L2, energizing the class selector. At 320° in the same cycle an impulse from the all cycles hub H104 is transmitted through plug wire 402, hub H105, CS2 points, transferred, H106, plug wire, H107, PLUS relay R401, to wire L2, energizing said relay. Contacts 1 and 2 of relay R401 close, preparing a circuit through which card impulses pass from the lower brushes reading columns 21 and 22.

The circuit from the brush reading column 22 continues through hub H108, wire 403, hub H109, R401-2, transferred, R403-6 and R485-2, normal, the entry magnet EM of the units order counter, to wire L2. If the hole in column 22 was a 9 hole the entry magnet EM will be energized at 9 time and the units order of the accumulator will turn through 9 steps and will be disengaged a little after zero time by the mechanical knock-off means previously described. The tens order of the accumulator will be operated through a similar circuit.

At 198° CB57 (Fig. 22b) closes and relay R485 is energized. Its 1 and 2 points transfer and if the units order register wheel, for example, has passed from 9 to 0 its brush 268 will be latched against the tens contact 271. When CB10 closes at the carry impulse time a circuit is completed through the tens contact 271 of the units order, brush 268, R403-7, normal, R485-1, transferred, entry magnet EM of the tens order of the accumulator, to wire L2. The entry magnet causes the related clutch disk 228 to be engaged with the register wheel. After turning one step the knock-off roller 256 disengages the clutch, the second order of the accumulator having added one unit by carry. If the brush 268 of the tens order of the accumulator had been in contact with the 9's contact 270 at the time of the carry impulse mentioned, this impulse would have been transmitted through said 9's contact, the brush 268 of the tens order, R403-6, normal, and hub H119. This hub might be coupled by a control wire to a hub such as H120 of another accumulator order, which would thereby be incorporated into one accumulator group with the two accumulator orders shown.

It may be that after accumulating a number of amounts in the accumulator the total is to be transferred to a storage unit. For this purpose the wiring 17 in Fig. 23 is used, together with wiring 11 for X control of total read out and wiring 14 for channel C control. The card which is to control this operation will have an X in column 3 and when this is read at the upper brush station a circuit will be completed from the brush through hub H110, wire 404, hub H111, class selector CS3, to wire L2, energizing the class selector. At 320° a circuit is completed from the All Cycles hub H112 through the plug wire to H113, transferred class selector contact to hub H114, plug wire, hub H115, pick up coil of the total control relay R403, to wire L2, energizing said relay. The holding circuit of R403 does not become effective immediately because CB58 is not closed at the time the relay is energized.

At 351° an impulse passes from wire L1 through CB1 (Fig. 22b), CB14, transferred contacts 5 and 6 of R403, normal contacts 1 and 2 of R485, to the entry magnets EM of the tens and units orders of the accumulator. The accumulator register wheels are clutched-in one cycle point in advance of 9 time. If the units order register wheel stands at 6 it will pass from 9 to 0 at 6 time of the cycle, this being about 4 cycle points after the entry magnet EM was energized. As the units order register wheel moves from 9 to 0 its carry cam tilts the 9–10's brush 268 into contact with the 10's contact 271 of the units order and the brush is latched in this position by the latch 273. When CB10 closes during the 6 index point of the cycle a circuit will be completed from L1 through CB1, CB10, tens contact of the units order, related brush 268, transferred contact R403-7, hub H116, wire 405, hub H117, through the 12 point of R2109, for example, and the stop magnet SE2-1 of storage entry 2, to wire L2, energizing this magnet and stopping the units order plunger contact of storage entry 2 on the 6 read-out contact bar 130. Read out into a storage unit selected by the channel C control code on the same card will follow in the manner previously described. If there was an X in column 1 of the card the number will be listed as it goes into storage entry 2.

The impulse from CB10 at 6 time which went out to the stop magnet of the storage entry device also passed from brush 268 through wire 407, R401-2, normal, stop magnet SM of the units order, to wire L2. The stop magnet is energized, stopping the units order register wheel at zero position. In this way each accumulator order is reset to zero as the total digit is being read out of it.

At 160° of the total read-out cycle CB58 closes, completing a holding circuit for R403, which will keep it energized until after the carry impulse through CB10, thereby preventing any carry on the total read-out cycle, by holding transferred the 7 and 8 contacts of R403.

*Transfer from storage unit to accumulator of tabulating machine*

At a later time the number stored in a storage unit can be brought back into an accumulator of the tabulating machine. For this purpose wiring 18 in Fig. 23 is used, together with wiring 14, to pick up a channel A control code to identify the storage unit from which the number is to be read, and wiring 10 to pick up an X in column 2, to operate "Counter Control—Plus." The channel A control code is read from columns 8 and 9 at the upper brushes and couples the selected storage unit to channel A. An X in column 2, read at the upper brushes, causes class selector CS2 to be energized, and through its transferred points, the plus control relay R401. In the next cycle the emitter 410 (see Fig. 16c) impulses successively the read-out contact bars of the storage unit of the selected bank and the storage unit which is coupled to channel A will transmit impulses through wires S49 and S57 at digit times corresponding to the numbers stored in it. The units order digit will pass through wire S49, hub H38, control wire 406, H118, R401-2, transferred, R403-6 and R485-2, normal, the entry magnet EM of order 1 of the accumulator, to wire L2. The entry magnet is energized at the digit time corresponding to the digit stored in the units order of the storage unit and the units order register wheel turns through the number of steps identified by that digit and is stopped by the mechanical knock-off device.

The same impulses which energized the entry magnets of the accumulator went by branch circuits to PM1 and PM2, through wiring 20 in Fig. 23. The circuit to PM2 leads from wire S49 through hub H125, control wire 412, hub H126, PM2, to wire L2. If the card which controlled this cycle had an X in column 1 the print clutch magnet was operated and the number printed concurrently with its transfer to the accumulator.

It has been shown how numbers can be read from a card into a storage unit by way of a storage entry unit, how numbers can be read from an accumulator into a storage unit by way of a storage entry unit and the accumulator reset, and how numbers can be read from a storage unit into an accumulator. Although the storage machine is not synchronized with the tabulating machine, numbers can be read into it and called out of it with facility equal to that of transfers within the tabulating machine itself. This offers the possibility of an extensive enlargement of the storage capacity of an electric accounting machine, without the disadvantages, including higher cost, which would be entailed by an enlargement of the accumulator capacity in the tabulating machine itself.

While the transfer of numbers between accumulators of the tabulating machine and storage units of the storage machine has been explained by reference to a further embodiment of the invention, consisting of just a tabulating machine and a storage machine, the same functions can be performed in a machine combination including a calculating machine, with or without a summary punch.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Calculating means comprising a cyclically operating record reading machine, including storage entry means; a cyclically operating storage unit group, said machine and said group having individual, unsynchronized driving means; a calculating machine including means to store factors and means to compute results from said factors, including accumulator means to store said results; means controlled by said record reading machine for reading factors into said factor storage means, for initiating a computing operation by said calculating machine, and for reading out results from said accumulator into said storage entry means; and means controlled by said storage unit group for reading results out of said storage entry means into storage units of said group.

2. Calculating means as described in claim 1, characterized by means controlled by said record reading machine for selecting the storage units into which are read the results successively entered in said storage entry means.

3. Calculating means comprising a cyclically operating record reading machine, including storage entry means; a plurality of cyclically operating storage unit groups, said machine and each of said groups having individual, unsynchronized driving means; a calculating machine including means to store factors and means to compute results from said factors, including accumulator means to store said results; said record reading machine including means to read factors into said factor storage means, means for initiating a computing operation by said calculating machine, means for reading out results from said accumulator into said storage entry means, and means for selecting a particular storage unit for each result to be stored; each storage unit group having means to read out results from said storage entry means into a selected one of its storage units; and means in said record reading machine controlled by said selecting means for initiating a read-out operation by a storage unit group which includes a selected storage unit.

4. Calculating means as described in claim 3, characterized by the fact that said means for initiating a read-out operation by a storage unit group includes impulse means operating at a definite time in the cycle of the record reading machine, to insure that the read-in to the storage entry means precedes the read-out to the storage unit.

5. Calculating means as described in claim 4, wherein said storage entry means includes two storage entry units, groups of wires constituting a single channel, and means for coupling said storage entry units alternately to said channel wires for read-out into selected storage units.

6. Calculating means as described in claim 5, characterized by the fact that the alternating coupling of said storage entry units to said channel wires is controlled by relay means, each of said storage unit groups having associated therewith means to impulse said relay means each time a read-out from said storage entry means into a storage unit thereof is about to begin, said relay means being adapted to shift from one to the other of two alternative conditions each time it receives an impulse.

7. Calculating means as described in claim 6, including means controlled by said storage unit selector means to set up each related storage unit group to impulse said relay means, each of said set-up means including means to render inoperative the set-up means associated with every other storage unit group until read-in to the storage unit of the first group selected has proceeded to a predetermined point.

8. Calculating means comprising a cyclically operating record reading machine, including differentially settable storage entry means and differentially settable printing means, a cyclically operating storage unit group, said machine and said group having individual, unsynchronized driving means; a calculating machine including means to store factors and means to compute results from said factors, including accumulator means to store said results; means controlled by said record reading machine for reading factors into said factor storage means, for initiating a computing operation by said calculating machine, and for concurrently reading out results to said storage entry means and to said printing means, for differentially setting the same; and means controlled by said storage unit group for reading results out of said storage entry means into storage units of said group.

9. In a device of the class described, the combination of an electrical record reading machine, an electronic calculating machine, and a storage machine, said record reading machine and said storage machine each having individual driving means unsynchronized with each other, said record reading machine including an electrical-pulse controlled mechanical storage entry device driven by the driving means thereof, said storage machine including a plurality of electrically controlled mechanical storage units driven by the driving means of said storage machine, said calculating machine including electrical-pulse controlled factor storage means and means for carrying out arithmetical operations upon factors in said factor storage means, including means for accumulating the results of said operations; means including pulse generating means in said record reading machine for concurrently reading factors from records into said factor storage means and reading a result from said accumulator into said storage entry means, and the means for reading results from said storage entry means into said storage units of said storage machine, including means driven by the driving means of said storage machine for transmitting to said storage entry means digit pulses synchronized with the movement of the mechanical storage units of said storage machine.

10. In a machine of the class described, a calculating machine, including factor storage means, means for performing mathematical operations with factors in said factor storage means, and accumulator means for storing the results of said operations; a record reading machine, including storage entry means and means for transferring numbers from said accumulator means to said storage entry means; a storage machine including a plurality of storage units and means for transferring numbers from said storage entry means to the various storage units of said storage machine; and means including impulsing means in said record-reading machine for transferring numbers from said storage units to the factor storage means of said calculating machine.

11. In a device of the class described, two cyclically operating machines, each having its own driving means unsynchronized with that of the other; a first one of said machines including an electrically-operated device, the second one of said machines including two impulsing devices operating at different times in the cycle of said second machine, and means controlled by the phase relationship of said two machines for alternatively connecting said impulsing means to said electrically-operated device.

12. A device as described in claim 11, wherein said electrically-operated device comprises two magnet coils, and said first machine comprises relay means having points in the connection of said impulsing means to said electrically-operated device, for gating impulses to one or the other of said coils, and impulsing means connected to said relay means and operating at a certain time in the cycle of said first machine to actuate said relay means.

13. In a device of the class described, two cyclically operating machines, each having its own driving means unsynchronized with that of the other; a pair of storage entry devices in a first one of the machines; means for reading data out of said storage entry devices, comprising a single channel of wires and relay means for coupling said storage entry devices alternately to said channel wires, said relay means having two coils each adapted to shift said relay means to a different one of two conditions; means for energizing the two coils of said relay means alternately, comprising impulsing means in the second of said machines, operating at a certain time in the cycle of said second machine, a second relay means having points to gate said impulse to either of the two coils of said first relay means, and a second impulsing means operating at a certain time in the cycle of said first machine to impulse said second relay means; a third impulsing means in said second machine operating at a different index time from said first impulsing means, means normally rendering said third impulsing means ineffective, and means controlled by the phase relationship of said two machines to render said first impulsing means ineffective and to render said third impulsing means effective to impulse one of the coils of said first relay means.

14. A combination of machines, comprising an electric record reading machine and auxiliary storage means, said auxiliary storage means comprising a plurality of identical electrically controlled storage machines, each including at least one group of storage units, the electrical circuits of said storage machines including pluggable connectors whereby the front end of any storage machine can be plugged into the rear end of any other storage machine, said record-reading machine having pluggable connectors into which the front end of any storage machine can be plugged; and means controlled by said record-reading machine for selecting any storage unit in any of said storage machines, each of said storage machines including circuits through which selecting impulses can pass to a storage machine plugged into its rear end.

15. In a machine group of the kind described, a tabulating machine including accumulating means, storage entry means, record-reading means, a single driving means for all of said means, and means controlled by said record-reading means for transferring numbers from records to said accumulating means, and for transferring numbers from either records or said accumulating means to said storage entry means; a storage machine including a plurality of storage units and driving means therefor unsynchronized with said tabulating machine driving means; means for transferring numbers from said storage entry means to selected storage units, including impulsing means electrically connected to said storage entry means and operated by the driving means of said storage machine, and means controlled by said record-reading means for selectively connecting said storage units to said storage entry means; and means for transferring numbers from selected storage units to said accumulating means, including impulsing means electrically connected to said storage units and operated by the driving means of said tabulating machine, and means controlled by said record-reading means for selectively connecting said storage units to said accumulating means.

16. In a machine group of the kind described, a tabulating machine including record-reading means, accumulating means, and storage entry means; a storage machine including a plurality of storage units; means including a first driving means for transferring numbers from records in said record-reading means to said storage entry means; means including a second driving means unsynchronized with said first driving means for transferring numbers from said storage entry means to said storage units; and means including an emitter operated by said first driving means for transferring numbers from said storage units to said accumulating means.

17. A machine group of the kind described in claim 16, including means controlled by records in said record reading means for selecting the storage units into which different numbers are to be transferred from said storage entry means.

18. A machine group as described in claim 17, wherein means are provided in said tabulating machine, and controlled by said record reading means, to accumulate in said accumulating means, numbers from records in said record reading means, and to transfer the totals of said numbers from said accumulating means to said storage entry means.

19. A machine group as described in claim 18, wherein said tabulating machine includes a printing mechanism and means controlled by said total transfer means to cause said printing mechanism to print the total concurrently with its transfer to said storage entry means.

20. In a machine group of the kind described, a tabulating machine including record reading means, accumulating means, printing mechanism, and storage entry means; a storage machine including a plurality of storage units; means including a first driving means for transferring numbers from records in said record reading means to said storage entry means; means to operate said printing mechanism under control of said number transferring means, to cause the numbers to be printed concurrently with their transfer to said storage entry means; means including a second driving means unsynchronized with said first driving means for transferring numbers from said storage entry means to said storage units; and means including an emitter operated by said first driving means for transferring numbers from said storage units to said accumulating means.

21. In a machine group of the kind described, a tabulating machine including record reading means, accumulating means printing mechanism, and storage entry means; a storage machine including a plurality of storage units; means including a first driving means for transferring numbers from records in said record reading means to said storage entry means; means including a second driving means unsynchronized with said first driving means for transferring numbers from said storage entry means to said storage units; means including an emitter operated by said first driving means for transferring numbers from said storage units to said accumulating means; and means under control of said last mentioned number transferring means for operating said printing mechanism to cause the numbers to be printed concurrently with their transfer to said accumulating means.

22. In a device of the class described, a calculating machine including means to store factors, means to carry out mathematical operations with factors stored in said factor storage means, means to program said operations, and accumulator means to store the results of said operations; a cyclically operating record reading machine, including means operable during one portion of the cycle of said machine for reading factors into said factor storage means and for reading results out of said accumulator means, and means operable in a second portion of the cycle thereof, to signal said calculating machine program means to start a calculation; means including signaling means in said record reading machine, operable during a third portion of the cycle thereof, for testing the condition of said program means; and means responsive to a test by said testing means indicating an unfinished program, for delaying the reading of records by said record reading machine until the calculating program is finished, said record reading machine automatically reading records again after the calculating program is finished.

JONAS E. DAYGER.
ORVILLE B. SHAFER.
EDWIN R. WOODING.
JOSEPH M. SARLEY.
JAMES V. WILLIAMS, Jr.

No references cited.